July 5, 1955 M. S. CURTIS ET AL 2,712,140
MACHINE TOOL WITH TAP SPINDLE DRIVE AND FEED MEANS
Filed Dec. 2, 1950 18 Sheets-Sheet 1

INVENTORS
MYRON S. CURTIS
HARRY SCHOEPE
BY Hudson, Boughton
Williams, David & Hoffmann
ATTORNEYS July 5, 1955   M. S. CURTIS ET AL   2,712,140
MACHINE TOOL WITH TAP SPINDLE DRIVE AND FEED MEANS
Filed Dec. 2, 1950   18 Sheets-Sheet 2

INVENTORS
MYRON S. CURTIS
BY HARRY SCHOEPE
Hudson, Boughton,
Williams, David & Hoffmann
ATTORNEYS

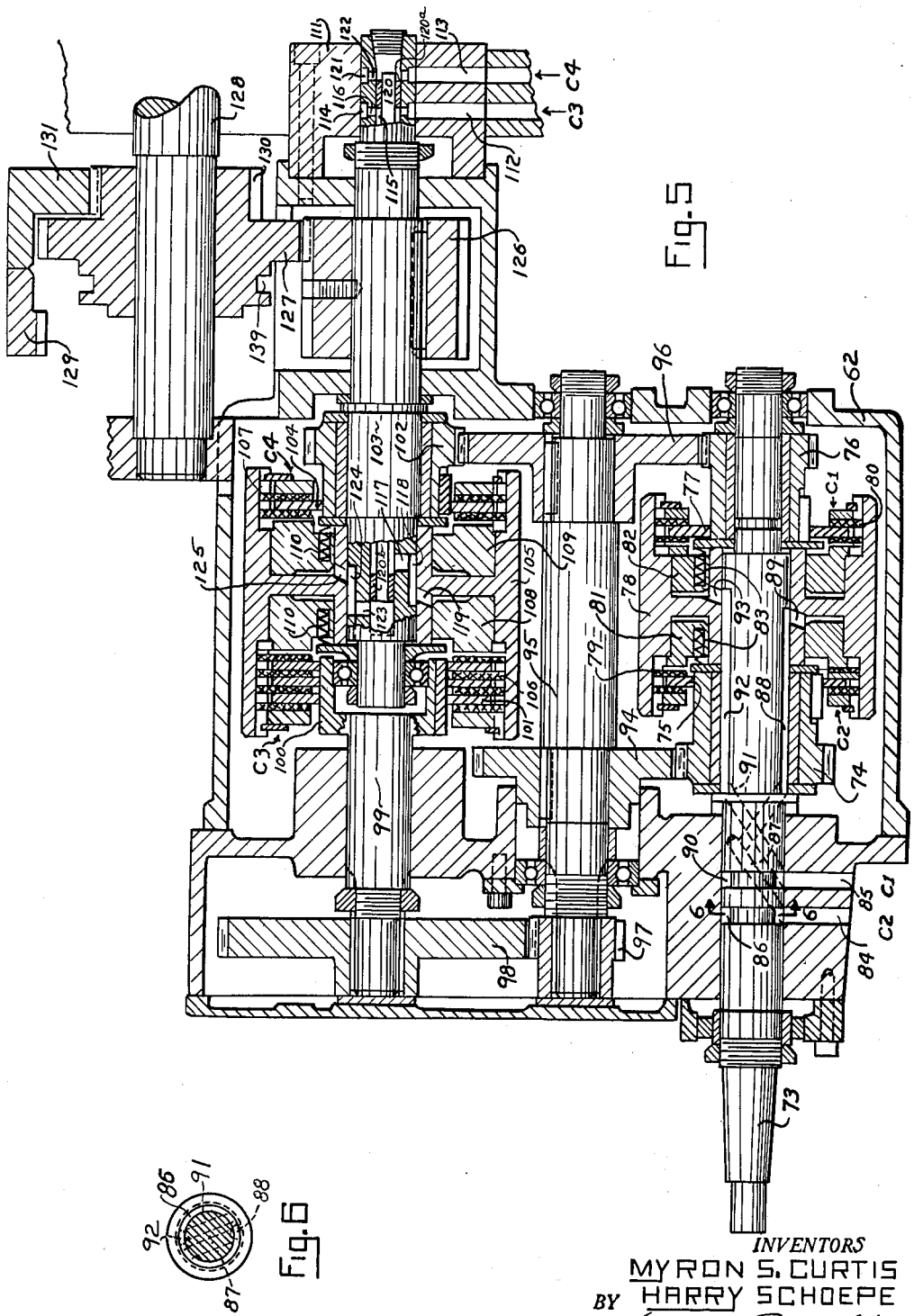

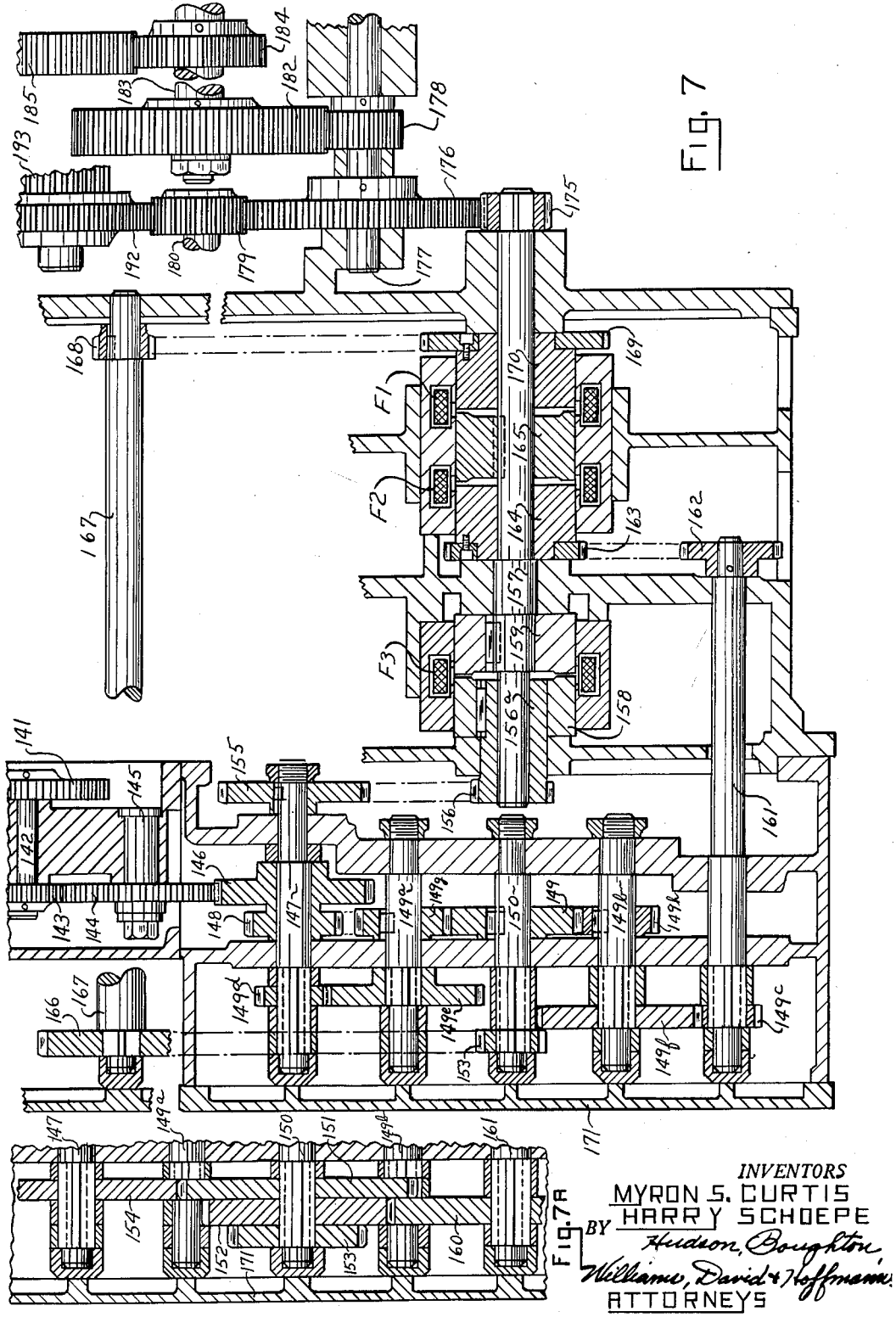

July 5, 1955  M. S. CURTIS ET AL  2,712,140
MACHINE TOOL WITH TAP SPINDLE DRIVE AND FEED MEANS
Filed Dec. 2, 1950  18 Sheets-Sheet 5
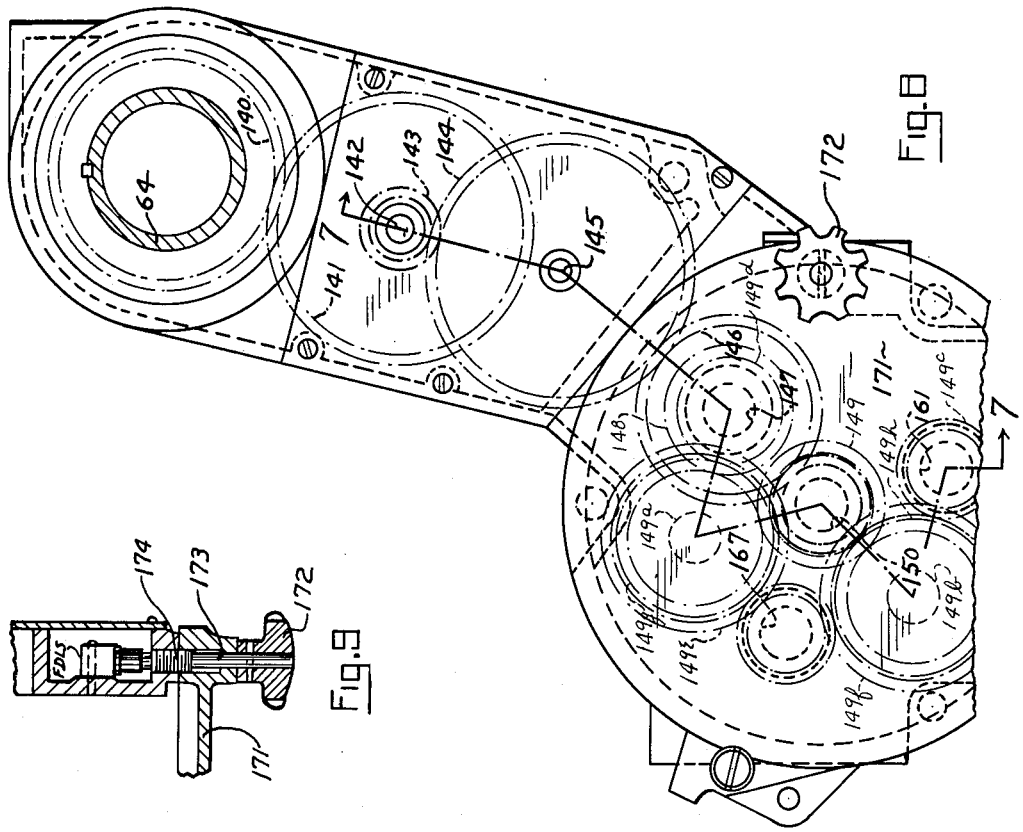
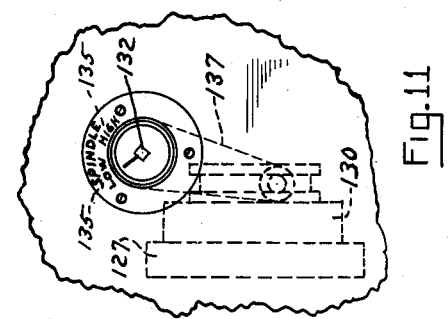
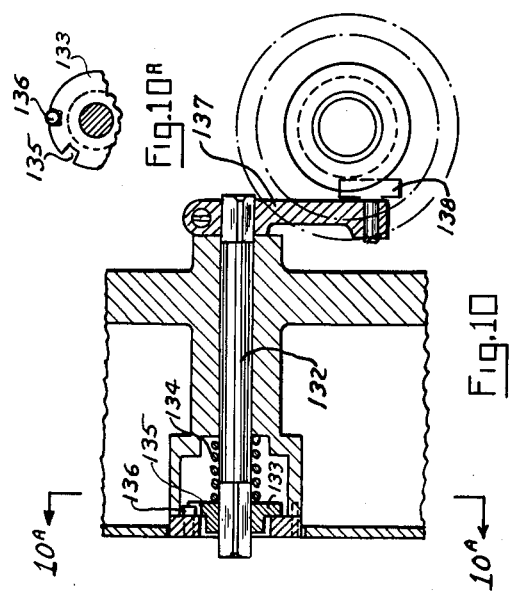
INVENTORS
MYRON S. CURTIS
HARRY SCHOEPE
BY
Hudson, Boughton,
Williams, David & Hoffmann
ATTORNEYS July 5, 1955     M. S. CURTIS ET AL     2,712,140
MACHINE TOOL WITH TAP SPINDLE DRIVE AND FEED MEANS
Filed Dec. 2, 1950     18 Sheets-Sheet 6
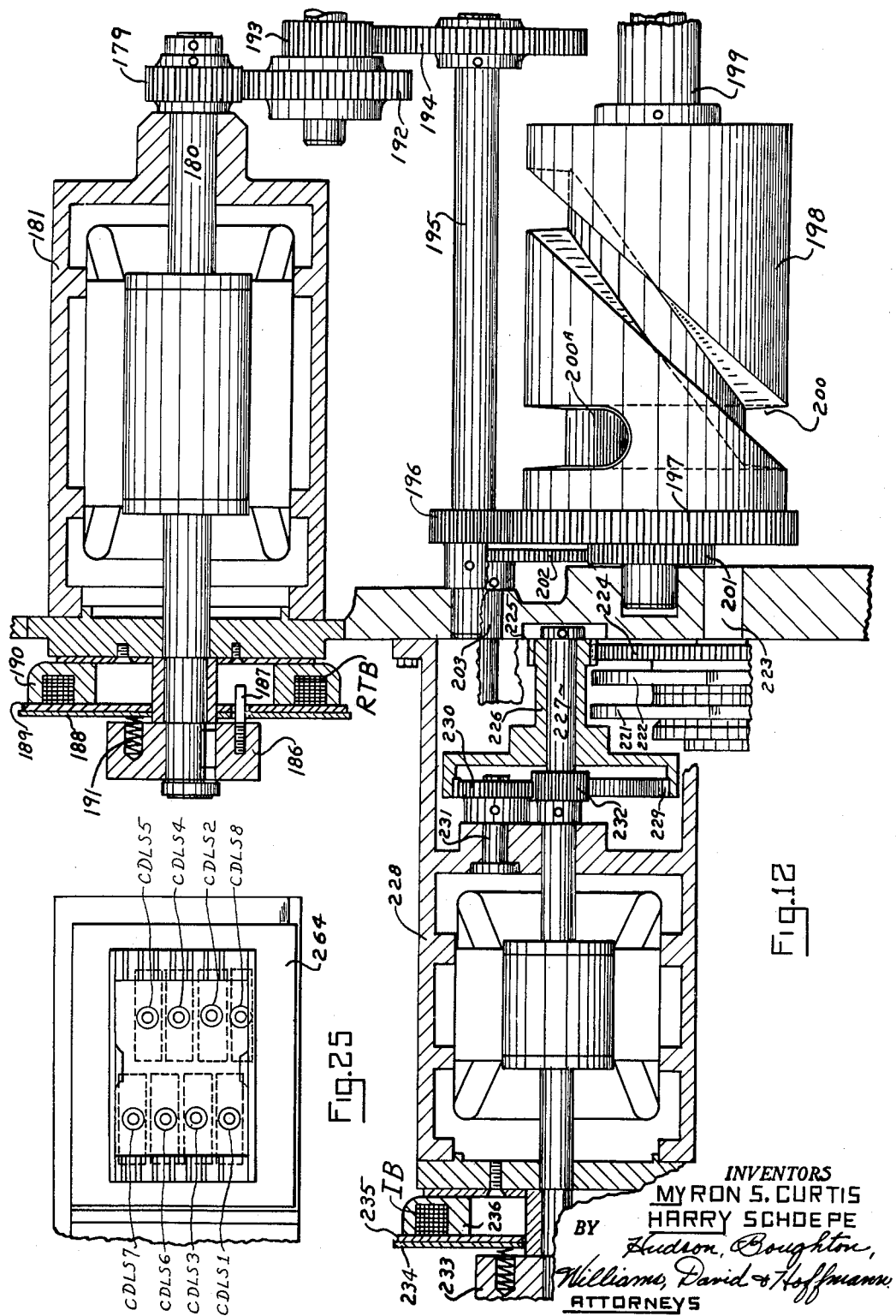
INVENTORS
MYRON S. CURTIS
HARRY SCHOEPE
BY Hudson, Boughton,
Williams, David & Hoffmann.
ATTORNEYS July 5, 1955 M. S. CURTIS ET AL 2,712,140
MACHINE TOOL WITH TAP SPINDLE DRIVE AND FEED MEANS
Filed Dec. 2, 1950 18 Sheets-Sheet 7

INVENTORS
MYRON S. CURTIS
HARRY SCHOEPE
BY
Hudson, Boughton
Williams, David & Hoffmann
ATTORNEYS July 5, 1955    M. S. CURTIS ET AL    2,712,140
MACHINE TOOL WITH TAP SPINDLE DRIVE AND FEED MEANS
Filed Dec. 2, 1950    18 Sheets-Sheet 8
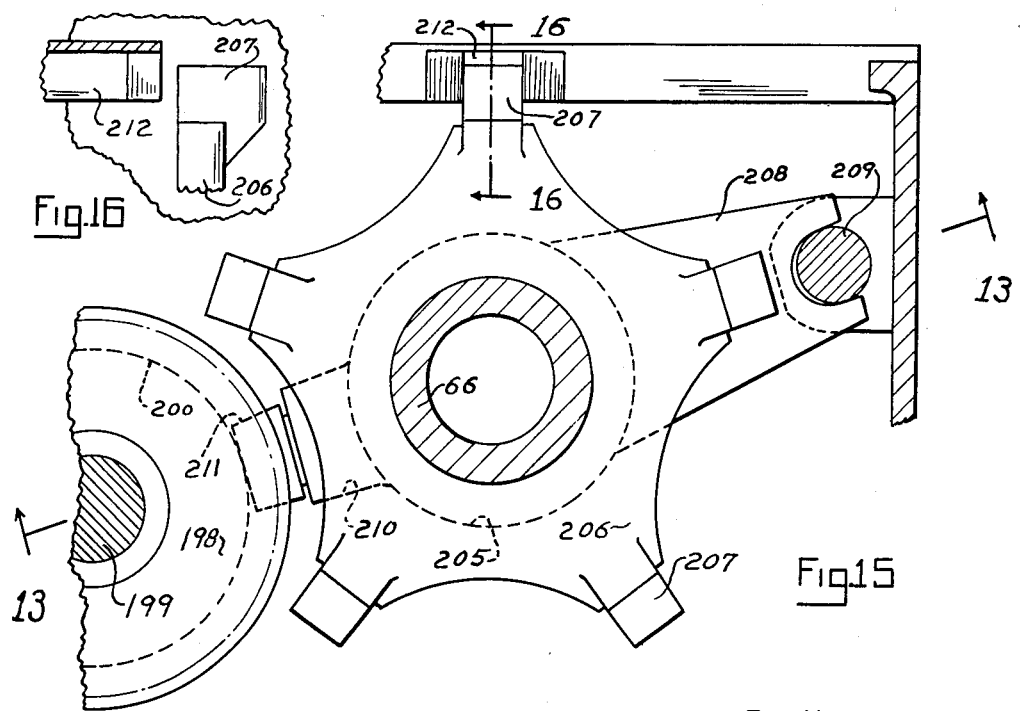
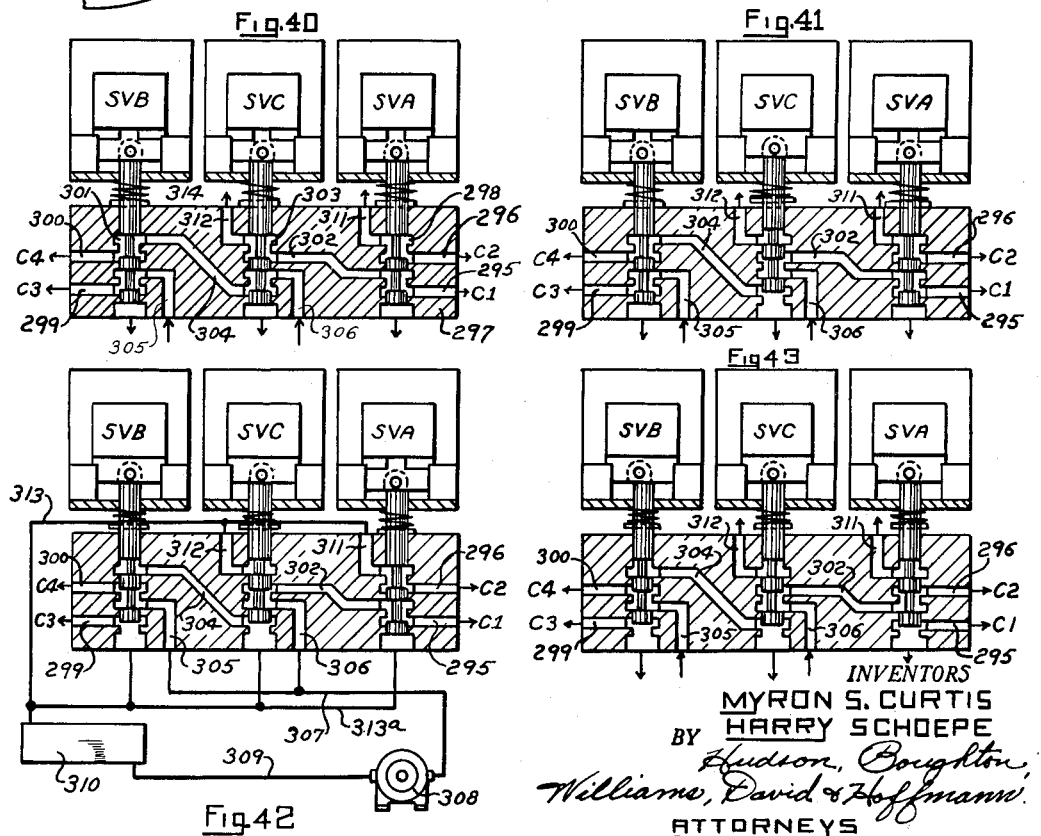
INVENTORS
MYRON S. CURTIS
HARRY SCHOEPE
BY
Hudson, Boughton,
Williams, David & Hoffmann
ATTORNEYS July 5, 1955 M. S. CURTIS ET AL 2,712,140
MACHINE TOOL WITH TAP SPINDLE DRIVE AND FEED MEANS
Filed Dec. 2, 1950 18 Sheets-Sheet 9

INVENTORS
MYRON S. CURTIS
HARRY SCHOEPE
BY Hudson Boughton,
Williams, David & Hoffmann
ATTORNEYS

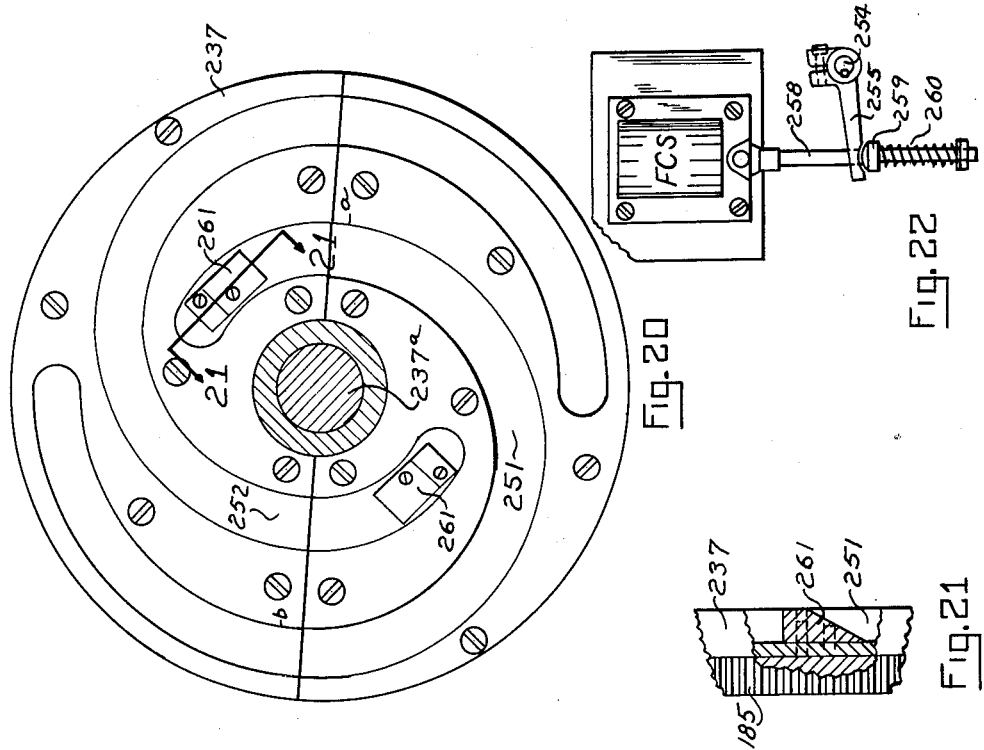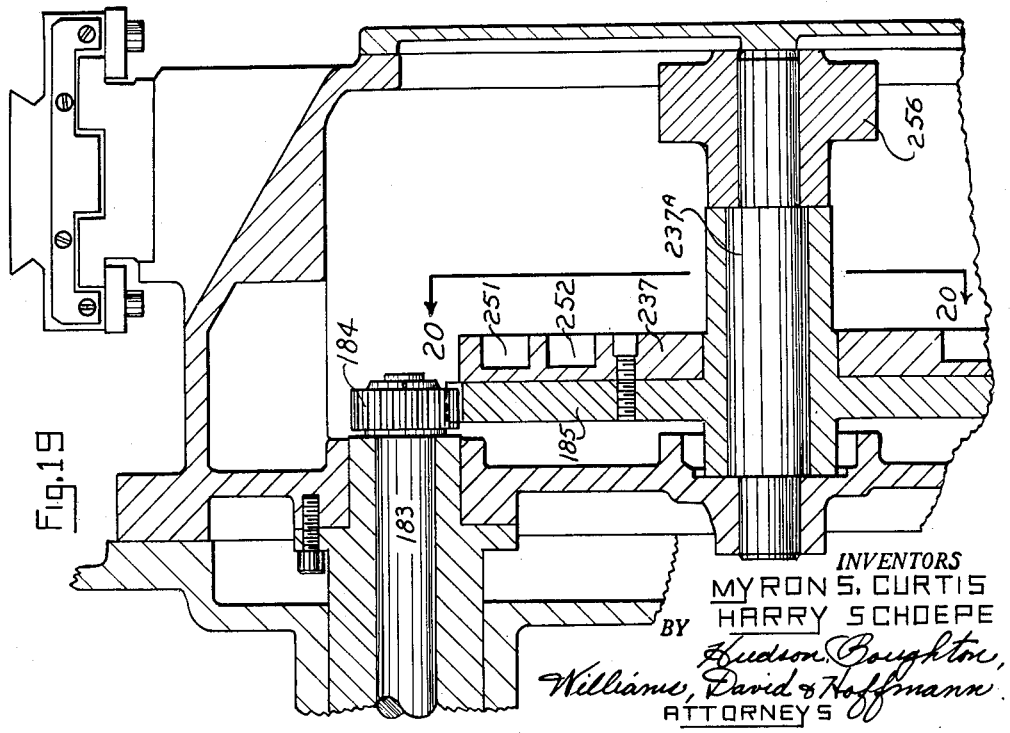

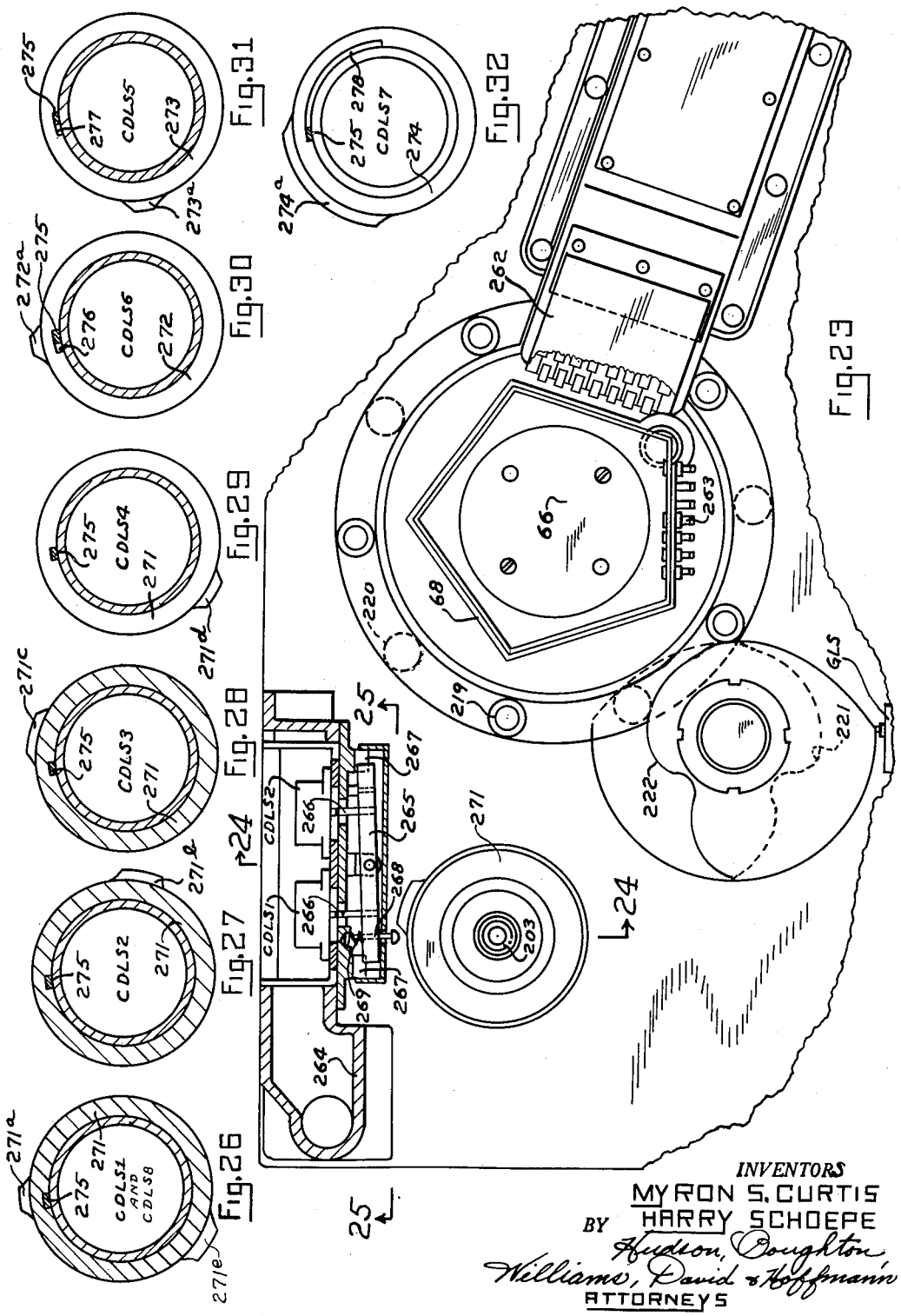

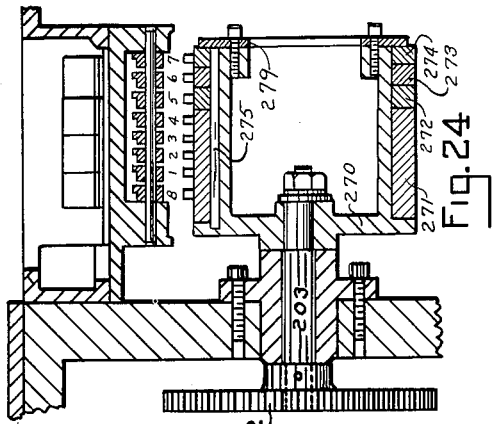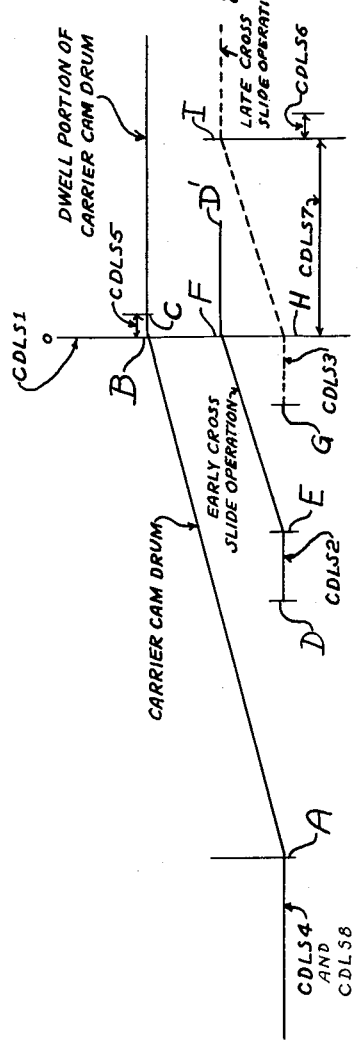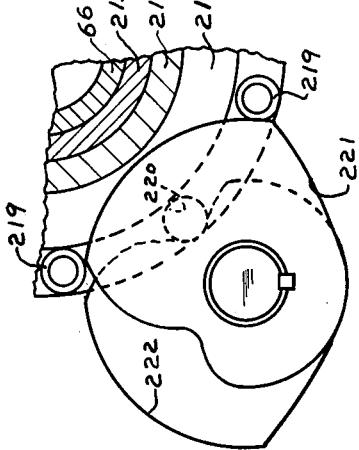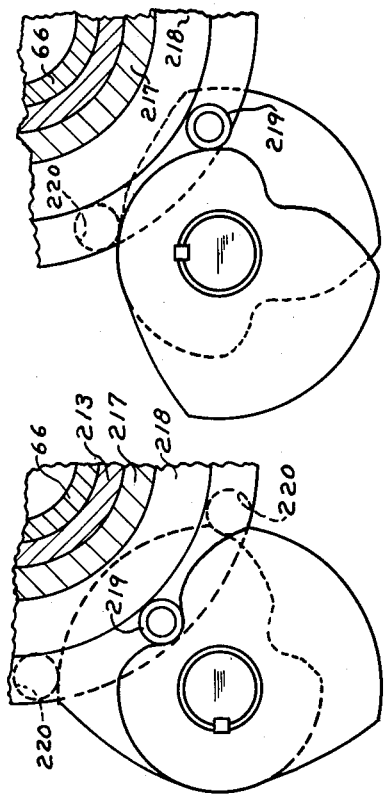

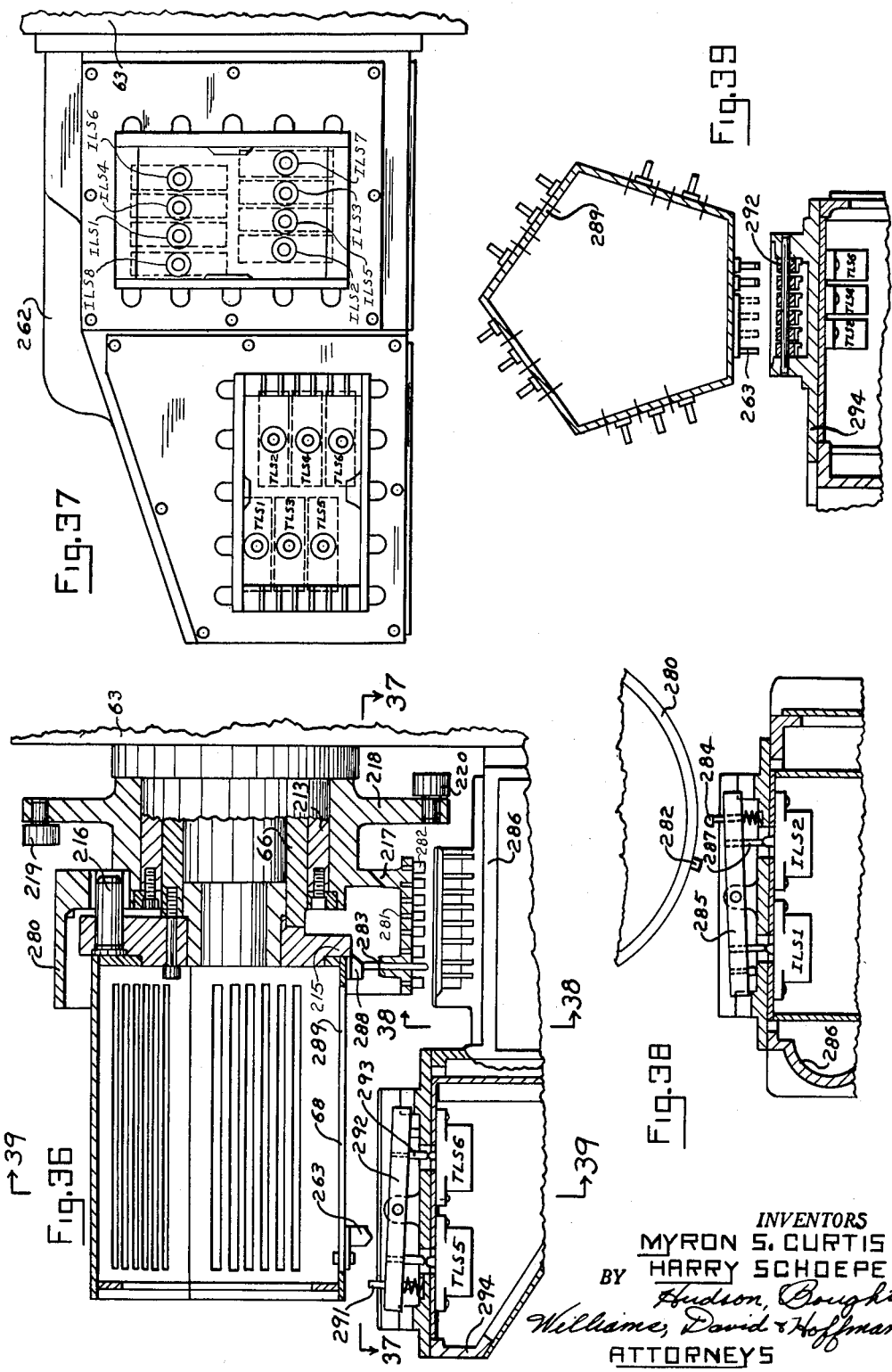

July 5, 1955 M. S. CURTIS ET AL 2,712,140
MACHINE TOOL WITH TAP SPINDLE DRIVE AND FEED MEANS
Filed Dec. 2, 1950 18 Sheets-Sheet 14

INVENTORS
MYRON S. CURTIS
BY HARRY SCHOEPE
Hudson, Boughton,
Williams, David & Hoffmann,
ATTORNEYS

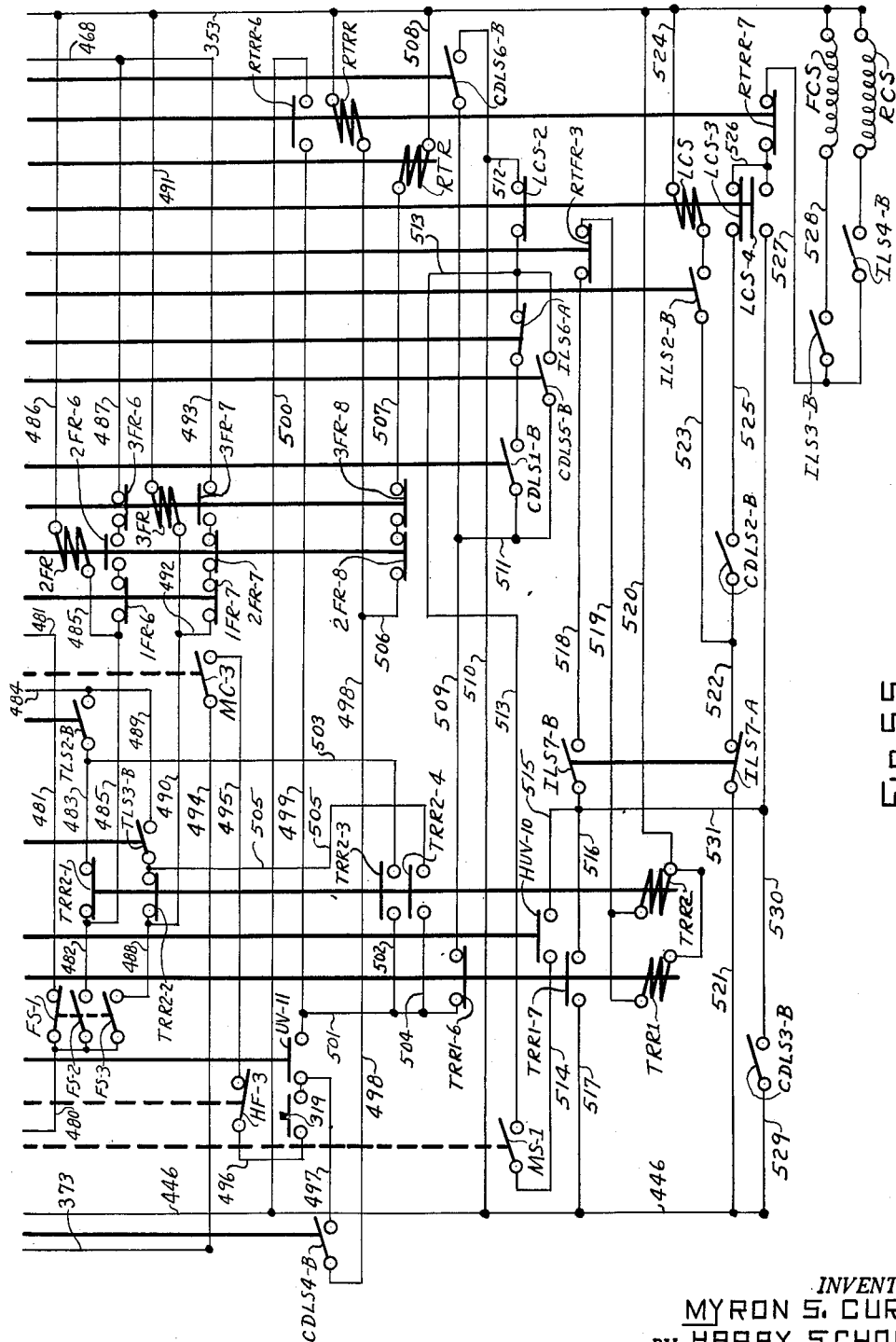

United States Patent Office

2,712,140
Patented July 5, 1955

2,712,140

MACHINE TOOL WITH TAP SPINDLE DRIVE AND FEED MEANS

Myron S. Curtis and Harry Schoepe, Cleveland, Ohio, assignors to The Warner & Swasey Company, Cleveland, Ohio, a corporation of Ohio Application December 2, 1950, Serial No. 198,776

7 Claims. (Cl. 10—139)

This invention relates to a machine tool and, more particularly, to a single spindle automatic lathe, the present application being a continuation-in-part of the application by Myron S. Curtis and Harry Schoepe, Serial Number 770,050, filed on August 22, 1947, now Patent No. 2,644,222 issued July 7, 1953.

An object of the invention is to provide an improved machine tool of the character specified and possessing great ease of setup, wherefore the machine tool is readily adapted for small lot operation as well as for continuous production operation.

A more specific object is to provide a machine tool as specified and wherein all of the adjustable or interchangeable parts are readily accessible, thus facilitating the setup of the machine.

Another object is to provide a machine tool of the character referred to wherein interchangeable cams are eliminated and the setup of the machine for various operating runs involves merely the adjustability of dogs which are freely accessible.

Another object is to provide a machine tool of the character referred to wherein the spindle speed and its direction of rotation as well as the rate of feeding movement of the tool carrier and slide or slides may be varied as desired during any operative step of the work cycle.

Another and more general object is to provide a machine tool of the character specified and which is compact and does not have substantial overhang of the parts and therefore possesses maximum rigidity and strength, thus insuring the accuracy of the machine and its efficiency of operation because of the reduction of torsional moments during machine operation.

Another object is to provide a machine tool of the character referred to which is so designed and proportioned as to clearances and size to enable the machine to operate on workpieces of a wide range of different sizes and including relatively large size workpieces, whereby the utility range of the machine is increased thus effecting savings in equipment cost.

A still further object is to provide a machine tool of the type specified which is so designed as to facilitate the tooling of the machine and thus tooling costs are maintained at a minimum.

An additional object of the invention is to provide a machine tool of the type defined above in which the direction of rotation of the spindle and the feed train may be readily reversed thereby facilitating threading and tapping operations of both left-hand and right-hand threads.

Another object of the invention is to provide a machine tool as specified above employing a reversible electric motor for driving the spindle and the feed train with means to automatically reverse the direction of rotation of the motor at preselected times in the operative cycle or cycles of the tool thereby facilitating threading and tapping operations of both left-hand and right-hand threads.

The invention further resides in various novel features of construction and combination and arrangements of parts which comprise further objects and advantages as will be apparent to those skilled in the art from the following disclosure of the present preferred embodiment of the invention, described with reference to the accompanying drawings, in which identical parts are designated by the same reference characters and in which:

Fig. 5 is a developed sectional view on a larger scale of the change speed transmission to the spindle;

Fig. 6 is a detailed sectional view taken on line 6—6 of Fig. 5, looking in the direction indicated by the arrows;

Fig. 7 is a developed sectional view of the feed train conditioned for drive from the spindle when the latter is rotated in the reverse direction, the gearing connections to the rapid traverse motor shaft also being shown;

Fig. 7A is a developed sectional view of the left-hand portion of the feed train illustrated in Fig. 7 but arranged for drive from the spindle when the latter is rotated in the forward direction;

Fig. 8 is an end elevational view looking from the left-hand side of Fig. 7;

Fig. 9 is a detached fragmentary sectional view through the knob and the door which carries it and which are shown in Fig. 8 in elevation;

Fig. 10 is a detached sectional view of the mechanism for shifting the two-step gear cone shown on the stub shaft in Fig. 5 and employed for imparting the "High" and "Low" speed ranges to the spindle;

Fig. 10A is a detached fragmentary sectional view taken substantially on the line 10A—10A of Fig. 10 and looking in the direction indicated by the arrows;

Fig. 11 is an elevational view of a portion of the front of the headstock and is taken looking from the left-hand side of Fig. 10;

Fig. 12 is a sectional view showing the drive train from the rapid traverse motor shaft to the actuating cam drum for moving the tool carrier and also showing the indexing motor for the tool carrier and a portion of the indexing drive from the latter motor to the tool carrier;

Fig. 15 is a view of the tool carrier and actuating cam drum shown partly in section and partly in end elevation as seen when looking from the right-hand side of Fig. 13;

Fig. 16 is a detached fragmentary sectional view taken on line 16—16 of Fig. 15, looking in the direction of the arrows;

Fig. 19 is a sectional view taken on line 19—19 of Fig. 17, looking in the direction of the arrows;

Fig. 20 is a detached sectional view taken along line 20—20 of Fig. 19, looking in the direction of the arrows;

Fig. 21 is a fragmentary sectional view taken substantially on line 21—21 of Fig. 20, looking in the direction of the arrows;

Fig. 22 is a detached elevational view of one of the cross slide solenoids and of certain parts operated thereby;

Fig. 23 is a fragmentary end elevational view looking at the control turret on the end of the tool carrier, with certain of the parts broken away and with other of the parts shown in section;

Fig. 24 is a fragmentary sectional view through the cam ring controlling drum, the view being taken substantially on the irregular line 24—24 of Fig. 23 as seen when looking in the direction of the arrows;

Fig. 25 (Sheet 6) is a fragmentary view, as seen from the line 25—25 of Fig. 23 when looking in the direction of the arrows, and with certain operating levers removed;

Figs. 26 to 28 inclusive (Sheet 11) are detached transverse sectional views and Fig. 29 is a side elevational view of the wide non-adjustable cam ring shown mounted on the control drum in Fig. 24, the views illustrating the different angular positions of the five cam lugs on the circumference of the ring.

Figure 45:
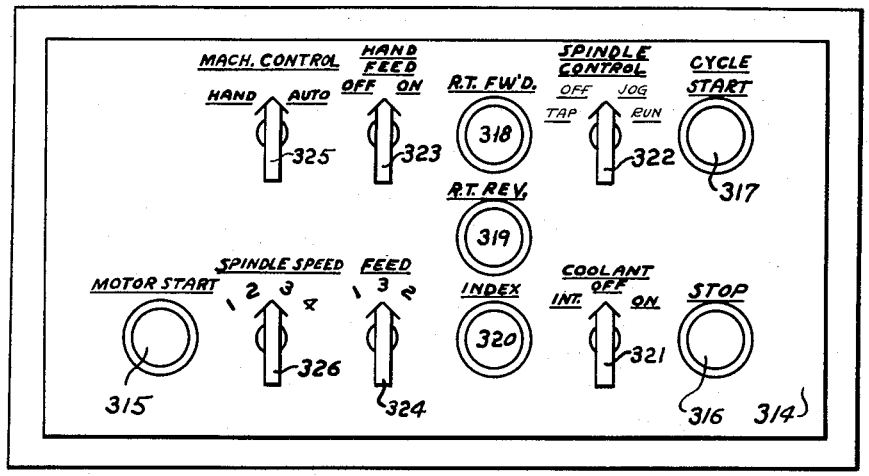
Figure 46:
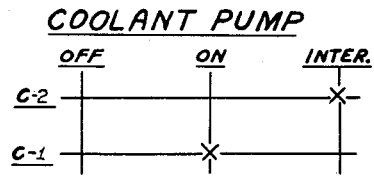
Figure 49:
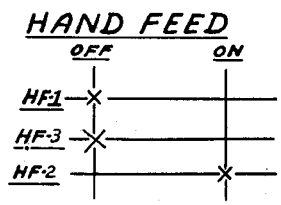
Figure 47:
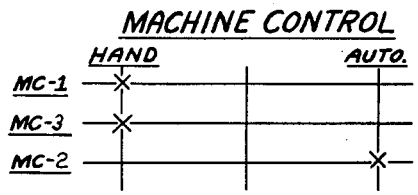
Figure 50:
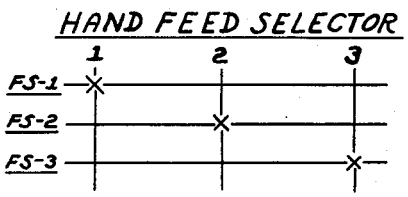
Figure 48:
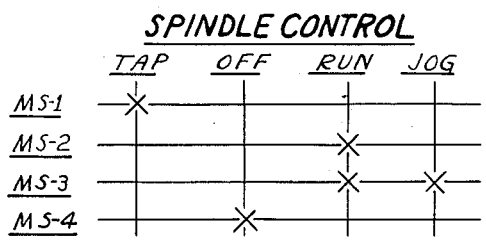
Figure 51:
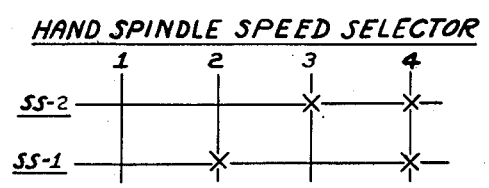

Figs. 30 to 32 inclusive are sectional views showing, in side elevation, the three adjustable narrow cam rings mounted on the control drum shown in Fig. 24 and illustrating the positions of the cam lugs on said rings;

Figs. 33 to 35 inclusive (Sheet 12) show the indexing cams and the relationship they have to each other and to the indexing disk during the indexing cycle for the carrier;

Fig. 36 is a sectional view through a portion of the indexing mechanism for the tool carrier, the control turret carried by said carrier, the index control drum rotatably supported by the carrier, and the mechanisms operated by said turret and drum;

Fig. 37 is a plan view as seen from the line 37—37 of Fig. 36 when looking in the direction of the arrows, with the operating levers removed;

Fig. 38 is a sectional view taken substantially on line 38—38 of Fig. 36, looking in the direction of the arrows, with a portion of the index control drum shown in end elevation;

Fig. 39 is a sectional view through the control turret and its associated switch box, taken substantially on line 39—39 of Fig. 36, looking in the direction of the arrows;

Figs. 40 to 43 inclusive (Sheet 8) are partly elevational and partly sectional views through the solenoid actuated valves for controlling the hydraulic clutches in the spindle drive transmission, with the several views showing different operative positions of the various valves;

Fig. 44 (Sheet 12) is a timing chart illustrating the operational relationships of the tool carrier and the cross slides for either "Early" or "Late" cross slide actuation;

Fig. 45 (Sheet 14) is a front elevational view of the control panel mounted on the front of the headstock;

Figs. 46 to 51 inclusive are diagrams of the positions of the contacts for the different positions of the manually settable switches shown in Fig. 45; and Figs. 52 to 55 inclusive comprise a wiring diagram of the D. C. and A. C. electrical power and control circuits for the machine.

The main elements or portions of the machine tool will first be described with particular reference to Figs. 1 to 4 inclusive. As will be seen therefrom, the machine comprises a base 60, which supports the pan 61 and the vertically extending frame and housing portions, the part of which below the spindle may be termed the bed 62 while the remaining and upper part can be designated as the headstock 63. The headstock rotatably supports a spindle 64 which is provided on its outer end with a suitable chuck 65 as is well understood in the art. The spindle will be called a work spindle, herein, but it will be understood that it might be used as a tool spindle in certain instances. Likewise, the chuck 65 will be called a work chuck although it might be used as a tool chuck.

The headstock 63 also supports a carrier 66 for reciprocating movement and indexing rotation. This carrier will be termed a tool carrier herein, although it will be understood that in some instances it may function as a work carrier. The carrier 66 is provided on its right-hand end (as viewed in Fig. 1) with an axially elongated polygonal turret portion 67 provided with means for adjustably mounting tools thereon. Therefore, while the amplitude of the reciprocating movement of the carrier is constant, different lengths of cuts can be obtained by adjusting the cutting tools axially of the faces on the turret portion 67. The left-hand end of the carrier mounts a control turret 68.

The bed 62 is provided on its right-hand side (as viewed in Fig. 1) with an extension 69 having on its upper surface upwardly inclined ways on which slide the front cross slide 70 and the rear cross slide 71.

The machine further includes a main motor 72 mounted on the base 60 exteriorly of the bed 62. The main motor 72 is of the reversible constant speed type and has its shaft coupled to a main drive shaft 73 extending into the bed 62 and rotatably supported therein in suitable bearings, see Fig. 5.

It will be noticed that the machine in its entirety is compact and provides for minimum overhang of the various portions or parts thereof, thus improving the rigidity of the machine and lessening torsional moments therein during operation, and hence improving the accuracy and the efficiency of the machine.

*Spindle drive transmission*

The shaft 73 has a gear 74 freely rotatable thereon, see Fig. 5, and this gear is provided with a sleeve portion carrying a friction clutch plate 75. The shaft 73 also has a gear 76 freely rotatable thereon in spaced relationship to the gear 74, the gear 76 also having a sleeve portion which carries a friction clutch plate 77. Intermediate the adjacent ends of the sleeve portions of the gears 74 and 76 a clutch housing member 78 is fixed on the shaft 73 to rotate therewith. This member 78 carries, at one end thereof, a series of friction clutch plates 79 adapted to cooperate with the clutch plate 75 and, at the other end thereof, a series of clutch plates 80 adapted to cooperate with the clutch plate 77.

The clutch housing member 78 is also provided with circular recesses which slidably mount ring pistons or clutch actuators 81 and 82 having portions adapted to engage the adjacent clutch plates 79, 80 and move them into driving engagement with the clutch plates 75 and 77, respectively. The clutch actuators 81 and 82 are normally held in inactive position by springs 83 but are adapted to be selectively moved by pressure fluid against the action of said springs to effect driving engagement of the clutch plates, wherefore the gear 74 or the gear 76 can be selectively clutched to and driven by the shaft 73.

The bed 62 is provided with passages 84 and 85 which are connected to a source of pressure fluid as will later be explained. The passage 84 communicates with a circumferential groove 86 formed in the shaft 73. The groove 86 communicates with a passage 87 in the shaft 73 and the passage 87 in turn communicates with a groove 88 formed in the periphery of the shaft and extending axially thereof into communication with a port 89 extending to the recess in which is mounted the piston or actuator 81. The passage 85 in the bed 62 communicates with an annular peripheral groove 90 in the shaft 73 and this groove is connected by a passage 91 in said shaft to an axially extending peripheral groove 92. The groove 92 in turn communicates with a port 93 extending to the recess in which is mounted the piston or actuator 82.

It will thus be seen that when pressure fluid is supplied to passage 84 the piston or actuator 81 will be moved against its spring 83 to engage the clutch plates 75 and 79 to clutch the gear 74 to the shaft 73. It will also be seen that when pressure fluid is supplied to the passage 85 the piston or actuator 82 will be moved against its spring 83 to engage the clutch plates 77 and 80 to clutch the gear 76 to the shaft 73. The control for the supply and the draining of pressure fluid to and from the passages 84 and 85 will be explained in detail hereinafter. The clutches for connecting the gears 74 and 76 to the shaft 73 will be referred to hereinafter, respectively, as clutches C2 and C1.

The gear 74 meshes with a gear 94 fixed on a shaft 95. This shaft is rotatably supported in the bed and also has a gear 96 fixed thereon which meshes with the gear 76 on shaft 73. The shaft 95, beyond the gear 94, extends into a chamber formed exteriorly of the bed and normally closed by a removable cover plate. This extended portion of the shaft has splined thereon a gear 97 which meshes with a larger gear 98 splined on a rotatable shaft 99 supported by the bed and extending from the interior thereof into said chamber. The gears 97 and 98 are pickoff gears and, as is well understood, can be removed and a set of gears of a different ratio applied to the shaft 95 and 99. The inner or right-hand end of the shaft 99, as viewed in Fig. 5, has formed thereon an enlarged cup-shaped portion 100 carrying on its circumference a series of clutch plates 101. The gear 96 meshes with a gear 102 freely rotatable on a shaft 103 which is rotatably supported in the bed and has its left-hand end, as viewed in Fig. 5, extending into and rotatably supported in the cup-shaped portion 100 of the shaft 99. The gear 102 has a sleeve portion which is provided on its periphery with a clutch plate 104.

A clutch housing member 105, similar to the clutch housing member 78, is keyed to the shaft 103 intermediate the cup-shaped portion 100 of the shaft 99 and the sleeve portion of the gear 102. The clutch housing member 105 is tubular at its opposite ends and overlies or surrounds the cup-shaped portion 100 and the sleeve of the gear 102 with the respective tubular ends of the member 105 provided internally with clutch plates 106 and 107 adapted to cooperate, respectively, with the clutch plates 101 and 104. The clutch housing member 105, internally and adjacent its tubular ends, is provided with annular recesses in which clutch actuators or pistons 108 and 109 are slidably mounted to be selectively moved by pressure against the action of springs 110 to engage the clutch plates 101 and 106 to clutch the shaft 103 to the shaft 99 or to engage the clutch plates 104, 107 to clutch the gear 102 to the shaft 103.

The shaft 103 extends into a block 111 secured to an interior wall of the bed and provided with passages 112 and 113 which are adapted to be connected to a source of pressure fluid as will later be explained. The passage 112 communicates with an annular peripheral groove 114 formed in the shaft 103 and said groove 114 is in communication with the hollow interior 115 of the shaft 103 by means of a port 116. The hollow interior 115 of the shaft 103 extends axially of the shaft and communicates by means of a port 117 formed in the shaft, with an axially extending peripheral groove 118, also formed in the shaft. The groove 118 communicates through a port 119 formed in the clutch housing member 105 with the recess therein in which is mounted the piston actuator 108. A tube 120 extends axially of the hollow interior 115 of the shaft 103 beyond both the ports 116 and 117 and is supported in spaced relationship to the wall of the hollow interior by means of suitable supporting and sealing sleeves 120a and 120b located in the hollow interior. The right-hand end of the hollow interior of the shaft 103, beyond the end of the tube 120, is closed by a suitable removable closure plug. The passage 113 communicates with an annular peripheral groove 121, formed in the shaft 103, and communicating in turn with the hollow interior 115 of said shaft, adjacent the end thereof, by means of a port 122. Inasmuch as the said port 122 is adjacent the outer end of the sealing sleeve 120a which supports the tube 120, it will be seen that said port is in communication with the interior of the tube 120 extending through the shaft. The left-hand end of the tube 120 being beyond the left-hand supporting sleeve 120b, the tube is sealed from the port 117 but is in communication with a port 123 formed in the shaft 103. The port 123 in turn communicates with an axially extending peripheral groove 124 which is formed in the shaft 103 and is in communication with a port 125 formed in the housing 105 and extending to the recess in which the piston actuator 109 is mounted.

From the foregoing it will be apparent that if fluid under pressure is supplied to the passage 112 the piston actuator 108 will be moved against the action of the spring 110 to interengage the clutch plates 101 and 106 thus clutching the shafts 99 and 103 together, it being understood that at such time the passage 113 is connected to drain. When the supply of fluid under pressure is connected to the passage 113 and the passage 112 is connected to drain, then the fluid is supplied through the tube 120 to move the piston actuator 109 toward the right, as viewed in Fig. 5, against the motion of its spring 110, to thus engage the clutch plates 104 and 107 to clutch the gear 102 to the shaft 103. The clutches for connecting the shaft 99 to the shaft 103 and for connecting the gear 102 to the shaft 103 hereinafter will be designated, respectively, as clutches C3 and C4. The means for controlling the supply of fluid under pressure to the passages 112 and 113 and for connecting said passages to drain will be described hereinafter.

From the description thus far given it will be noted that the shaft 95 can be driven from the shaft 73 at either one of two different speeds depending upon whether the gear 74 or the gear 76 is clutched to the shaft 73 by the clutch C2 or clutch C1. It will also be understood that if the shaft 99 is clutched to the shaft 103 by the clutch C3 then said latter shaft can be driven from the shaft 95 at one or the other of two different speeds. Likewise if the gear 102 is clutched to the shaft 103 by the clutch C4, and the shaft 99 is disconnected from the shaft 103, then the shaft 103 can be driven from the shaft 95 through the gear 96 at either one of two additional different speeds. Consequently, the shaft 103 can be driven from the main drive shaft 73 through selective engagement of the clutches C1, C2, C3 or C4 previously described at any one of four different speeds.

The shaft 103, intermediate the gear 102 and the block 111, has an elongated gear 126 fixed to it which gear meshes at all times with the larger gear 127 of a two-step gear cone that is endwise shiftable on a stub shaft 128 mounted in the bed. The larger gear 127 of the said two-step gear cone can be intermeshed with a gear 129, fixed on the spindle 64, or the gear cone can be axially shifted to disengage the gears 127 and 129 and intermesh the smaller gear 130 of the gear cone with the larger gear 131 which is also fixed to the spindle 64 adjacent to the smaller gear 129. When the two-step gear cone is shifted to intermesh the gears 127 and 129, the spindle 64 can be driven from the shaft 103 at any one of four different speeds in the "High" speed range while when said cone is shifted to intermesh the gears 130 and 131 the spindle 64 can be driven from the shaft 103 at any one of four different speeds in the "Low" speed range. The effect of this arrangement is that the spindle 64 can be driven at any one of eight different speeds, four in the "High" speed range and four in the "Low" speed range.

The driving of the spindle in either the "High" or "Low" speed range is effected manually by the arrangement for shifting the two-step gear cone now about to be described, while the driving of the spindle at any one of four different speeds in either range is effected manually or automatically by an arrangement which will be set forth in detail hereinafter. Also the pickoff gears 97 and 98 provide for additional variations of the spindle speeds.

Figure 2:
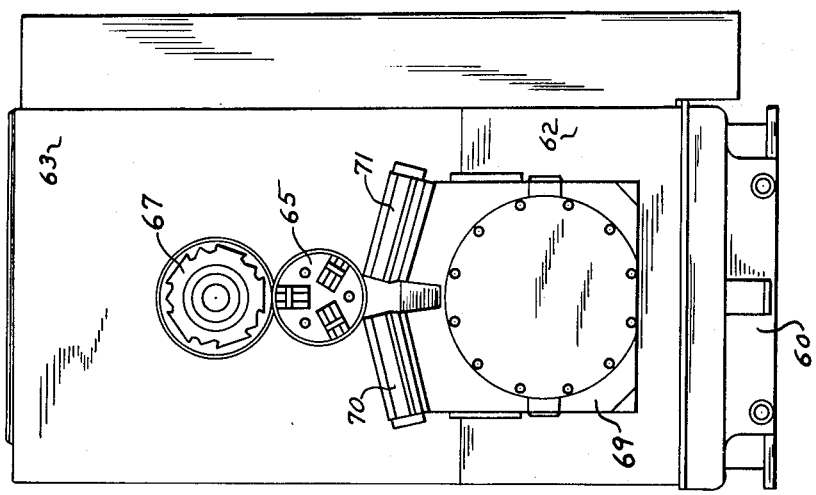
Fig. 2 is an end elevational view thereof looking from the right-hand side of Fig. 1.
Figure 1:
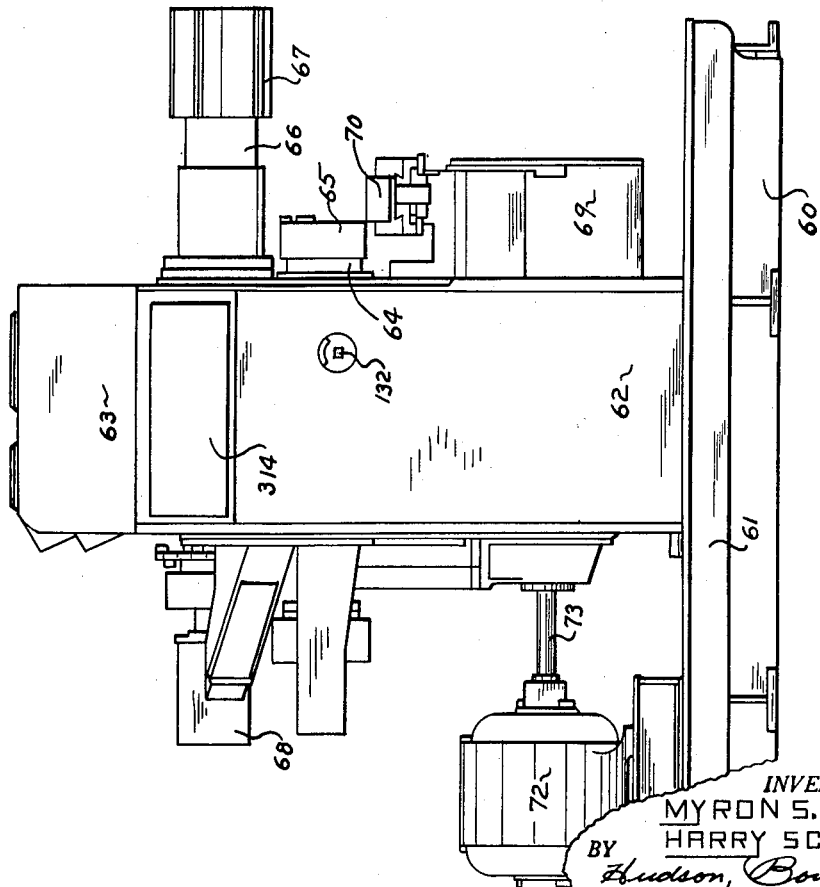
Fig. 1 is a front elevational view of the machine tool.

The front wall of the headstock 63 rockably supports a shaft 132, the outer end of which is squared for the reception of a wrench and is accessible from the front of the machine, see Figs. 1, 10 and 11. The outer or left-hand end of the shaft 132 extends through a hollow housing portion of the headstock wall and through an opening in the front of the headstock and has a disk 133 slidably and non-rotatably mounted on the squared portion of the shaft, the disk being normally held in its most left-hand position against the inner side of the front of the machine by means of a spring 134. The disk 133 is provided with two arcuately spaced openings or keyways 135, selectively interengageable with the head of a cap screw or key 136 to retain the disk 133 and the shaft 132 against rocking movement out of either the "High" or "Low" speed range position.

Referring particularly to Fig. 10, it will be understood that when a wrench is applied to the outer end of the shaft 132 and the disk 133 is moved against the action of the spring 134 inwardly, or toward the right, to disengage the particular opening or keyway 135 from the head of the screw or key 136, the disk and the shaft 132 are freed for rocking movement to shift the two-step gear cone on the shaft 128. When the shifting has been accomplished and the wrench removed, the disk 133 will again be moved outwardly by the spring 134 to interengage an opening or keyway 135 with the head of the screw 136 thus locking the disk and shaft against rocking movement. The rocking movement of the shaft 132, by means of a wrench or other tool to obtain either "High" or "Low" speed range for the spindle, is transmitted to the two-step gear cone by an arm 137 which is connected at its inner end to the shaft 132 and has a shoe 138 at its free end engaging in the annular groove 139 of the two-step gear cone, see Figs. 5, 10 and 11.

It will be noted by reference to Fig. 5 that the larger gear 127 of the two-step gear cone limits shifting movement of the cone toward the right when the smaller gear 130 is to be intermeshed with the gear 131, while the left-hand end of the gear cone will engage the wall of the headstock and limit left-hand shifting movement of the cone in intermeshing the gears 127 and 129. Hence when the gear cone is shifted to either one of its two operative positions, an opening 135 in the disk 133 will be aligned with the head of the screw or key 136 to be interlocked therewith as the disk moves outwardly under the action of the spring 134 upon the removal of the actuating wrench.

It will be noted that when the power drive to the spindle 64 is interrupted by the disengagement of the clutches C1 and C2, the rotation of the spindle can be braked by the concurrent engagement of clutches C3 and C4, since the gear ratios between the shafts 95 and 99 and the shafts 95 and 103 are different and hence effect a braking action on the rotation of the spindle when simultaneously connected.

*Feed transmission*

The feeding movements imparted to the tool carrier or to the cross slides are in timed relation to the rotation of the spindle since the feed train is driven from the spindle by a gear 140 fixed to the spindle, see Fig. 8. Thus, the gear 140 constantly meshes with a gear 141 fixed to one end of a short shaft 142 that is rotatably supported in the headstock, see Fig. 7. The opposite end of the shaft 142 has a gear 143 fixed thereto which constantly meshes with a gear 144 that is freely rotatable on a stud shaft 145. The gear 144 constantly meshes with the larger gear 146 of a two-gear cluster that is freely rotatable on a shaft 147 rotatably mounted in the bed. The smaller gear 148 of said two-gear cluster constantly meshes with a gear 149 that is fixed to a rotatable shaft 150 supported in the wall of the bed.

The shaft 147 is one of a plurality of shafts 147, 149a, 149b, 161 and 167, which are grouped about and substantially surround the shaft 150 and are selectively driven thereby to provide the plurality of feeding rates. For this purpose the outer ends of the shafts are provided with removable pickoff gears to provide the desired ratios and direction of rotation. Thus, when the spindle 64 is driven for rotation in the forward direction the shaft 150 has the pickoff gears 151, 152 and 153 splined thereto as shown in Fig. 7A. The pickoff gear 151 meshes with a pickoff gear 154 splined to the shaft 147. The shaft 147 has fixed thereto a gear 155, Fig. 7, which meshes with a gear 156 freely rotatable on a shaft 157. The gear 156 has an elongated sleeve portion 156a on which is keyed the ring 158 of a magnetic clutch F3. This magnetic clutch is provided with a second ring 159 keyed to the shaft 157, wherefore when the clutch coil is energized the driving of the gear 156 by the gear 155 results in driving the shaft 157.

The pickoff gear 152 on the shaft 150 meshes with a pickoff gear 160 splined in the shaft 161, which is another of the shafts extending parallel to and surrounding the shaft 150. The shaft 161 has fixed to its inner end a gear 162 which meshes with a gear 163 fixed to a ring 164 freely rotatable on the shaft 157 and forming part of a magnetic clutch F2. The magnetic clutch F2 also includes the ring 165 keyed to the shaft 157, wherefore when the coil of said clutch is energized rotation of the shaft 161, gear 162 and gear 163 imparts rotation to the shaft 157.

The pickoff gear 153 on the shaft 150 meshes with a pickoff gear 166 splined to the shaft 167, see Fig. 7, and which is another of the shafts previously referred to as surrounding the shaft 150. The shaft 167 has fixed thereto a gear 168 which meshes with a gear 169 secured to a ring 170 freely rotatable on the shaft 157 and forming part of a magnetic clutch F1. The magnetic clutch F1 includes the ring 165, keyed to the shaft 157, so that the ring 165 forms part of the magnetic clutch F2 as well as of clutch F1. Hence, it will be seen that, when the magnetic clutch F1 is energized, the shaft 167 drives the shaft 157 through the gears 168 and 169.

From the foregoing it will be evident that the shaft 157 can be rotated by the spindle and in the same direction at any one of three different feeding rates depending upon which of the magnetic clutches F1, F2 or F3 is energized. It will also be understood that these three different feeding rates can be varied by changing the pickoff gears on the shafts 150, 147, 161 and 167, access to which pickoff gears is obtained by opening the door 171, see Figs. 7, 7A, 8 and 9.

The previously mentioned shafts 149a and 149b are provided for the purpose of providing rotation of shaft 157 in the opposite direction to that of the spindle 64. For example, when performing left-hand threading or tapping operations the spindle 64 will be rotated in a reverse direction to its normal direction of rotation but the feeding movement of the carrier must still be in the same direction as when the spindle is rotating in the usual forward direction. This may be accomplished by replacing the pickoff gears shown in Fig. 7A with those shown in Fig. 7. Thus, gears 151 and 152 on shaft 150 are removed, gear 160 on shaft 161 is replaced by gear 149c, gear 154 on shaft 147 is replaced by gear 149d, a gear 149e is splined on shaft 149a, and a gear 149f is splined on shaft 149b. Gears 153 and 166 on shafts 150 and 167, respectively, are allowed to remain. In addition to the aforementioned, it will be observed that the shaft 149a has a gear 149g keyed thereon and the shaft 149b has a gear 149h keyed thereon.

The gear 149 meshes with both gears 149g and 149h so that shafts 149a and 149b are continuously driven when the spindle 64 is rotated. When the spindle is rotated in a forward direction the gears 149e and 149f are not in place and hence the rotation of the shafts 149a and 149b is then without effect. However, when the spindle 64 is rotated in the reverse direction and gears 149e and 149f are in place, shafts 147 and 161 are rotated since the gear 149e meshes with gear 149d and gear 149f meshes with gear 149c. Consequently, shaft 157 may be selectively driven at either of two different feeding rates by selective energization of clutches F2 and F3 as previously described, it being understood that the rotation of shaft 157 is still in a forward direction even though the spindle is rotating in the reverse direction. Since gears 153 and 166 were also retained, the shaft 157 may also be rotated in a reverse direction, i. e., in the same direction as the spindle, under control of clutch F1.

The previously mentioned door 171, providing access to the pickoff gears, carries a knob 172 fixed to a rotatable knob spindle 173 provided with a threaded portion 174 that can be screwed into a threaded opening in the wall of the bed to hold the door 171 in closed position, see Fig. 9. When the threaded portion 174 is thus screwed into the threaded opening the inner end of the knob spindle 173 engages and moves the button of a normally open switch FDLS to close the contacts thereof as long as the door is secured in closed position. Whenever the door is opened said normally open switch automatically interrupts the circuit to prevent operation of the work spindle and the feed transmission as will later be pointed out.

The shaft 157 has a gear 175 fixed to its right-hand end, as viewed in Fig. 7, which gear meshes with a gear 176 fixed to a rotatable shaft 177 mounted in the bed. The shaft 177 also has a gear 178 fixed thereto. The gear 176 meshes with a gear 179 fixed to the shaft 180 of the reversible rapid traverse motor 181, see Fig. 12, Sheet 6. The gear 178 meshes with a gear 182 fixed on a rotatable shaft 183 which also has a gear 184 fixed thereto, the latter gear being constantly in mesh with a gear 185 fixed to the actuating cam for the cross slides and which will be referred to later, see Fig. 19, Sheet 10.

The shaft 180 of the rapid traverse motor 181, in addition to having the rotor of the motor fixed thereto, has a collar 186 fixed thereon which collar on its right-hand or inner side is provided with a plurality of projecting pins 187. Intermediate the collar 186 and the motor housing, the shaft 180 freely rotatably mounts a pair of disks 188 and 189, the adjacent faces of which are in contact with each other and said disks are held in contact with the housing 190 of a brake for the shaft 180 by means of a number of coil springs 191 carried by the collar 186. The brake is a magnetic brake with the coil thereof indicated in Fig. 12 as RTB and said brake will hereinafter be referred to as the rapid traverse brake. The pins 187 carried by the collar 186 extend through openings in the disks 188 and 189 and hence rotation of the collar 186 with the motor shaft 180 imparts rotation to said disks but as soon as the coil RTB is energized said disks are held against rotation and thus the rotation of the shaft 180 is braked.

The gear 179 on the rapid traverse motor shaft 180 meshes with the larger gear 192 of a two gear cluster, the smaller gear 193 of which meshes with gear 194 fixed to one end of a shaft 195 the opposite end of which has fixed thereto a gear 196. The gear 196 meshes with a gear 197 fixed to the actuating cam drum 198 that is freely rotatable on shaft 199 but is held against endwise movement thereon. The drum 198 is provided with a spiral cam groove 200 with said groove having a dwell portion 200a at one end. The gear 197 has fixed thereto a gear 201 which meshes with a gear 202 fixed to the cam ring control drum shaft 203 and later to be referred to.

It will be seen that the actuating cam drum 198 can be rotated in opposite directions at a rapid traverse rate by the reversible rapid traverse motor 181 or it can be rotated in either direction at various feeding rates as hereinafter described. It will be understood that whenever the actuating cam drum 198 is being driven at either feed or rapid traverse rates, then the rapid traverse brake RTB will be deenergized and the brake is released. During feed drive the shaft 180 and the rotor of rapid traverse motor 181 rotate idly.

*Tool carrier*

Figure 13:
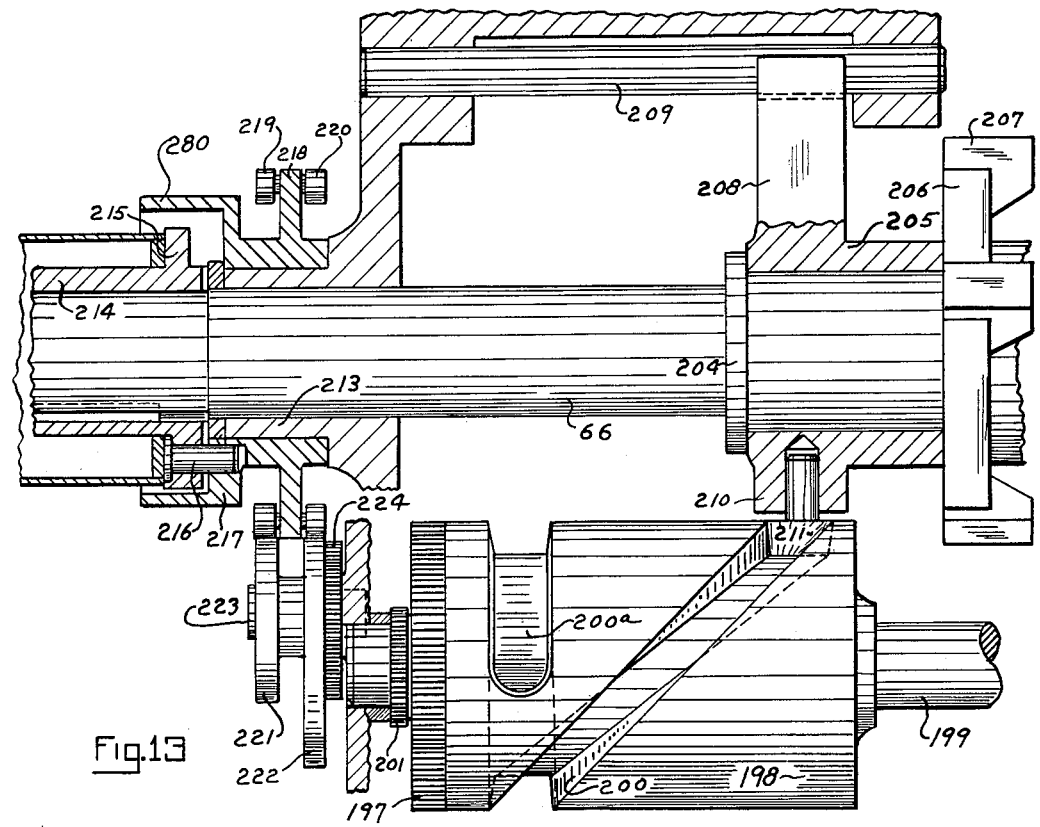
Fig. 13 is a sectional view showing a portion of the tool carrier with the actuating cam drum for reciprocating the same and also the indexing mechanism for indexing the carrier, the tool carrier and the other parts being shown in the relationship they have for the indexing operation, the section being taken along line 13—13 of Fig. 15 (Sheet 8) looking in the direction of the arrows.
Figure 14:
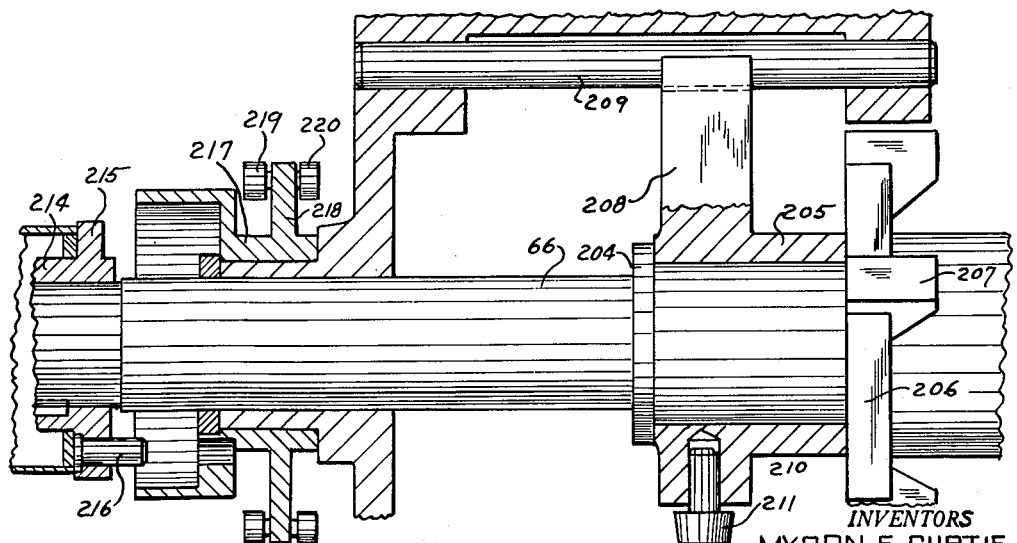
Fig. 14 is a view similar to Fig. 13 with certain of the parts omitted and with the tool carrier shown at an intermediate position during its reciprocating movement.
Figure 17:
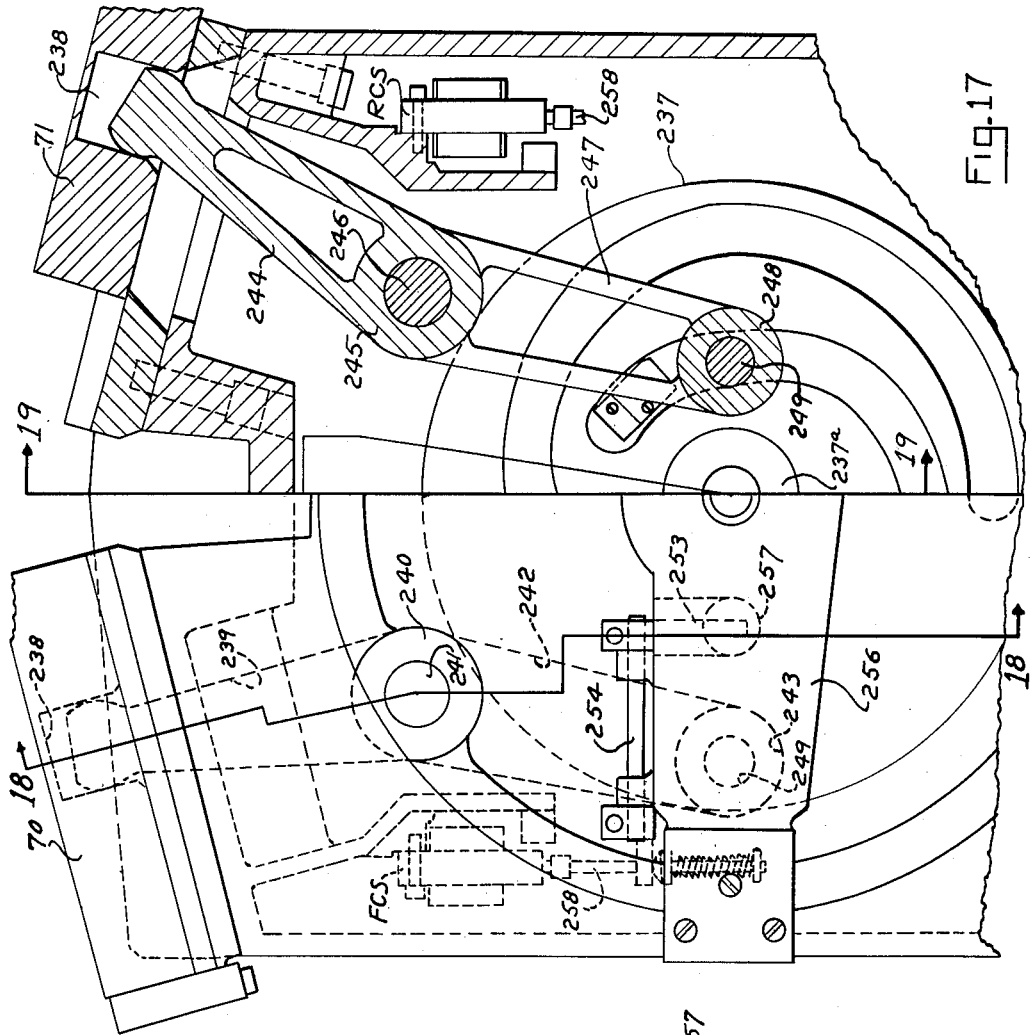
Fig. 17 is a view of the cross slides and the operating mechanism therefor and is partially in side elevation and partially in section.

Referring to Figs. 13 and 14 (Sheet 7) it will be seen that the tool carrier 66 is provided, intermediate its ends, with a shoulder 204 against which and surrounding the shaft is mounted a motion transmitting member 205. This member is retained against the shoulder 204 by means of a spider 206 having thereon a plurality of projecting lugs 207 corresponding in number and spacing with the faces of the polygonal tool mounting portion 67 of the tool carrier. The spider 206 is fixed to the tool carrier 66 and hence reciprocates and indexes with said carrier. The motion transmitting member 205 is provided with an outwardly extending arm 208 having a forked outer end straddling a guide bar 209 that is fixedly mounted in the walls of the headstock. In addition, the member 205 is provided with a boss 210 which carries a pin or stud having a roller 211 that engages in the spiral groove 200 of the actuating cam drum 198, wherefore rotation of this cam drum in either direction causes axial movement of the member 205 and the carrier 66, as well as the spider 207.

When the tool carrier 66 moves axially from its most right-hand or indexing position toward the left, as viewed in the drawings, the spider 206 moving with the carrier, carries that lug 207, which is aligned with a horizontal longitudinally extending guideway 212, to enter the said guideway, such entrance being facilitated by the flared end of the latter, see Figs. 15 and 16. As soon as the lug 207 has entered the guideway 212 rocking movement of the carrier 66 is prevented and hence tools carried on the portion 67 will be accurately held during their cutting periods in a machining operation.

The carrier 66 extends beyond a supporting boss 213 of the headstock and is provided on said extension with a sleeve 214 that is keyed to the carrier and connected with the control turret 68. A flange 215 on the sleeve carries a pin or stud 216 adapted to be received within an opening provided in an indexing member 217 that is freely rotatable on the exterior of the boss 213 but is held against endwise movement thereon, see Fig. 14. The indexing member 217 has an indexing flange or disk 218 provided on its opposite faces with a plurality of equally and circularly spaced cam followers 219 and 220, with the cam followers 219 on one face staggered circularly with respect to the cam followers 220 on the other face (see Figs. 13 and 14, Sheet 7; Fig. 23, Sheet 11; and Figs. 33, 34 and 35, Sheet 12).

The cam followers 219 and 220 cooperate respectively with cams 221 and 222 keyed to a shaft 223 rotatably supported in the headstock. The cams 221 and 222 are identical in shape, but are angularly displaced and oppositely disposed and, as stated, have peripheries cooperating with the cam followers, wherefore rotation of the shaft 223 will cause the cams to index the indexing member 217 and, through its connection with the sleeve 214 by the pin 216, to index said sleeve and the carrier 66. The cam 222 at the start and at the completion of its indexing rotation actuates a double contact limit switch GLS, see Fig. 23, for a purpose later to be explained. Since indexing is effected when the pin 216 is engaged with the member 217, the lugs 207 are then all beyond the guideway 212. Hence the cams 221 and 222 also function to lock the member 217 and the carrier 66 in an indexed position, as shown in Fig. 13, and prevent improper rotation thereof. Inasmuch as the construction of the cams 221 and 222 and the manner in which they function to index the member 217 are fully set forth and explained in the copending application of Myron S. Curtis, Ser. No. 684,594, filed July 18, 1946, and issued as Patent No. 2,560,686 on July 17, 1951, the details of the peripheries of said cams need not be explained herein, reference being had to said patent for that purpose. It is sufficient here to note that each cam periphery includes a driving portion, an arcuate portion, a restraining or regulating portion and a second driving portion, with the said restraining or regulating portion and the second driving portion connected by a portion having a curvature substantially equal to that of the cam followers, while the two driving portions are united by a second arcuate portion having a central radius of curvature greater than the first mentioned arcuate portion.

It will be understood that when one cam is in driving contact with a cooperating cam follower the other cam will have a regulating or restraining effect on an adjacent cam follower and therefore the member 217 and the carrier can be rotated or indexed only under control of the cams and cannot overrun or otherwise independently rotate due to any unbalanced weight distribution. Reference to Figs. 33 to 35 inclusive, Sheet 12 of the drawings, taken in conjunction with the description set forth in said Patent No. 2,560,686 clearly and fully brings out the function and purpose of the cams 221 and 222.

It will be noted, as mentioned above, that as the carrier 66 moves axially from the indexing position, shown in Fig. 13, the pin 216 is disengaged from the member 217 and hence the said member and the indexing mechanism are disconnected from the carrier during the reciprocation thereof. During the first part of this reciprocating movement of the carrier it will also be remembered that one of the lugs 207 has moved within the guideway 212 and continues therein thus maintaining the pin 216 in alignment with the opening in the indexing member 217. When the carrier is returned to its most right-hand or indexing position the pin 216 will reenter the opening 217 and the indexing member and mechanism will then be connected to the carrier at which time the lug 207 will have moved out of the guideway 212 and the carrier will be free to be indexed. The parts are so proportioned that the lug 207 will enter the guideway 212 before the pin 216 has completely left the opening in the indexing member 217 and conversely the pin 216 will have entered the opening in the indexing member before the lug 207 has completely left the guideway 212. This insures that the carrier is at all times held against rotation due to any unbalanced condition because of the tools mounted on the portion 67, it being remembered that the cams 221 and 222 cooperate with the cam followers to lock the indexing member 217 against rotation resulting from any unbalanced condition in the weight distribution of the carrier.

The shaft 223 which carries the indexing cams 221 and 222 is driven by a gear 224 keyed to said shaft, see Figs. 12 and 13, and which gear in turn is driven by a gear 225 formed on one end of a sleeve 226 freely rotatable on the shaft 227 of the constant speed non-reversible indexing motor 228. The other end of the sleeve 226 is provided with an internal gear 229 forming part of a gear reduction between the shaft 227 and the sleeve 226. The internal gear 229 constantly meshes with one or more planetary pinions 230 fixed on rotatable stub shafts 231 carried by the stationary housing of the motor 228. The pinion or pinions 230 in turn constantly mesh with a central gear 232 fixed on the shaft 227 of the indexing motor. It will be seen that energization of said indexing motor drives the sleeve 226 through the planetary reduction unit and hence the gear 225 on said sleeve drives the gear 224 on the cam carrying shaft 223 to effect indexing rotation of said shaft and cams.

The end of the indexing motor shaft 227, opposite to the end carrying the sleeve 226, is extended and has fixed thereto a collar 233 similar to the collar 186 on the shaft 180 of the rapid traverse motor 181. This collar 233 is provided with pins similar to the pins 187 and extending into openings in disks 234 and 235 similar to the disks 188 and 189. The disks are normally held in sliding engagement with the brake housing 236 which carries the index brake coil IB, it being understood that when the coil IB is energized the rotation of the disks and motor shaft 227 will be braked as already explained in connection with the braking of the rapid traverse motor. The means for braking the indexing motor will be hereinafter referred to as the index brake and the control for energizing and deenergizing the coil IB will be hereinafter explained. It will be understood that the indexing brake is released at the start of and during the indexing operation and is applied to all other times.

*Drive to cross slides*

Figure 18:
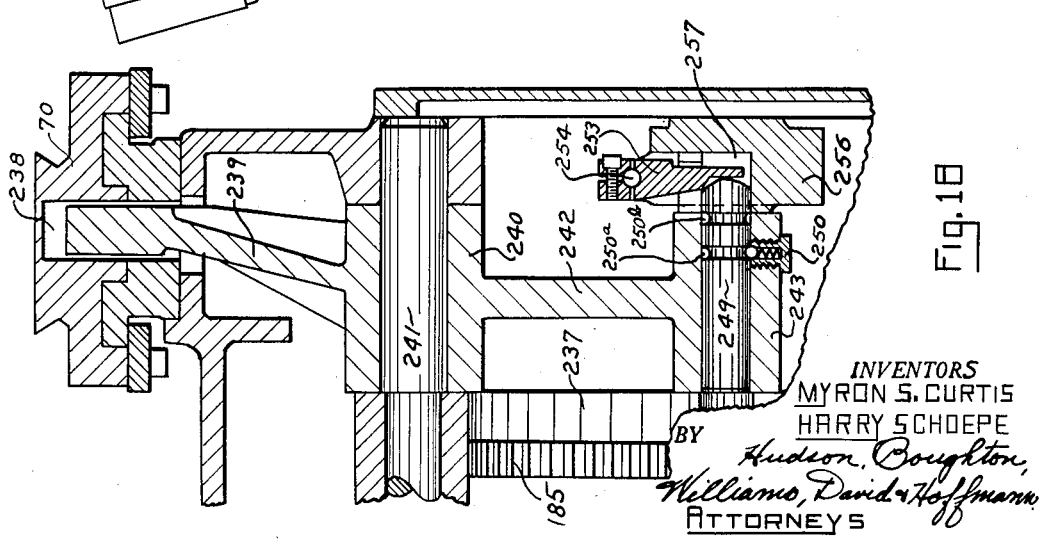
Fig. 18 is a sectional view taken on irregular line 18—18 of Fig. 17 looking in the direction of the arrows.

The front and rear cross slides are actuated by mechanism now to be described and which in turn is driven from the feed transmission shown in Fig. 7 and previously explained, it being recalled that the gear 184 on shaft 183 meshes with gear 185 which has fixed thereto the cross slide actuating cam 237, see Figs. 18 and 19, Sheets 9 and 10. The gear 185 and cam 237 are rotatable on a shaft 237a supported in the bed.

The construction and function of the cross slide actuating cam and the manner in which it is connected to operate either the front or rear cross slide or both is fully disclosed and described in the copending application of Myron S. Curtis and Harry Schoepe, Ser. No. 695,732, filed September 9, 1946, and issued on February 20, 1951, as Patent No. 2,542,399.

As here shown, each cross slide is provided with a recess 238, with the recess in the front cross slide 70 receiving the upper end of the arm 239 of a movement transmitting element or lever 240 which is rockable on a shaft 241 mounted in the bed. The lever 240 has a downwardly extending arm 242 below the shaft 241 and the lower end of said arm is provided with an elongated boss 243 having a bore therethrough. The recess 238 in the rear cross slide 71 receives the upper end of the arm 244 of the lever 245 that is rockable on a shaft 246 mounted in the bed and extending parallel to the shaft 241 but spaced rearwardly of the bed therefrom. The lever 245 also has a downwardly extending arm 247 provided at its lower end with an elongated boss 248 having a bore therethrough. The bosses 243 and 248 of the levers 240 and 245 each slidably mount a pin 249 and these pins are adapted to be selectively engaged with either a cam groove 251 or a cam groove 252 formed in the adjacent face of the cam 237.

The pins 249 are held in either an active or an inactive position by means of a spring pressed ball or point 250 adapted to cooperate with spaced grooves 250a and 250b formed in the pins 249. The pins 249 are moved from their inactive positions to their active positions by means of lever arms 253 contacting the outer ends of the pins, the right-hand ends as viewed in Fig. 18. The lever arms 253 are fixed to shafts 254 that are rockably supported in the bed and have lever arms 255 fixed thereto, see Fig. 22, Sheet 10. The shafts 254 are carried by cross bars 256 and the cross bars 256 are provided with openings or recesses 257 into which the lever arms 253 extend and with which openings the pins 249 register when the cross slides 70 and 71 are in their most outward positions. At this time it will be noted that the pins 249 lock the levers 240 and 245 and thus prevent accidental movement of the cross slides 70 and 71 from their most outward position.

When the shafts 254 are rocked causing the lever arms 253 to move the pins 249 into the cam grooves 251 or 252, the rotation of the cross slide actuating cam 237 will rock the levers 240 and 245 and, as soon as the pins 249 have moved out of registry with the localized openings 257, the adjacent face of the cross bar 256 functions to hold the pins in their active position in the cam grooves 251 and 252.

The lever arms 255 secured to the shafts 254 have their outer ends forked to straddle rods 258, see Fig. 22, which are extensions of the armatures of solenoids for the front and rear cross slides, which solenoids are designated FCS and RCS, respectively. The rods 258 carry slidable heads 259 below the forked ends of the levers 255 which heads are pressed into contact with the lower edges of the levers by springs 260. It will be seen, therefore, that when either of the solenoids FCS and RCS are energized the corresponding rod 258 moves upwardly whereupon the head 259 thereof rocks the associated lever 255, shaft 254 and lever arm 253 to move the corresponding pin 249 from inactive to active position. If for some reason a pin 249 cannot move from inactive to active position when the actuating solenoid is energized, the head 259 will simply act to compress the spring 260 thus preventing damage to the mechanism.

It will be seen that each cam groove 251 and 252 includes a concentric portion extending from the inner end of the groove to the point $a$, an eccentric portion extending from the point $a$ to the point $b$ and a second concentric portion extending from the point $b$ to the outer end of the groove, with the latter concentric portion providing a dwell for the cross slides.

It will be understood that the solenoids FCS and RCS may be selectively energized or simultaneously energized as desired by control mechanism later to be explained to engage the pins with the cam slots. The pins 249 are moved from their engaged or active positions into inactive positions by means of inclined block 261 secured at the inner ends of the cam grooves 251 and 252, see Figs. 20 and 21. As will later be explained, the pins 249 can be moved from inactive to active position, wherein they engage in either the groove 251 or 252, only when the pins register with those concentric portions of said grooves which are adjacent to the inclined blocks 261 and which extend to the point $a$.

*Mechanically operated control switches*

Figure 4:
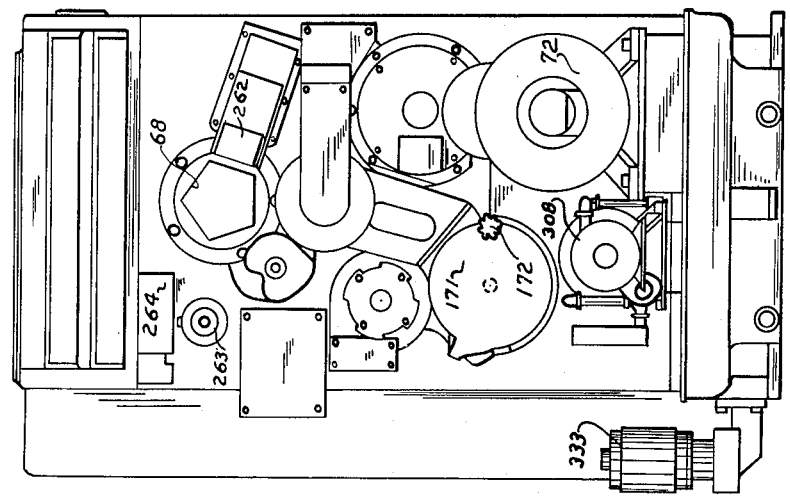
Fig. 4 is an end elevational view looking from the right-hand side of Fig. 3 or the left-hand side of Fig. 1.
Figure 3:
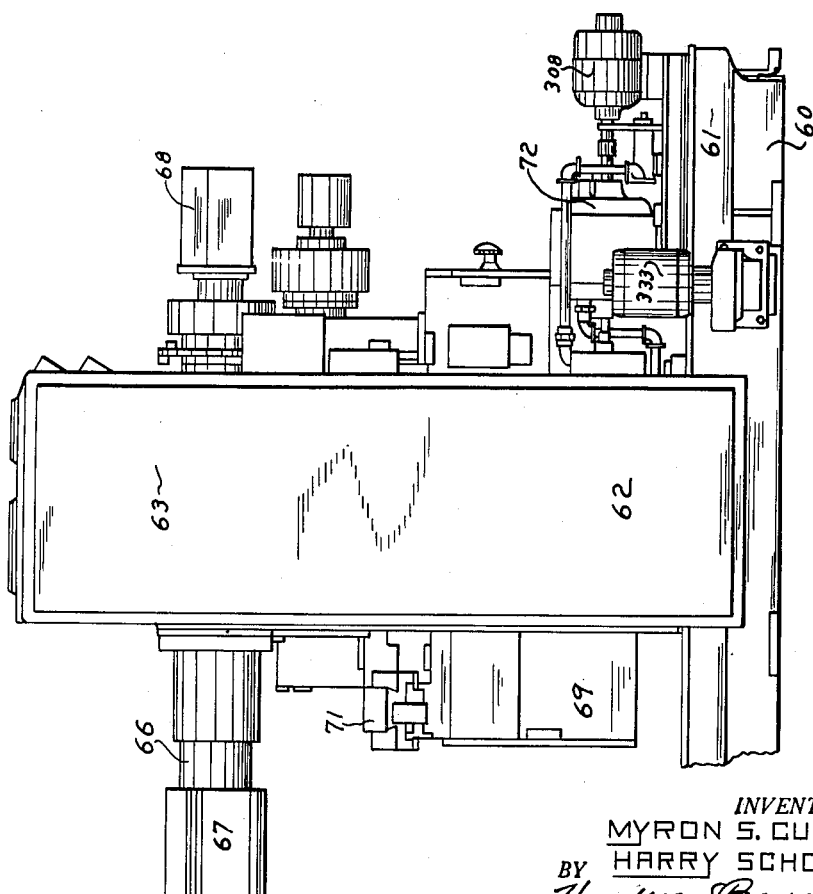
Fig. 3 is a rear elevational view of the machine tool.

Referring to Fig. 23, which is a fragmentary enlarged view similar to Fig. 4, it will be seen that the control turret 68 on the carrier 66 is operatively associated with a switch box housing 262 mounted on the end of the headstock and housing a switch box containing switches later to be referred to and actuated by adjustable dogs 263 mounted on the various faces of the control turret 68.

The end of the headstock is also provided with a switch box 264 in which are mounted eight switches, namely, CDLS1, CDLS2, CDLS3, CDLS4, CDLS5, CDLS6, CDLS7 and CDLS8, see Fig. 25, sheet 6. The switches just referred to and contained within the switch box 264 are each double throw switches and include a normally open contact and a normally closed contact. In the wiring diagram hereinafter described and which reveals the purposes and functions of these switches, the normally open contacts are indicated by the reference character for the switch with the addition of the letter B and the normally closed contacts are indicated by the reference character for the switch with the addition of the letter A. The same system of reference characters is used for all these switches although in some instances but one of the contacts of a given switch is employed.

The switch box 264 on its underside has a series of rockable arms 265, each arm being pivotally supported intermediate its ends and provided on its upper edge with an upwardly extending pin 266 arranged to actuate the switch button of one of the switches in the switch box. There are eight arms 265, one for each of the eight switches in the switch box, and the pins 266 which actuate switches CDLS1, CDLS3, CDLS6 and CDLS7 are on the left-hand side of the point of pivotal connection of the arms as viewed in Fig. 23, while the pins 266 which actuate the switches CDLS2, CDLS4, CDLS5 and CDLS8 are on the right-hand side of the pivotal connection of the arms. Each arm of the series of eight arms has its opposite ends located in guide grooves 267 formed on the lower side of the switch box, as clearly shown in Fig. 23. Also each arm fixedly carries a pin 268 which extends below the switch box and is provided on its lower end with a rounded head. Each pin 268, above the upper edge of the arm which carries it, has a spring 269 mounted thereon which functions to maintain the left-hand end of the arm in a downwardly rocked position as indicated in Fig. 23. The pins 268 cooperate with cam lugs formed on a series of cam rings now to be explained.

It will be recalled, by reference to Fig. 12, sheet 6, that gear 201 fixed to gear 197, which drives the actuating cam drum 198, in turn drives a gear 202 fixed on the cam ring control drum shaft 203. Referring now to Fig. 24, sheet 12, and to Figs. 26 to 32 of sheet 11, it will be seen that the control member or cam ring control drum carried by said shaft 203 is indicated at 270 and said member or drum mounts on its circumference a wide cam ring 271 and three narrow cam rings 272, 273 and 274. The wide ring 271 is provided with five circumferentially displaced cam lugs 271a, 271b, 271c, 271d and 271e, said lugs being correlated, respectively, to the switches CDLS1, CDLS2, CDLS3, CDLS4 and CDLS8 and adapted, as the cam ring control drum 270 and ring 271 rotate, to engage the respective pins 268 on the arms 265 related to said switches thus rocking the said arms thereby actuating the switches in a predetermined manner.

The wide cam ring 271 is mounted on the drum 270 in one fixed position by means of a key 275, since it is not desired to vary the operative timing of the actuation of the switches related to this ring. The narrow cam ring 272 is provided on its circumference with a cam lug 272a which operates on the pin 268 carried by the arm 265 that actuates switch CDLS6. The ring 272 is provided internally with a keyway 276 slightly wider than the key 275, wherefore the ring 272 can have slight angular adjustment relative to the key 275 to vary the point of actuation of the switch CDLS6 and in turn the dwell period for the carrier and the cross slides after "Late" cross slide operation and before initiating the rapid traverse return movement thereof.

The cam ring 273 is provided on its circumference with a cam lug 273a which rocks the arm 265 for actuating the switch CDLS5. The ring 273 is provided interiorly with a keyway 277 that is slightly wider than the key 275 to provide for slight angular adjustment of the ring to vary the point of the actuation of the switch CDLS5 to vary the dwell after "Early" cross slide feeding movement before initiation of the rapid traverse return of the cross slide and carrier.

The cam ring 274 is provided on its circumference with a wide cam lug 274a which effects actuation of the switch CDLS7. This ring 274 has a wide keyway 278 on the interior providing a wide range of angular adjustment of the ring, since the switch CDLS7 controls the change from rapid traverse to feeding movement for the cross slides during the "Late" operation of the cross slides.

The rings 271, 272, 273 and 274 are slipped over the control drum 270 with the key 275 located in the keyways of the rings and then when the three narrow rings have been properly adjusted the rings are clamped in position between a clamping plate 279, secured to the end of the drum by suitable means such as screws, and a flange formed on the opposite end of the drum, see Fig. 24. The cam lugs on the rings are shown out of normal position in Fig. 24 in order to illustrate the entire eight cam lugs.

It will be observed that, since the shaft 203 is geared to the actuating cam drum 198, shaft 203 and the control member or drum 270 will always be rotated in the same timed relationship with the rotation of the cam drum 198 and hence the cam lugs on the rings 271, 272, 273 and 274 will always actuate the respective switches at the same time in the operative cycle with the exception of the adjustments that can be given to the three narrow rings 272, 273 and 274.

Referring now to the diagram of Fig. 44, point A represents the beginning of the forward movement of the carrier, this movement being indicated by the line designated AB which includes the rapid traverse forward and the feed movements. The point B is that at which the lug 271a of the ring 271 actuates switch CDLS1 to terminate the feeding movement and to initiate rapid traverse return if no dwell is desired. The line BC represents the normal dwell, after the termination of the feeding movement and before the commencement of the rapid return movement, it being understood that this period can be varied slightly by adjusting the position of the ring 273, the lug 273a of which actuates switch CDLS5 to initiate the rapid return movement. The line CA represents the return movement of the carrier and when point A is reached lugs 271d and 271e on the ring 271 actuate switches CDLS4 and CDLS8, respectively. The switch CDLS4 is effective to deenergize the rapid traverse motor 181 and energize indexing motor 228, while switch CDLS8 is effective to deenergize the feed clutch during the return movement if the machine is set up for reverse rotation of the spindle.

The portion of the diagram of Fig. 44 now to be described represents the operation of the cross slides for normal or "Early" operation, that is, an operation wherein the cross slides will end their cutting movement simultaneously with the termination of the similar movement of the carrier. For such operation, the line DE represents the concentric portions of the cam grooves 251 and 252 of the cross slide actuating cam 237 at the inner ends thereof (the entering ends) and it is during the time that the grooves are positioned for the pins 249 to enter these portions of the grooves that the lug 271b on the ring 271 actuates switch CDLS2 and thereby start the forward movement of the selected cross slide or slides. The manner in which the slide movements are selected will be explained hereinafter when the index control drum is described in detail.

The line EF represents the forward movement of the cross slide or slides, it being understood that when the point F is reached the switch CDLS1 is actuated, as previously explained, to terminate the forward feeding movement and, if dwell is desired, to initiate the rapid return movement. However, if a dwell is desired, then the switch CDLS5 is actuated to provide the desired dwell as already explained. The line FD represents the rapid return movement of the cross slide or slides, while the line FD' represents the outer concentric portions of the cam grooves 251 and 252, that is, the "dwell" period.

The diagram of Fig. 44 as applicable to the "Late" operation of the cross slide or slides will now be explained. In the "Late" operation of the cross slide or slides the carrier has moved to its most forward position at rapid traverse without feed and then, while the carrier is in dwell, the cross slide or slides are moved forwardly to actuate a movable "pusher" tool carried by the carrier. In such operation the line GH of the diagram represents the engagement of the pin or pins 249 in the inner concentric portions of the cam grooves 251 and 252 at 180° later in the rotational cycle than the engagement of the pins for "Early" operation as represented by the line DE. The engagement of the pins 249 is effected as the result of operation of switch CDLS3 by lug 271c on ring 271 which occurs during rapid traverse of the carrier. Forward travel of the cross slides begins at the point represented H on the diagram and continues for the interval represented by the line HI corresponding to the time when the pins 249 are in the eccentric portions of the cam grooves 251 and 252 at which time the cam follower 211 is in the dwell portion 200a of of the cam groove 200 on cam drum 198. The forward travel of the cross slides is at a feeding rate, to actuate a "pusher" tool or tools on the stationary carrier, since the ring 274 has been adjusted for "Late" operation so that the lug 274a actuates the switch CDLS7 to initiate the feeding rate of movement thereof. At this time the actuation of the switches CDLS1 or CDLS5 has no effect due to the adjustment of ring 274 controlling switch CDLS7 and the provision of a pin in the index drum 280, hereinafter referred to, to operate limit switch ILS2 for the corresponding face of the tool carrier.

At the end of the feeding movement of the cross slide or slides, represented as point I in the diagram, Fig. 44, the lug 272a on the ring 272 actuates switch CDLS6 to the start the rapid return movement of the carrier and cross slides. Since the ring 272 can be given angular adjustment on the control drum a dwell period can be provided, if desired, before the switch CDLS6 is actuated. The dash line IG represents the rapid return of the cross slide or slides. During the portion IH of this return the carrier is in dwell but thereafter the carrier is also traveling in rapid return as represented by the line BA.

The index member 217, as already explained, is provided with a cylindrical or sleeve portion 280 which will be designated herein as the index control drum. This drum is provided with a plurality of axially spaced series of circumferentially spaced openings 281 to receive pins or dogs 282, see Fig. 36. The number of circumferentially spaced openings 281 in each series thereof corresponds in number to the number of tool faces on the tool carrier and, as illustrated, there are seven axially spaced series of openings. In addition the index control drum 280 slidably mounts an elongated pin 283 which is actuated, as will later be explained, to terminate the work cycle. The pins 282 and the elongated pin 283 on the index control drum 280 engage headed pins 284 to rock lever arms 285 substantially identical with the lever arms 265 previously described and arranged in a series of eight arms pivotally supported on the exterior of a switch box 286 contained in the housing 262. Each lever arm 285 is provided with a pin 287 for actuating the switch button of an associated switch with the pins 287 of four of the lever arms being located on one side of the pivot of said arms and the pins 287 of the other four arms located on the opposite sides of the pivot of said arms. The lever arms 285 which are rocked by the pins or dogs 282 actuate switches ILS2, ILS5, ILS4, ILS3, ILS6, ILS7 and ILS8 in the switch box 286 while the lever arm which is rocked by the elongated pin 283 actuates switch ILS1 also mounted in said box. The switches just referred to are double throw switches and include a normally closed contact and a normally open contact. The normally closed contacts of these switches are each designated in the wiring diagram later to be described by the reference character for the switch with the letter A added, while the normally open contacts thereof are designated by the reference character for the corresponding switch with the letter B added. This system of reference characters is employed for all of these switches although in some instances but one of the contacts of a given switch is employed.

The control turret 68, previously referred to and which is mounted on the end of the carrier 66, is of polygonal configuration and is shown as having five sides or faces, on one of which and adjacent to the pin carrying flange 215 there is secured a cam dog 288 for operating the slidable elongated pin 283 at the end of the work cycle to actuate switch ILS1 and thereby terminating the work cycle.

Each face of the control turret 68 is provided with a plurality of spaced parallel axially extending slots 289, reference to Figs. 36 and 39 showing that each face contains six of such slots. The slots 289 adjustably mount pins or dogs 263 which function during the axial reciprocation of the drum 68 with the carrier to move pins 291 carried by rockable arms 292 similar to the arms 285 and 265 previously described.

The arms 292 are six in number and each carries on its underside a pin 293 arranged, when the arm is rocked, to actuate the switch button of a related switch, there being six switches TLS1, TLS2, TLS3, TLS4, TLS5 and TLS6 mounted within switch box 294 in the housing 262. The pins 293 of the arms 292 that actuate the switches TLS1, TLS3 and TLS5 are located to the left of the pivotal mounting of the respective arms, while the pins 293 of the arms which actuate the switches TLS2, TLS4 and TLS6 are located to the right thereof as viewed in Figs. 37 and 39.

The switches TLS1, TLS2, TLS3, TLS4, TLS5 and TLS6 in the switch box 294 control the spindle speeds and the feed rates and are each of the double throw type, with the normally closed contacts thereof indicated in the wiring diagram by the reference character for the corresponding switch with the letter A added and the normally open contacts thereof by the reference character for the corresponding switch with the letter B added. As in the case of switches CDLS and ILS, this system of reference characters is employed for all of the switches TLS although in some instances but one of the contacts of a given switch is actually employed in the circuit.

*Control of pressure fluid clutches in spindle drive train*

It will be recalled that there are two fluid pressure operated clutches, namely, C2 and C1 on the shaft 73 for clutching either the gear 74 or the gear 76 to said shaft, see Fig. 5. It will also be recalled that there are two fluid pressure operated clutches, namely C3 and C4, on the shafts 99 and 103 for connecting said shafts together or for connecting the gear 102 to the shaft 103.

It will also be recalled that fluid under pressure for the clutch C1 is supplied to the passage 85 while fluid under pressure for the clutch C2 is supplied to the passage 84. The passages 85 and 84 are connected, respectively, to passages 295 and 296 formed in a valve block 297 and communicating with a valve chamber 298, see Figs. 40 to 43 inclusive, Sheet 8. The passages 112 and 113 which supply pressure fluid to the clutches C3 and C4 are connected, respectively, to passages 299 and 300 formed in the valve block 297 and communicating with a valve chamber 301 in said block. The valve chamber 298 is connected by a passage 302 with an intermediate valve chamber 303 while the valve chamber 301 is connected to said intermediate valve chamber 303 by a passage 304.

The valve chambers 301 and 303 are connected by passages 305 and 306 to a supply line 307 that extends to the output side of a pump 308, see Fig. 42. The input side of the pump 308 is connected by line 309 to the reservoir 310 for a supply of suitable liquid such as oil. The upper ends of the valve chambers 298 and 303 are connected by passages 311 and 312, respectively, with the return or drain line 313 that extends to the reservoir 310. The lower ends of the valve chambers 298, 301 and 303 are connected by return line 313a to the line 313. Each valve chamber slidably supports a reciprocating valve formed of two spaced valve heads which cooperate with the lands in the valve chambers to connect the various passages in the valve block 297 in the manner shortly to be explained.

The valve bodies are connected to extensions of the armatures of solenoids SVA, SVB and SVC and when said solenoids are deenergized the bodies are normally held in the positions within the valve chambers indicated in Fig. 40, it being noted that each extension of the armature of each solenoid carries a coil spring 314 acting upon deenergization of the solenoid to move the valve body to its normal position.

In Fig. 40, as already stated, the three solenoids are deenergized thereby causing the valve bodies of the three valves to be positioned as indicated. At this time the inlet passage 305 is connected through the valve chamber 301 with the passage 299 that extends to passage 112 and hence clutch C3 is engaged. Also at this time inlet passage 306 is connected through the valve chamber 303 with passage 304 and the latter passage is connected through the valve chamber 301 with passage 300 that is connected with passage 113 and hence clutch C4 is engaged. In addition, it will be seen that passage 295 that extends to passage 85 is connected through the valve chamber 298 with passage 302 and through the valve chamber 303 with passage 312 and thence to drain or reservoir 310. Therefore, at this time, clutch C1 is disengaged and is connected to drain. Also at this time passage 296 which extends from passage 84 is connected through valve chamber 298 with passage 311 that is connected to the return or drain line 313 and hence at this time clutch C2 is also disengaged and connected to drain. This is the position of the three valves when the spindle is braked, since disengagement of the clutches C1 and C2 and simultaneous engagement of the clutches C3 and C4 imparts a braking action to the shaft 103 and to the spindle 64 through the gearing connecting said shaft with the spindle.

As already stated, four different speeds can be imparted to the shaft 103 through selective engagement and disengagement of the clutches C1, C2, C3 and C4. This in turn permits the imparting of four different speeds to the spindle in either the "High" speed range or the "Low" speed range thereof. The manner in which this is effected will be apparent from an inspection of Figs. 41 to 43.

Fig. 41 represents the position of the valves resulting from the selective energization of certain of the solenoids, to obtain spindle speed #1, at which time clutches C1 and C3 are engaged while clutches C2 and C4 are disengaged. It will be noted that in Fig. 41 the solenoids SVB and SVA are deenergized while solenoid SVC is energized. Therefore, inlet passage 306 is connected through the valve chamber 303 with passage 302 and the latter is connected through the valve chamber 298 with passage 295 so that fluid under pressure is being supplied to clutch C1 to engage the latter. Also at this time inlet passage 305 is connected through valve chamber 301 with passage 299 which is connected to clutch C3 and hence fluid under pressure is being supplied to that clutch to engage the same. Passage 296, which is connected with clutch C2, is connected through valve chamber 298 with passage 311 that is connected with drain line 313 and hence clutch C2 is disengaged and connected to drain. Passage 300 that is connected to clutch C4 is connected through valve chamber 301 with passage 304 extending to valve chamber 303 and, since the valve body in this chamber has been shifted by energization of solenoid SVC, the passage 304 is connected with the return line 313a. Therefore, at this time clutch C4 is disengaged.

The positions of the three valves for spindle speed No. 2 have not been illustrated but it will be understood that for such speed clutches C2 and C3 will be engaged while clutches C1 and C4 will be disengaged. Therefore, at this time solenoids SVA and SVC will be energized while solenoid SVB is deenergized. Hence, passage 296, connected to clutch C2, will be connected through valve chamber 298 with passage 302 and through valve chamber 303 with inlet passage 306 so that fluid under pressure will be supplied to clutch C2 to engage the latter. In addition inlet passage 305 will be connected through valve chamber 301 with passage 299 that is connected with clutch C3 and hence pressure fluid is supplied to this clutch to engage the same. During spindle speed No. 2 passage 295 connected to clutch C1 is now connected through valve chamber 298 with return line 313a and hence the said clutch is draining and is disengaged. Likewise, passage 300 connected to clutch C4 is connected through valve chamber 301 with passage 304 and through valve chamber 303 with return line 313a and hence the clutch C4 is draining and is disengaged.

In Fig. 42 the three valves are shown in the relationship they have to obtain spindle speed No. 3 and at this time solenoids SVB and SVC are energized while solenoid SVA is deenergized. It will be seen that inlet passage 306 in the valve block is connected through valve chamber 303 with passage 302 and the latter, through valve chamber 298, with passage 295 so that fluid under pressure is being supplied to clutch C1 engaging the latter. Also at this time, inlet passage 305 in the valve block is connected through valve chamber 301 with passage 300 so that fluid under pressure is being supplied to clutch C4 engaging the latter. The passage 296 connected to clutch C2 is connected through valve chamber 298, passage 311 and return line 313 with the reservoir and hence clutch C2 is disengaged. Passage 299, connected with clutch C3, is connected through valve chamber 301 with drain line 313a and hence the clutch C3 is disengaged.

Fig. 43 illustrates the positions of the three valves for spindle speed No. 4. At this time all three solenoids are energized and passage 296, connected to clutch C2, is connected through the valve chamber 298 with passage 302 and through valve chamber 303 with inlet passage 306 so that fluid under pressure is being supplied to clutch C2 engaging the latter. In addition, inlet passage 305 in the valve block 297 is connected through valve chamber 301 with passage 300, which is connected to the clutch C4, so that the latter clutch is engaged. The passage 295 in the valve block, connected to clutch C1, is now connected through the valve chamber 298 with drain line 313a and hence clutch C1 is disengaged. Passage 299 in the block 297, connected to clutch C3, is now connected to the drain line 313a through valve chamber 301 and hence clutch C3 is disengaged.

The control for the energization and deenergization of the solenoids SVA, SVB and SVC will be set forth hereinafter.

*Operator's control panel*

An operator's control panel 314 is mounted on the front side of the headstock 63 and has the actuating buttons or knobs for various switches as will now be explained. The panel 314 mounts the start and stop push buttons 315 and 316 which control the starting and stopping of the main motor. In addition the panel mounts the cycle start push button 317 for starting the automatic cycle of operation of the machine and the push buttons 318, 319 and 320 for effecting hand control of rapid traverse forward, rapid traverse return and indexing, respectively. A control knob or handle 321 is provided on the panel for actuating the switch which controls the operation of the coolant pump and said knob may be moved to any one of three different positions, namely, "Off," "On" and "Intermittent." The coolant pump control switch is a double contact switch and reference to Fig. 46 will show that when the knob 321 is in the "Off" position both contacts C–1 and C–2 of said switch are open, but when it is in the "On" position then contact C–1 is closed and contact C–2 is opened, while, when the knob is in the "Intermittent" position contact C–1 is open and contact C–2 is closed. The panel 314 also mounts a control handle or knob 322 for actuating the spindle control switch. This knob can be turned to any one of four positions, namely, "Tap Reverse," "Off," "Jog" or "Run." The spindle control switch is a four-contact switch and in the "Tap Reverse" position contact MS–1 is closed while MS–2, MS–3 and MS–4 open; see Fig. 48. In the "Off" position of this switch contact MS–4 is closed and the other contacts are opened. In the "Jog" position of this switch contacts MS–1 and MS–4 are open while contacts MS–2 and MS–3 are closed. In the "Run" position, contact MS–3 is closed and the other contacts are open.

A control or knob 323 is provided on the panel 314 for actuating the hand feed control switch and this knob may be moved to either an "Off" or an "On" position. The hand feed control switch is a three-contact switch and reference to the chart of Fig. 49 indicates that in the "Off" position of the knob 323 contact HF–1 and contact HF–3 are closed while contact HF–2 is opened. In the "On" position of the knob 323 contact HF–2 is closed while contacts HF–1 and HF–3 are open.

The control panel 314 contains another knob or handle 324 which may be turned to any one of three different positions for actuating the three-contact hand feed selector switch. In position 1 of this switch contact FS–1 is closed while contacts FS–2 and FS–3 are opened. In position 2 contact FS–2 is closed while the other two contacts are open and in position 3 contact FS–3 is closed while the other two contacts are open, see Fig. 50. It will be understood that the three positions of the knob 324 and the three actuated positions of the hand feed selector switch actuated thereby provide for the obtainance of the three different feeding rates of which the machine is capable and which have been pointed out hereinbefore.

The control panel 314 also has a control handle or knob 325 which can be moved to either of two positions, namely, "Hand" or "Automatic" to actuate the machine control switch. Referring to the chart of Fig. 47, it will be noted that the machine control switch actuated by the knob 325 is a three-contact switch such that the "Hand" position contacts MC–1 and MC–3 are closed while the contact MC–2 is open. In the "Automatic" position contacts MC–1 and MC–3 are open and contact MC–2 is closed.

The control panel 314 further mounts a control knob or handle 326 which can be moved to any one of four positions to actuate the hand spindle speed selector switch to obtain any one of the four spindle speeds in either the "High" or "Low" speed ranges which have been previously referred to. From the chart of this switch, shown in Fig. 51, it will be seen that the switch is of the two-contact type and in position 1 of the knob 326 both contacts of the switch are open. In position 2 contact SS–1 is closed and contact SS–2 is open while the reverse obtains for position 3. In position 4 both contacts are closed.

*Power and control circuits*

The power or operating circuit for the motors and the clutches as well as the control circuit therefor will now be explained with reference to Figs. 52, 53, 54 and 55, Sheets 15 to 18 inclusive, which taken together comprise a simplified wiring diagram for the machine.

Figure 52:
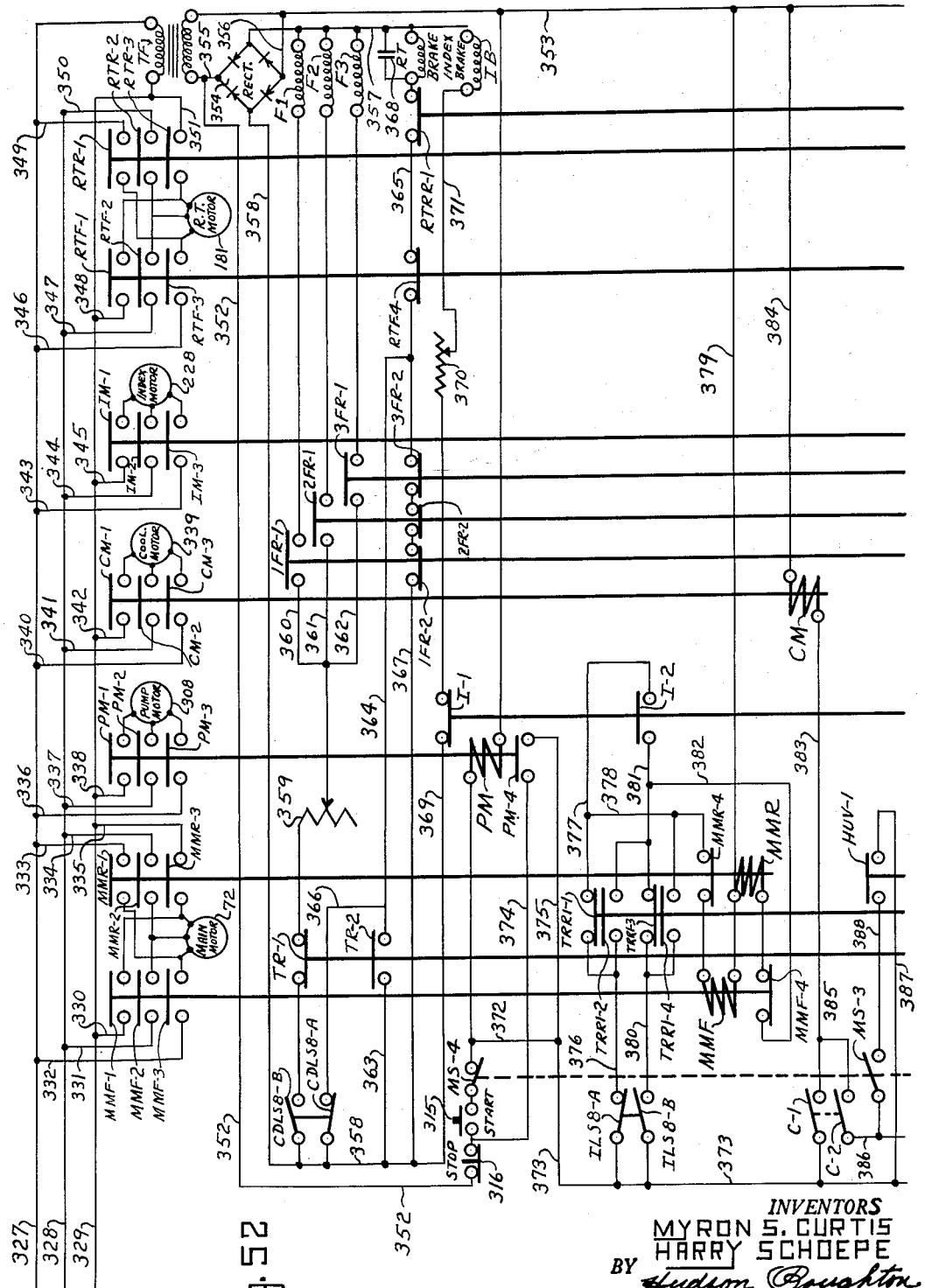

Referring first to Fig. 52, three-phase alternating electrical power for the machine is supplied through the lines 327, 328 and 329 in which may be provided a conventional disconnect switch and/or a circuit breaker, not shown. The reversible main motor 72 is connectible to the power lines 327, 328 and 329 for rotation in a forward direction through operation of a motor contactor MMF which, when energized, completes a circuit to the leads for motor 72 through closing of its contacts MMF–1, MMF–2 and MMF–3 thereby connecting the leads through the wires 330, 331 and 332 to the power leads 329, 328 and 327, respectively. The motor 72 may also be energized for rotation in a reverse direction by energization of the contactor MMR when the contactor MMF is deenergized. The power circuit for the motor then extends from the motor leads through the contacts MMR–1, MMR–2 and MMR–3 to the wires 333, 334 and 335 connected respectively with the power supply wires 327, 328 and 329.

The motor for pump 308, utilized for supplying fluid under pressure to the fluid-operated clutches, is connectible with the power supply lines 327, 328 and 329 through the contacts PM–1, PM–2 and PM–3 of a contactor PM, thus providing connections through the wires 336, 337 and 338 to the power supply lines 327, 328 and 329.

The motor 339 for operating the coolant pump is connectible with the power lines 327, 328 and 329 through operation of a contactor CM which, when energized, closes its contacts CM–1, CM–2 and CM–3 thereby connecting the leads for the motor 339 with the wires 340, 341 and 342 connected respectively with the power lines 327, 328 and 329.

The index motor 228 has the leads thereof connectible, upon closing of the contacts IM–1, IM–2 and IM–3 of a contactor IM, to the wires 343, 344, 345 which are connected respectively with the wires 327, 328 and 329.

The rapid traverse motor 181 has its leads connected with the wires 327, 328 and 329 for effecting rotation in a forward direction by means of contacts RTF–1, RTF–2 and RTF–3 of a contactor RTF and the wires 346, 347 and 348. The motor 181 is energized for rotation in the reverse direction under control of the contacts RTR–1, RTR–2 and RTR–3 of a contactor RTR, which contacts when closed connect the motor leads through the wires 349, 350 and 351 to the power lines 327, 328 and 329.

The control relays and the contactors for the machine tool utilize reduced voltage alternating current while the feed clutches, index brake and rapid traverse brake utilize direct current. For this purpose, the wires 327 and 329 extend to the primary of a transformer TF, the secondary of which is connected with wires 352 and 353 providing the reduced voltage alternating current for the control circuit. The secondary for transformer TF is also connected to a full wave oxide type rectifier 354 by means of wires 355 and 356 leading to the input of the said rectifier. The output of the rectifier 354 is connected with the wires 357 and 358 supplying direct current to a part of the operating portion of the circuit.

Between the wires 357 and 358, which are the DC supply wires for the operating portion of the circuit, are connected a plurality of parallel circuits controlling the energization of the feed solenoid clutches F1, F2, F3, the rapid traverse brake RTB, and the index brake IB. Thus, connected to the wire 358 is a circuit containing the normally open contact CDLS8–B in series with normally closed contact TR–1 of relay TR and a variable resistance 359. From the resistance 359 this circuit branches into three parts comprising the wires 360, 361 and 362. The first of these branch circuits comprises the said wire 360, the normally open contact 1 FR–1 and the coil F1 of the feed clutch connected in series to the wire 357. Similarly, the wire 361 is connected to the normally open contact 2FR–1 which in turn is in series with the coil for feed clutch F2, this circuit being completed through the clutch coil F2 to the wire 357. Likewise, the wire 362 is connected to the normally open contact 3FR–1 of a relay 3FR, the circuit continuing to and through the coil of feed clutch F3 to the wire 357.

Another of the parallel circuits between the wires 357 and 358 comprises a wire 363, connected with the wire 358, and connectible with a wire 364 through the normally open contacts TR–2 of relay TR, wires 364 being connected with a wire 365 and the circuit continuing through the normally closed contacts RTF–4 and RTRR–1 to and through the brake coil RTB of the rapid traverse brake to the wire 357. The normally open contact TR–2 in this circuit is bridged by the normally closed contact CDLS8–A connected between the wire 358 and the wire 364 by a wire 366.

Extending from the wire 358 is a wire 367 providing a circuit extending in series through the normally closed contacts 1FR–2, 2FR–2 and 3FR–2 of the relays 1FR, 2FR and 3FR, thence through the normally closed contact RTF–4 of relay RTF to the wire 365, the circuit being completed through the aforementioned normally closed contact RTRR–1 and the coil of the rapid traverse motor brake RTB to the circuit 357. Bridged about the brake coil RTB is a condenser 368 the purpose of which is well known and hence its function need not be described in detail.

The circuit for effecting energization of the index brake IB extends from the line 358 through a wire 369 to and through the normally closed contact I–1 of the relay I, a variable resistance 370 and a wire 371 to and through the coil of the index brake IB to the wire 357.

The power line 352 for the alternating current control circuit is connectible with the line 372 through a circuit passing in series through the normally closed stop switch 316, normally open start switch 315, and the contact MS–4 of the spindle control switch which is in closed position when the actuator 322 is aligned with the "Off" indicium. The wire 372 is connected with a wire 373 between which and the aforementioned wire 353 are connected the several contacts and relays of the AC control circuit and hence the wire 373 will hereinafter be referred to as a power supply wire or lead. A holding circuit about the start switch 315 and the contact MS–4 is provided by wires 374 and 375 between which is interposed the normally open contact PM–4 of contactor PM. The coil of the contactor PM is connected between the wire 372 and the wire 353 so that actuation of the start button 315, with the contact MS–4 in closed position, energizes contactor PM thus providing a holding circuit through the contact PM–4 as well as energizing the pump motor 308 through contacts PM–1, PM–2 and PM–3. The contactor PM remains energized until stop button 316 is actuated thereby providing energy to the remainder of the control circuit after the start button 315 is released and/or the contact MS–4 is opened.

The normally closed contact ILS8–A is connected to the power supply wire 373 of the AC control circuit, this contact also being connected by wire 376 to the normally closed contact TRR1–1 of relay TRR1, this portion of the circuit continuing therefrom through the wire 377, wire 378 and the normally closed contact MMR–4 of the main motor reverse contactor MMR to and through the coil MMF to the main motor forward contactor to a wire 379 which is in turn connected to the power wire or line 353.

The normally open contact ILS8–B of switch ILS8 is adapted, when closed, to connect the wire 373 to a wire 380 which is connected with the normally closed contact TRR1–3 of the relay TRR1, this contact being connected by the wires 381, 382 with the contact MMF–4 of main motor forward contactor MMF, the circuit continuing therefrom to and through the main motor reverse contactor MMR to the wire 379 thence to the power supply 353. Wires 377 and 381 are adapted to be interconnected by closing of the normally open contact I–2 of relay I, while the wires 376 and 381 are adapted to be connected through closing of the normally open contact TRR1–2 of the relay TRR1. Also the wires 380 and 378 are connectible by closing of the normally open contact TRR1–4 of the TRR1 relay.

The normally open contact C–1 of the coolant pump switch is connected between the wire 373 and a wire 383, the latter being also connected to the coil of the coolant motor contactor CM and the circuit being completed to the wire 353 by the wire 384. A wire 385 is connected to the wire 383 intermediate the contact C–1 and the contactor CM, the wire 385 extending to the normally open contact C–2 which, upon closing, completes a circuit to the wire 386. The wire 386, is connected with the normally open switch FDLS, see Fig. 53, in series with the coil of the valve operating solenoid SVC which is connected to the wire 353. A wire 387 connects the control power supply wire 373 to one side of the normally open contact HUV–1 of relay HUV, this circuit continuing through the wire 388, connected to the normally open contact MS–3 thence to the wire 386 at a point intermediate contact C–2 and the switch FDLS.

Figure 53:
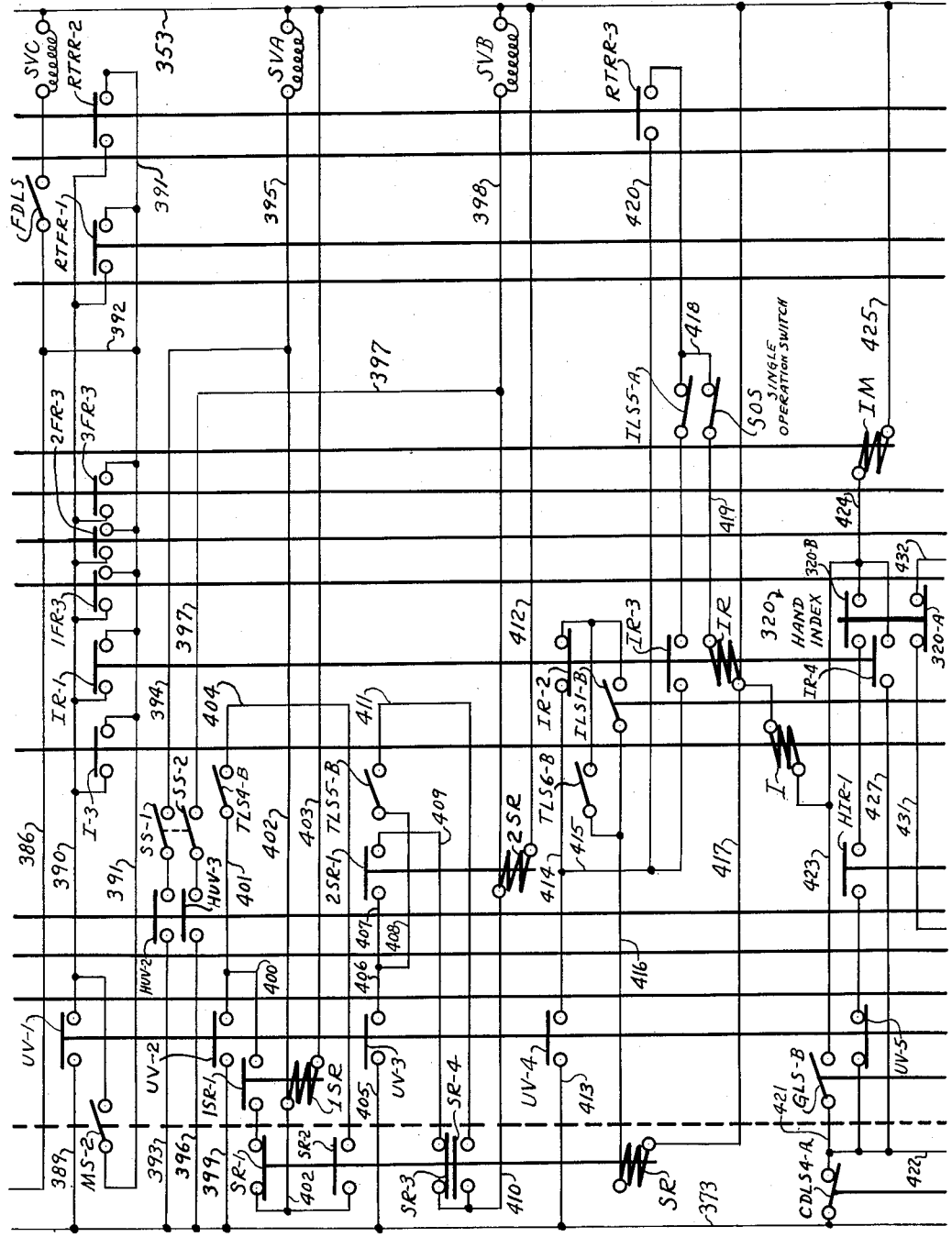

Continuing the description of the circuit and referring now to Fig. 53, it will be seen that the wire 373 is connected to one side of the normally open contact UV–1 of relay UV by means of a wire 389, the other side of this contact being connected by a wire 390 to one side of the normally open contact RTRR–2 which is adapted, when closed, to connect wire 390 to wire 391. Wire 391 is connected to a wire 392 leading to and connected with the wire 386 at a point between the contact C–2 and the switch FDLS, this circuit being completed to the control circuit supply wire 353 through switch FDLS and the valve operating solenoid SVC. The normally open contact RTFR-1 is connected in parallel with the contact RTRR-2 as are also the normally open contacts MS-2, I-3, IR-1, IFR-3, 2FR-3 and 3FR-3.

A wire 393 connects the control power supply wire 373 to one side of the normally open contact HUV-2, the other side of this contact being connected with the normally open contact SS-1 of the hand spindle speed selector switch which is adapted to complete a circuit to the wire 394 and thence to a wire 395 connected with the valve operating solenoid SVA which is also connected with the power line 353.

A wire 396 connects the power supply wire 373 to one side of the normally open contact HUV-3, the other side of this contact being connected with normally open contact SS-2 of the hand spindle speed selector switch which, on closing, is adapted to complete a circuit to the wide 397 connected with a wire 398 which, in turn, is connected with one side of the valve operating solenoid SVB, the other side of this solenoid being connected with the control circuit supply wire 353.

An additional circuit to the coil SVA is provided from the wire 373 through a wire 399 connected with the normally open contact UV-2 which is adapted, when closed, to complete a circuit to wires 400 and 401. Wire 400 is connected to a normally open contact 1SR-1 of a relay 1SR and from the latter this circuit continues through the normally closed contact SR-1 of relay SR to the wire 402 connected with the aforementioned wire 395 leading to solenoid SVA. Connected in parallel with solenoid SVA, between the wires 402 and 353, is the coil of relay 1SR since it has one terminal connected to the wire 402 and the other terminal connected by wire 403 to the wire 353. The previously mentioned wire 401 is connected with the normally open contact TLS4-B of switch TLS4, the other side of this contact being connected by wire 404 to one side of the normally open contact SR-2 of relay SR, the other side of the latter contact being connected with the aforementioned wire 402 intermediate the contact SR-1 and the coil 1SR.

An additional circuit for energization of the solenoid SVB is provided by wire 405 connecting the control circuit power supply line 373 to the contact UV-3 of relay UV, the circuit continuing therefrom through the wire 406 which, in turn, is connected to wires 407 and 408. Wire 407 is connected to the normally open contact 2SR-1 which is connected in series with the normally closed contact SR-3 by a wire 409. Contact SR-3 is, in turn, connected by wires 410 and 398 to the solenoid SVB. The wire 408 extends to one side of the normally open contact TLS5-B of switch TLS5, the other side of this contact being connected to a wire 411 extending to one side of normally open contact SR-4 of relay SR with the other side of the latter contact being connected with the wire 410. Intermediate the contact SR-4 and the wire 398 one terminal of the coil for relay 2SR is connected to the wire 410, the other terminal of this coil being connected by a wire 412 to the control circuit power supply wire 353.

A wire 413 connects the control circuit power supply wire 373 to one side of the normally open contact UV-4 of relay UV the other side of this contact being connected with the wires 414 and 415. The wire 414 is connected to one side of the normally closed contact IR-2 the other side of which is connected to one side each of contacts TLS6-B and ILS1-B. The other sides of these contacts are connected by a common wire 416 to one side of the coil for relay SR and the other side of this coil is connected by a wire 417 to the control circuit power supply wire 353. The wire 415 is connected with one side of the normally open contact IR-3 of relay IR and the other side of this contact is connected to the normally closed contact ILS5-A. The latter contact is connected by a wire 418 to the normally closed contact of a single operation switch SOS from which a wire 419 leads to one side of the coil of relay IR, the other side of the latter being connected with the wire 417 leading to the wire 353. A wire 420 is connected to the wire 415 intermediate the wire 414 and the contact IR-3. This wire 420 extends to one side of the normally open contact RTRR-3 the other side of this normally open contact being connected with the previously mentioned wire 418 and hence the contact RTRR-3 is in parallel with the contacts IR-3 and ILS5-A.

One side of the normally closed contact CDLS4-A is connected with the control circuit power supply line 373 the other side of this contact being connected to wires 421 and 422. The wire 421 is connected to one side of the normally open contact GLS-B of the switch GLS the other side of this contact being connected by wires 423 and 424 to one terminal of the coil of the indexing motor contactor IM. The other terminal of this coil is connected to the control circuit power supply line 353 by a wire 425. Wire 423 is also connected with one terminal of the coil for the index relay I, the other terminal of this coil being connected to the aforementioned wire 417 which it will be remembered is connected with the wire 353. The normally closed contact UV-5, normally open contact HIR-1 and the normally open contact 320-B of the hand index switch 320 are connected in series with each other and between the wires 422 and 424 so that they are in parallel with the normally open contact GLSB. A wire 427 also is connected with the wire 422 and extends to one side of the normally open contact IR-4 of relay IR, the other side of this contact being connected with the wire 424 so that the contact IR-4 is likewise in parallel with the contact GLS-B. The wire 422 is also connected to one side of the normally closed contact GLS-A of the switch GLS and the other side of this contact is connected to the wire 428 extending to one side of the normally open contact HIR-2 of relay HIR. The other side of this normally open contact HIR-2 is connected with a wire 429 which is in turn connected to one terminal of the coil for relay HIR, the other terminal of this coil being connected to the wire 353 by the wire 430. The normally closed contact 320-A of the hand index switch 320, Fig. 53, is connected in parallel about the contact HIR-2, Fig. 54, by means of wires 431 and 432.

Energization of the coil of relay UV is under control of a circuit comprising a wire 433, connected with the wire 428 intermediate the contacts GLS-A and HIR-2, the wire 433 being connected to one side of the normally closed contact UV-6 of the relay UV while the other side of this contact is connected to the normally closed contact HUV-4 of relay HUV. This circuit continues through a wire 434 to and through the normally closed contact MC-2 to a wire 435 thence through the normally closed contact HUV-5 of relay HUV to one terminal of the coil UV and then from the other terminal of the coil UV through a wire 436 to the wire 353.

The circuit for control of the relay HUV extends from the control circuit power supply wire 373 through a wire 437 to one side of the normally open contact UV-7, thence through the wire 438 to one side of the normally open contact MC-1. The contact MC-1 is connected by a wire 439 to the normally closed contact UV-8 which is, in turn, connected by a wire 440 to one terminal of the coil for relay HUV, the other terminal of this coil being connected to the wire 353 by a wire 441. Connected in parallel with the aforementioned contacts UV-8 and MC-1 are the normally open contacts HUV-6 and I-4, these contacts being connected in series between the wires 373 and 439 by means of wires 442, 443 and 444.

A wire 445 is connected with the wire 434 intermediate the contacts HUV-4 and MC-2. This wire is connected with the wires 438, 443 and to the wires 446 and 447.

The wire 447 extends to one side of the normally closed contact RTRR-4 of relay RTRR, the other side of which contact is connected to a wire 448. The wire 448 is connected to the normally closed contact CDLS6–A in series with the normally open contact LCS–1, normally closed contact CDLS7–A, the normally open, manually operated, cycle start switch 317, the circuit continuing through a wire 449 to one side of the normally closed contact HUV–7 of relay HUV the other side of this contact being connected with wires 450 and 451. Wire 450 is connected to the normally closed contact 1FR–4 which is in series with the normally closed contacts 2FR–4 and 3FR–4 connected to one side of the coil for relay RTFR, the other side of which coil is connected to the wire 353 by a wire 452.

The coil for the relay TR is connected in parallel with the coil for the relay RTFR by means of wires 453 and 454, the wire 453 being connected intermediate the contact 3FR–4 and the coil RTFR, while the wire 454 is connected with the wire 452 intermediate the coil RTFR and the wire 353. The coil RTF is connected in parallel with the coil TR, under the control of the normally closed contact I–6, by means of a wire 455 connecting the said contact I–6 with the wire 453 and a wire 456, the latter wire extending to one terminal of the coil RTF the other terminal of which is connected to the wire 454.

Intermediate the normally closed contact CDLS7–A and the normally open contact LCS–1 is connected a wire 457 which extends to one side of the normally open contact CDLS7–B, the other side of this contact being connected with a wire 458 extending to one side of the normally open contact TRR1–5. The other side of the normally open contact TRR1–5 is connected to a wire 459 extending to a point intermediate the LCS–1 and the CDLS6–A contacts so that the circuit just described is in parallel about the LCS–1 contact.

The aforementioned wire 451 extends to one side of the normally open, manually operable, rapid traverse forward, push button switch 318 the other side of this switch being connected to the normally closed contact HF–1 of the hand feed switch, this contact in turn being connected to a wire 460 which is connected with the wire 461. Wire 461 connects with a wire 462 extending to one side of the normally open contact HUV–9. The other side of the normally open contact HUV–9 is connected with a wire 463 which is connected with one side of the normally open contact UV–9 and UV–10. The other side of the contact UV–10 is connected by a wire 464 to one side of the normally open contact TLS1–B, the other side of the latter being connected to a wire 465 extending to one terminal of the coil for relay 1FR. The other terminal of this coil is connected by a wire 466 to the control circuit power supply wire 353.

As mentioned above, the wire 463 is also connected to one side of the normally open contact UV–9, the other side of this contact being connected by a wire 467 to one side of the normally closed contact RTRR–5 which, in turn, is connected with a wire 468. The wire 468 is connected to a wire 469 which extends to the normally closed contact 3FR–5 the latter being connected in series with the normally closed contact 2FR–5 and the normally open contact 1FR–5 which, in turn, is connected to the previously mentioned wire 465 so that the last described circuit is in parallel with the contact UV–10 and TLS1–B.

In addition to being connected to the previously mentioned wire 461, the wire 460 is also connected to one side of the normally open contact HUV–8. The other side of this contact is connected with a wire 470 which is connected to the previously mentioned wire 448 through a series circuit containing normally closed contacts TLS3–A, TLS2–A, TLS1–A, CDLS1–A, CDLS5–A and ILS2–A. Intermediate the contacts CDLS1–A and CDLS5–A is connected a wire 471 which extends to one side of the normally open contact ILS6–B the other side of which is connected by a wire 472 to the previously mentioned wire 463. A wire 473 is connected with the wire 458 at a point between the contacts TRR1–5 and CDLS7–B. This wire is also connected to the connection between TLS1–A and CDLS1–A and to the wire 472 between the wire 463 and contact ILS6–B. The wire 470 is also connected to one side of normally closed contact ILS1–A, the other side of this contact being connected to a wire 474 extending to one side of normally open contact RTFR–2. The other side of this contact RTFR–2 is joined by a wire 475 to the previously mentioned wire 449 at a point between switch 317 and contact HUV–7. At this point is also connected a wire 476 which is connected to one side of the normally open contact I–5 the other side of which contact is connected by a wire 477 to the wire 474 at a point between contact ILS1–A and RTFR–2. A wire 478 also is connected to the wire 458 between the cycle start switch 317 and the normally closed contact CDLS7–A, this wire being connected to the wire 470 between contact HUV–8 and TLS1–A.

Connected with the previously mentioned wires 461 and 462 is a wire 479 extending to one side of the normally open contact HF–2 the other side of which is connected to a wire 480 extending to one side of the normally closed contact FS–1 of the hand feed selector switch. The other side of the contact FS–1 is connected to the wire 465 by a wire 481. Also connected with the wire 480 is one side of the contact FS–2 the other side of this contact being connected to a wire 482 extending to one side of the normally closed contact TRR2–1. From the other side of this contact a wire 483 extends to one side of the normally open contact TLS2–B the other side of the latter contact being connected to a wire 484 connected with the wire 464 at a point between contacts UV–10 and TLS1–B. Connected with the wire 482, intermediate the contacts FS–2 and TRR2–1, is a wire 485 extending to one terminal of the coil of relay 2FR, the other terminal of the latter being connected by a wire 486 to the control circuit power supply line 353. Also connected with the wire 485 is a circuit containing in series the normally closed contact 1FR–6 the normally open contact 2FR–6 and the normally closed contact 3FR–6, the latter being connected by wire 487 to the previously mentioned wire 468.

The contact FS–3 is connected between the wire 480 and a wire 488 which is also connected to the normally closed contact TRR2–2. The latter contact is connected to the normally open contact TLS3–B which, in turn, is connected by a wire 489 to the previously mentioned wire 484. The wire 488 is also connected to a wire 490 extending to one terminal of the coil for relay 3FR, the other terminal of which is connected by a wire 491 to the wire 353. The wire 490 is additionally connected to the normally closed contact 1FR–7 by a wire 492 and this contact is connected in series with the normally closed contact 2FR–7 and the normally open contact 3FR–7 with a wire 493 extending from the latter to the wire 468.

The wire 373 is connected with a wire 494 extending to one side of the normally open contact MC–3. This contact is then connected by a wire 495 to the normally closed contact HF–3 and the latter is connected by a wire 496 to one side of the normally open push button switch 319 controlling the rapid traverse reverse. The other side of this switch 319 is connected by a wire 497 to one side of the normally open switch CDLS4–B from the other side of which extends a wire 498 connected with one terminal of the coil for relay RTRR, the other side of which coil is connected with wire 353. The normally open contact UV–11 is connected between the wire 497 and a wire 499 which leads to one side of a normally open contact RTRR–6 of relay RTRR. The other side of the contact RTRR–6 is connected to a wire 500 extending to the previously mentioned wire 446.

The wire 499 is also connected to a wire 501 to which is connected a wire 502 extending to the normally open contact TRR2–3 and from the latter contact a wire 503 extends to the previously mentioned wire 483 at a point intermediate the contacts TRR2–1 and TLS2–B. Also connected with wire 501 is a wire 504 extending to the normally open contact TRR2–4 from which a wire 505 extends to a connection between the normally closed contact TRR2–2 and the normally open contact TLS3–B. The wire 498 has a wire 506 connected thereto intermediate the contact CDLS4–B and the coil RTRR. The wire 506 is connected to the normally closed contact 2FR–8 which is in series with the normally closed contact 3FR–8, this circuit continuing through the wire 507 to one terminal of the coil for relay RTR and being completed from the other terminal of the coil to the wire 353 by a wire 508.

The previously mentioned wire 501 is also connected to the normally closed contact TRR1–6 which is connected to the normally open contact CDLS6–B by a wire 509. From the contact CDLS6–B a wire 510 extends back to the wire 446. Connected in series between the wires 509 and 510 is a circuit comprising a wire 511, the normally open contact CDLS1–B, normally closed contacts ILS6–A and LCS–2, and a wire 512. Connected in parallel about the contacts CDLS1–B and ILS6–A is the normally open contact CDLS5–B. Connected at a point intermediate the contacts ILS6–A and LCS–2 is a wire 513 which extends to the normally open contact MS–1. This latter contact is connected to the normally open contact HUV–10 by a wire 514 and from contact HUV–10 a wire 515 extends to a wire 516 which, in turn, is connected between the normally open contacts TRR1–7 and ILS7–B. A wire 517 connects the other side of the normally open contact TRR1–7 to the wire 446. From the normally open contact ILS7–B a wire 518 extends to the normally closed contact RTFR–3 which is connected by wire 519 to one terminal each of the coils for relays TRR1 and TRR2. These coils are connected in parallel with each other and have their opposite terminals connected to wire 353 by a wire 520.

The wire 446 also has a wire 521 connected thereto and to the normally closed contact ILS7–A from which a wire 522 extends and is connected with a wire 523 leading to the normally open contact ILS2–B. From the latter contact this circuit extends to one terminal of the coil for relay LSC the circuit being completed through a wire 524 connected with the control circuit power supply wire 353. The wire 522 is also connected to the normally open contact CDLS3–B from which a wire 525 leads to the normally closed contact LCS–3. From the latter contact a wire 526 extends to a connection with a wire connecting the normally open contact LCS–4 to the normally closed contact RTRR–7. The last-mentioned contact is connected to a wire 527 extending to the normally open contact ILS3–B and the latter is connected by a wire 528 to one terminal of the forward cross slide solenoid FCS the other terminal of which is connected to the wire 353. Wire 527 is also connected to the normally open contact ILS4–B which is in series with the rear cross slide solenoid RCS, the latter in turn being connected to wire 353 so that the normally open contact ISL4–B and solenoid RCS are in series with each other and in parallel with the normally open contact ILS3–B and solenoid FCS. A wire 529 is connected to the wire 446 and extends to the normally open contact CDLS3–B from which a wire 530 extends to the normally open contact LCS4–B which is connected with the previously mentioned wire 526. The wires 530 and 516 are connected by a wire 531.

*Energization of the circuits*

The manner in which the machine operates when set for either manual or automatic operation will be presently set forth. For both types of operations energization of the machine power and control circuit is effected by connecting the power lines 327, 328 and 329 to a source of three-phase alternating current electrical power. This energizes the transformer TF connected with the wires 327 and 329, Fig. 52, so that alternating current electrical power of reduced voltage is supplied to the wires 352 and 353 of the alternating current control circuit. Likewise, power is supplied to the full wave rectifier 354 and the rectifier in turn supplies direct current electrical power to the supply lines 357 and 358.

Immediately upon energization of the circuits, as just mentioned, the rapid traverse brake RTB is energized through a circuit extending from wire 358 through normally closed contact CDLS8–A, wires 366 and 364, normally closed contact RTF–4, wire 365, and the normally closed contact RTRR–1 to the rapid traverse brake RTB, the circuit being completed through the coil of the brake to the wire 357. Likewise, the brake IB for the index motor is energized through the wires 358, 369, normally closed contact I–1, a variable resistance 370, wire 371 and the coil of the brake which is connected with the wire 357.

The spindle control knob 322 is normally in the "Off" position and hence contact MS–4 is closed. Consequently the operator now presses the start push button 315 on the control panel 314 thereby energizing the contactor PM for the hydraulic pump motor 308 through a circuit extending from the wire 352, through the normally closed stop switch 316, the now closed start switch 315, contact MS–4 and the coil of the contactor PM, the circuit being completed to the wire 353 of the control circuit. The energization of the contactor PM causes it to close its normally open contacts PM–1, PM–2 and PM–3 thereby energizing the pump motor 308 to supply fluid under pressure for operation of the clutches C1, C2, C3 and C4 under control of the value operating solenoids SVA, SVB and SVC. Energization of the contactor PM also caused the latter to close its contact PM–4 thereby providing a holding circuit around the start button 315 through the wire 374, contact PM–4 and wires 375, 372. Consequently the operator may release the start button and the pump motor 308 will remain energized until such time as the stop button is actuated.

The aforementioned closing of the PM–4 contact also completes a circuit therethrough to the wire 373 which constitutes one of the main supply wires or lines for the control circuit. The supplying of current to the wire 373 energizes the coil for the main motor forward contactor MMF by a circuit extending from wire 373 through the normally closed contact ILS8–A, wire 376, the normally closed contact TRR1–1, wires 377, 378, the normally closed contact MMR–4 to and through the coil of the contactor MMF, the circuit being completed by wire 379 connected with supply wire 353 for the control circuit. Energization of the contactor coil MMF causes the latter to close its contacts MMF–1, MMF–2, MMF–3, thus connecting three-phase alternating current supply lines 327, 328 and 329 to the main motor 72. Contact MMF–4 has also been opened thereby preventing accidental energization of the main motor reverse contactor MMR, the circuit for which extends through the wire 382 and contact MMF–4.

*Manual operation*

If it is desired to have the machine function under manual control the operator now sets the machine control switch knob 325 on the control panel 314 in the "Hand" position. This closes contacts MC–1 between the wires 438 and 439, Fig. 54, opens the contact MC–2 between the wires 434 and 435, and closes the contacts MC–3 between the wires 494 and 495, Fig. 55. The operator also sets the hand feed switch knob 323 in the "Off" position, thus closing contact HF–1 and opening contact HF–2, Fig. 54, and closing contact HF–3, Fig. 55.

In the event the carrier 66 is not at its most outward position with respect to the headstock, the machine cannot be operated since the normally closed contact CDLS4–A, Fig. 53, would be open and CDLS4–B, Fig. 55 would be closed. In such an event the operator depresses the rapid traverse reverse push button switch 319 thereby completing a circuit extending from the wire 373 through wire 494, the now closed contact MC–3, wire 495, now closed contact HF–3, push button switch 319, wire 497, the now closed contact CDLS4–B, wire 498 and the coil of relay RTRR to the wire 353, thus energizing the rapid traverse reverse relay RTRR. Likewise, a circuit is completed from the wire 498 through wire 506 the normally closed contacts 2FR–8 and 3FR–8, the wire 507 and the coil of the rapid traverse reverse contactor RTR to the control circuit power supply line 353. The resulting energization of the relay RTRR causes it to open its contact RTRR–1, Fig. 52, thereby deenergizing and releasing the rapid traverse brake RTB.

Energization of the contactor coil RTR caused the latter to close its contact RTR–1, RTR–2, RTR–3, thus connecting the rapid traverse motor with the main alternating current supply lines 327, 328 and 329 in a manner for effecting reverse rotation of the rapid traverse motor 181 so that the latter drives the carrier at the rapid rate to its most outward position. When this position has been reached, switch CDLS4 is actuated so that the contact CDLS4–B is opened and CDLS4–A is closed by means of the switch operating lug or cam 271d on the wide ring 271 of the cam ring control drum 270 shown in Fig. 24. Opening the contact CDLS4–B deenergizes the rapid traverse motor contactor RTR so that the rapid traverse motor is deenergized. Also, the relay RTRR is deenergized so that its contact RTRR–1 closes, thus again energizing the rapid traverse brake RTB so that the carrier 66 is stopped at its maximum outermost position.

Figure 54:
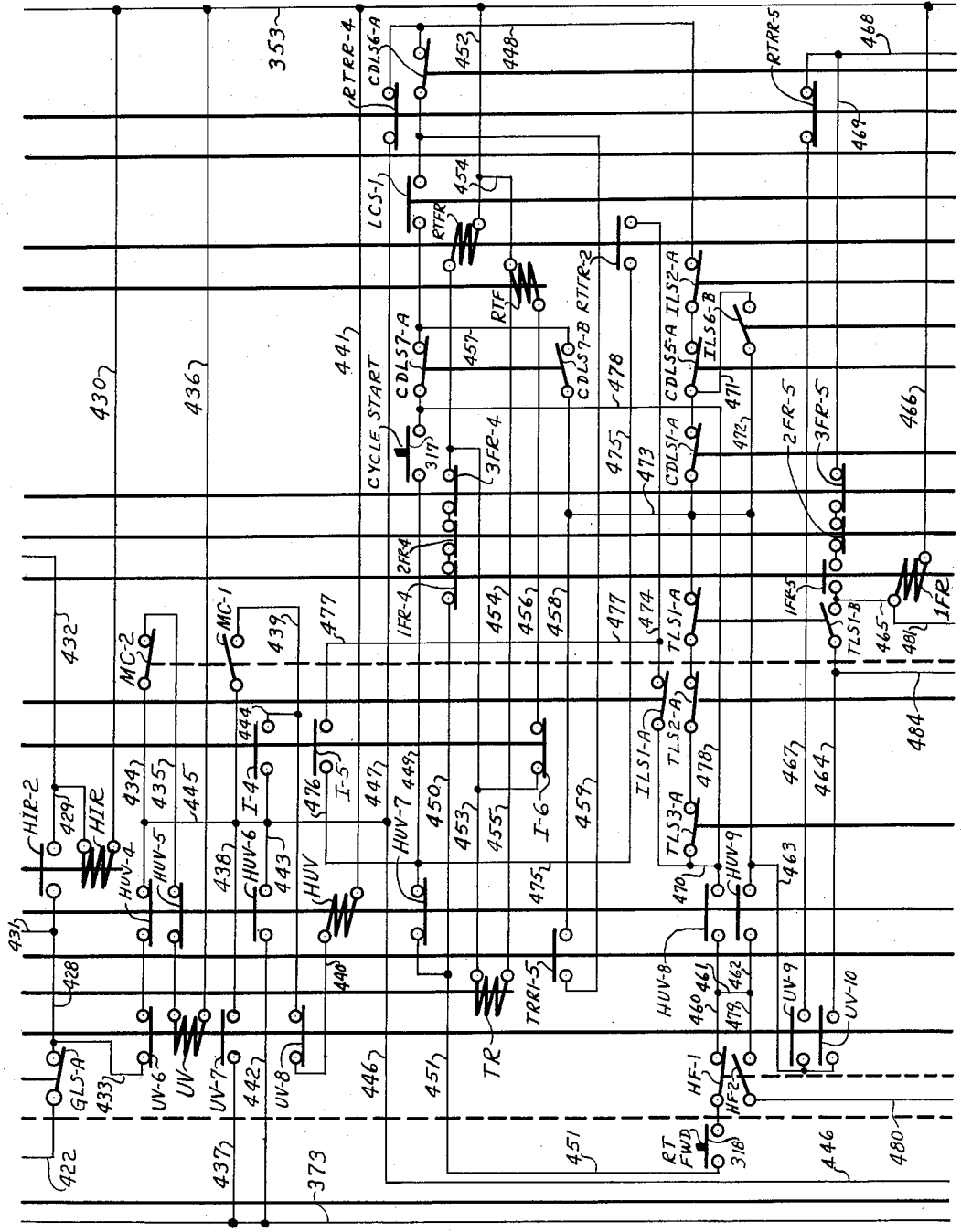

The closing of the CDLS4–A contact, Fig. 53, energized the hand index relay coil HIR, Fig. 54, through a circuit extending from wire 373 through contact CDLS4–A, wire 422, normally closed contact GLS–A of the switch GLS, which is actuated by the index cam 222, to and through the wires 428, 431, the normally closed contact 320–A of the hand index switch 320, to the wire 432 connected with one terminal of the coil of the hand indexing relay HIR. Since the other terminal of this coil is connected to the supply wire 353 through the wire 430, the HIR relay is energized thereby closing its contacts HIR–1 and HIR–2. Closing of the contact HIR–2 provides a holding circuit for the relay about the contact 320–A, while the closing of the contact HIR–1 sets up a circuit for controlling indexing, as will be later explained.

Simultaneously with the energizing of the hand index relay coil HIR, the hand under voltage relay coil HUV was energized through the normally closed contacts UV–6 and HUV–4, Fig. 54, this circuit continuing through the wires 434, 445 and 438 to and through the now closed contact MC–1 to the wire 439, thence through the normally closed contact UV–8 to the wire 440 connected with one terminal of the coil of the HUV relay, the other terminal of which is connected with the wire 441 extending to the control circuit supply wire 353. The resulting energization of relay coil HUV causes the latter to close its normally open contact HUV–6 providing a holding circuit through the latter and the wire 443 to the wire 445 thence to the wire 438 and through the remainder of the circuit as previously described. The contacts HUV–4 and HUV–6 are of the overlapping type so that the relay is not deenergized during the transition to its holding circuit. The energization of relay HUV has also opened its normally closed contacts HUV–5 and HUV–7 and closed its normally open contacts HUV–1, HUV–2, HUV–3, HUV–6, HUV–8, HUV–9 and HUV–10 to set up the circuit for hand control.

The operator now turns the hand spindle speed selector switch knob 326 on the control panel 314 to the desired spindle speed. Let it be assumed that this speed is to be the No. 3 spindle speed and hence the knob is turned to this indicium. This results in closing of the contact SS–2, contact SS–1 being open. Closing the contact SS–2 has energized the solenoid SVB through a circuit extending from wire 373 through the 396, the now closed contacts HUV–3 and SS–2, the wires 397 and 398, to and through the SVB solenoid, the circuit being completed therefrom to the wire 353. To begin rotation of the spindle at the desired speed the spindle control switch knob 323 is then turned to either "Run" or "Jog" position, thus closing contact MS–3, Fig. 52, which completes a circuit from the wire 373 through wire 387, the now closed contacts HUV–1 and MS–3 to the wire 386 and thence through the now closed contact FDLS to and through the solenoid SVC to the wire 353, it being remembered that the FDLS switch is that which is closed when the feed transmission door 171 for the change gears is closed.

The energization of the solenoids SVB and SVC, as just mentioned, shifts the valve bodies thereof to the positions shown in Fig. 52 so that clutches C1 and C4 are energized, while C2 and C3 are deenergized. This releases the braking force on the spindle and drives the latter at the No. 3 speed.

Let it be assumed that feed No. 2 is to be used on face No. 1 of the carrier. The hand feed selector switch knob 324 is then set at the No. 2 indicium so that contact FS–2 is closed while contacts FS–1 and FS–3 are opened, see Fig. 55. The operator now rapid traverses the carrier 66 to the point at which it is to start feeding movement by depressing the rapid traverse forward push button switch 318 connected in the circuit of the RTFR relay and the rapid traverse forward contactor RTF, Fig. 54. The circuits thus established extend from the wire 373 through the wire 442, the now closed contact HUV–6, wires 443, 445 and 447, the normally closed contact RTRR–4, wire 448, the normally closed contacts 1LS2–A, CDLS5–A, CDLS1–A, wires 473 and 472, to and through the now closed contact HUV–9 to the wire 462 then through the wires 461 and 460 to and through the now closed contacts HF–1 and the rapid traverse forward push button switch 318 to the wire 451 connected by the wire 450 to the normally closed contacts 1FR–4, 2FR–4 and 3FR–4. The circuit continues through the coil of the relay RTFR to the wire 452 which is connected with the power supply wire 353 thus energizing this relay. Connected in parallel about the RTFR relay, by the wires 453 and 454, is the coil of the timing relay TR so that this relay is also energized. The rapid traverse forward contactor RTF is likewise energized since it is also connected in parallel with the RTFR relay through the wires 453, 455, normally closed contact I–6, wire 456, the coil of the RTF contactor, and wire 454.

The energization of the contactor RTF causes it to close its contacts RTF–1, RTF–2, RTF–3, Fig. 52, thus closing a circuit from the three-phase alternating current supply lines 327, 328 and 329 energizing the rapid traverse motor 181 for forward rotation. Contact RTF–4 in the circuit of the rapid traverse brake RTB is opened so that the motor 181 is free to rotate and drive the carrier 66 at the rapid traverse rate. The energization of the timing relay TR opened the normally closed contact TR–1 in the circuit to the solenoids F1, F2 and F3 thereby preventing energization of any of the feed clutches. The rapid traverse forward movement of the carrier continues until the operator releases the push button switch 318, thus breaking the above described circuit so that the contactor coil RTF, relay RTFR, and timing relay TR are deenergized. Consequently the rapid traverse motor 181 is deenergized and the rapid traverse brake RTB is applied. The circuit to the feed clutches F1, F2 and F3 is not, however, immediately established even though contact CDLS8–A was opened and CDLS8–B was closed, shortly after the carrier moved forwardly by the cam lug 271e moving from operating position with respect to switch CDLS8. This maintenance of the circuit to the feed clutches in open condition after the rapid traverse motor stops is to permit the carrier to be slowed down from the rapid traverse rate to a feed rate, the delay being achieved by virtue of the TR relay being of the time delay type so that closing of its contact TR–1 does not occur immediately upon deenergization of the TR relay.

Starting of the feeding movement of the carrier is effected by turning the hand feed switch knob 323 to the "On" position, see Fig. 45. This closes the contact HF–2, see Figs. 49 and 54, and opens the contacts HF–1 and HF–3. As a result, the relay 2FR, Fig. 55, is energized since the HF–2 contact is now closed providing a circuit from the wire 462 through HF–2 to the wire 480, thence through the now closed switch FS–2 to the wires 482 and 485, to and through the coil of the relay 2FR to the wire 486 which is connected with the wire 353. The resulting energization of relay 2FR causes it to open the contacts 2FR–2 in the circuit of the rapid traverse brake RTB, Fig. 52, deenergizing the latter, and closes the contact 2FR–1 in the circuit of the solenoid for the feed clutch F–2. After the aforementioned predetermined time interval for the closing of the TR–1 contact has elapsed so that the carrier is moving at a speed equal or lower than a feeding rate, the TR–1 contact is closed and hence a circuit is completed therethrough and through contact 2FR–2 energizing the coil of the feed clutch F2 so that the carrier 66 moves forwardly at the No. 2 feeding rate, reference being had to Fig. 7 which shows the relationship of the feed clutch F2 and the output shaft 157 of the feed gear train. The feeding movement of the carrier may be terminated at any preselected point by the operation of either the contacts CDLS1–A or CDLS5–A of the corresponding switches by the lugs on the cam drum 270, since the "A" contacts of these switches are in series in the energizing circuit for the 2FR relay. The feeding movement may also be terminated before actuation of either of the just mentioned switches by turning the hand feed switch knob 323 to the "Off" position thereby opening the contact HF–2, Fig. 54, in the energizing circuit of the 2FR relay controlling energization of the feed clutch F2.

At the termination of the feeding movement, the operator may cause the turret to be retracted or returned at the rapid traverse rate by depressing the push button 319 on panel 314 thereby operating the associated contact and energizing the circuit for rapid traverse movement of the carrier as was mentioned at the beginning of the description of manual operation for the machine.

As has been mentioned above, indexing of the carrier to bring a different face thereof into operative position can only be effected when the carrier has been retracted to its outermost position with respect to the headstock so that the limit switch CDLS4 will be actuated thereby closing its contacts CDLS4–A, energizing the HIR relay, and opening its contacts CDLS4–B in the circuit of relay RTRR. When this position of the carrier has been reached the operator may effect indexing by depressing the hand "index" push button 320 on the control panel 314 thereby completing a circuit through contact 320–B thereof, see Fig. 53, energizing the contactor IM and the relay I. This circuit extends from the wire 373 through the now closed contact CDLS4–A, UV–5, HIR–1, and the actuated contact 320–B of switch 320 to the wires 423 and 424 connected with the relay I and contactor IM, respectively, and which each have their other terminals connected to the wire 353.

Energization of the contactor coil IM causes it to close its contacts IM–1, IM–2 and IM–3, Fig. 52, thereby energizing the index motor 228. The energization of the relay coil I causes opening of the contact I–1 in the circuit of the index brake IB, Fig. 52, thereby deenergizing the latter so that the indexing cams 221, 222 are now rotated by motor 228 thereby effecting indexing of the carrier. The initial movement of the indexing cams actuates the switch GLS, see Fig. 23, to cause opening of the contact GLS–A thereof and closing of the contact GLS–B. Opening of the contact GLS–A opens the circuit to the HIR relay so that the contacts HIR–1 now opens. However, the closing of the contact GLS–B has maintained the circuit to the contactor coil IM and to the relay coil I through the contact GLS–B and wire 423. This places the indexing under control of the indexing cams 221, 222 so that the carrier can index only one face at a time for each actuation of the hand index switch 320. That is to say, when the next face of the carrier has been properly positioned the switch GLS is again actuated opening the contact GLS–B and closing the contact GLS–A so that indexing relay I and index contactor IM are deenergized thus terminating the indexing movement and this indexing can only be reinitiated by again actuating the switch 320. Moreover, by this provision it is not necessary to hold the indexing push button 320 depressed throughout the indexing movement. Furthermore, the carrier is always indexed a predetermined identical amount so that each face of the carrier is properly positioned without the necessity of close attention by the operator.

If it be desired to employ the machine for providing right-hand threads by a tapping or threading operation, a dog is placed on the index control drum 280 to actuate the limit switch ILS–7 and effect closing of the contact ISL7–B and opening of contact ILS7–A, Fig. 55, when the carrier is indexed to bring the face on which the threading operation is to occur into operative position. The spindle speed and rate of feed are selected as previously described and the carrier is rapid traversed forward and fed into the work as has been previously set forth.

When the threading operation is completed the tap, die, or other threading tool must be backed off the work at the same feeding rate as that at which the thread was cut to prevent damage to the thread.

This is achieved by virtue of the fact that the aforementioned closing of contact ILS7–B has prepared a circuit for energization of the TRR1 and TRR2 relays which circuit is, however, held open at the CDLS3–B contact during the threading operation. When the carrier nears a point adjacent the end of its forward feeding movement, for example, approximately one inch from the end thereof, and which point corresponds with the desired termination of the threading operation the CDLS3–B contact is closed by lug 271c on the cam ring 271. This completes the energization circuit for the relays TRR1 and TRR2 which circuit extends from wire 373 through wire 442, the now closed contact HUV–6, wires 443, 445 and 446, the now closed contact CDLS3–B, wires 530 and 531, to and through the previously closed contact ILS7–B, the wire 518 and normally closed contact RTFR–3 to the wire 519 which is connected to one terminal each of the coils for the relays TRR1 and TRR2, the circuit being completed through wire 520 to the wire 353.

The energization of the tapping relay TRR1 causes it to close its normally open contact TRR1–7 and open its normally closed contact TRR1–6. The closing of contact TRR1–7 completes a circuit from the wire 446 through the wire 516, the now closed contact ILS7–B, wire 518, normally closed contact RTF–3 and wire 519 to the tapping relays TRR1 and TRR2 thereby providing a holding circuit for the TRR1 and TRR2 relays. Opening of the contact TRR1–6 breaks the circuits which are controlled by the CDLS1–B, CDLS5–B and CDLS6–B contacts, any one of which would normally result in stopping feeding movement of the carrier. Also, the closing of the normally open contact TRR1–5 completes a circuit therethrough in parallel with the contacts CDLS1–A and CDLS5–B so that the feed relay and feed clutch for the selected rate of feeding movement remain energized. However, energization of the tapping relay TRR1 has also opened its contacts TRR1–1 and TRR1–3 and closed its contacts TRR1-2 and TRR1-4, Fig. 52, thus deenergizing the main motor forward contactor MMF and energizing the main motor reverse contactor MMR. Consequently, the main motor 72 is now energized through the resulting closing of the contacts MMR-1, MMR-2 and MMR-3 so that the motor 72 drives the spindle 64 and the feed gear train in a reverse direction, the rate of driving being the same during the resulting withdrawal of the die or threading tool as was used in effecting the formation of the thread.

When the tool has cleared the work, the operator may then terminate the feeding movement and rapid traverse the carrier 66 to its outermost position, as previously explained, by operation of hand feed switch and the rapid traverse reverse push button 319. When the carrier is again at its extreme outer position, it may then be indexed to its next face by operation of the index push button 320 as mentioned above, which indexing releases the switch ILS7 so that its contacts return to normal, that is, with the contact ILS7-A closed and ILS7-B opened. Opening of the contact ILS7-B deenergizes the tapping relays TRR1 and TRR2. Deenergization of the tapping relay TRR1 returns its contacts to the positions indicated in the drawings so that the main motor 72 is again energized for rotation in the forward direction by deenergization of the MMR contactor and energization of the MMF contactor.

In the event it is desired to reverse the carrier 66 before the threading operation is completed and the CDLS3-B contact is closed, as described above, the operator moves the spindle control knob 322 momentarily from "run" to "tap reverse" position and then back to "run" position. This closes the contact MS-1, Fig. 55, long enough to energize the tapping relays TRR1 and TRR2 through a circuit extending from the wire 446 through the wires 510, 512, the normally closed contact LCS-2, wire 513, the now closed contacts MS-1 and HUV-10 to the wire 515, thence through the now closed contact ILS7-B, the circuit continuing through the wire 518 and the normally closed contact RTRR-3 to the wire 519 connected with the coils of the relays. The resulting energization of the TRR1 and TRR2 relays serves as before to effect backing of the carrier from the work at the feeding rate.

When left-hand threads are to be formed it will now be evident that the spindle must rotate in reverse, while the feeding movement of the carrier must be in a forward direction and that in backing the tool from the work the spindle must rotate in a forward direction so that a means must be provided for reversing the direction of rotation of the feed shaft 157 with respect to the spindle 64. This is readily accomplished in the machine of this invention by opening the door 171 of the gear train shown in Figs. 7 and 7A and changing certain of the gears. For example, the gears may be altered from the setup as shown in Fig. 7A to that as shown in Fig. 7. During this operation the machine cannot be inadvertently operated since the FDLS switch, actuated by the door 171, is open thereby deenergizing the solenoid SVC and applying braking action to the spindle 64 by operation of both of the clutches C3 and C4 since the SVB solenoid is also deenergized when the machine is not in operation.

Let it be assumed that a left-hand thread is to be cut with the spindle operating at its No. 3 speed and the carrier feed at the No. 2 rate. The operator will then remove the gears 151 and 152 on shaft 150, replace gear 160 on shaft 161 by the gear 149c and supply gear 149f on shaft 149b. Also, he replaces the gear 154 on shaft 147 with the gear 149d and supplied the shaft 149a with the gear 149e so that the gear train is then established as shown in Fig. 7. Consequently the shaft 157 will now rotate in reverse with respect to the spindle 64 as has been explained heretofore in conjunction with the detailed description of the gear train.

A dog is placed upon the index control drum 280 to operate the limit switch ILS8 and another dog is placed on the index control drum 280 to operate the limit switch ILS7. Therefore, when the circuit is now energized and the carrier indexed to bring the proper face into operative position, as explained before, the main motor is energized to rotate the spindle 64 in reverse direction since the switch ILS8 is actuated so that contact ILS8-A is now open and the contact ILS8-B is closed, see Fig. 52. Hence, the contact MMR is energized through a circuit comprising the wire 380, the normally closed contact TRR1-3, wires 381, 382, the normally closed contact MMF-4, the contactor coil MMR and the wire 379. This energization of the contact MMR closes its contacts MMR-1, MMR-2 and MMR-3 to supply three-phase alternating current to the main motor 72 in the direction productive of reverse rotation. The tool carrier 66 may now be rapid traversed to the feeding position in the same manner as previously described since the reversal of the direction of rotation of the spindle 64 has not altered the direction of movement of the carrier, it being remembered that the rapid traversing is accomplished by a separate rapid traverse motor and the shaft 157 is not connected with the spindle at this time because none of the feed clutches F1, R2 and F3 is energized. When, however, the operator switches from rapid traverse to feed, as previously described, the direction of movement of the carrier will still be forward even though the spindle is rotating in the reverse direction, since the rotation of the shaft 157, comprising the output of the feed gear train, has been reversed with respect to the direction of spindle rotation by the changing of the gears in the manner described above.

At the end of the feeding movement the cam lug 271c closes contact CDLS3-B thereby energizing the tapping relays TRR1 and TRR2 as previously described in conjunction with the formation of a right-hand thread. If reversal is desired before the actuation of the CDLS3-B contact, it may be effected by actuating the spindle control lever to momentarily close the contact MS-1. In either case the resulting energizing of the tapping relay TRR1, as before, causes it to open its contact TRR1-3, Fig. 52, thus deenergizing the contactor coil MMR so that energization of the main motor 72 for rotation in the reverse direction is terminated. Simultaneously, the contact TRR1-4 is closed so that the main motor contactor MMF is now energized through the now closed contacts ILS8-B, TRR1-4 and MMR-4. Therefore, the motor 72 is now energized for rotation in the forward direction by the resulting closing of the MMF-1, MMF-2, MMF-3 contacts, while opening of the MMF-4 contact prevents inadvertent energization of the MMR contactor. Since the shaft 157, providing the feeding rate of movement for the carrier, now rotates in the reverse direction with respect to the spindle, the forward rotation of the latter now causes the tool to be retracted from the work and this retraction is at the feeding rate. While the tool is thus being retracted from the work, it is impossible to rapid traverse the tool carrier to the rear since the contact 2FR-8, Fig. 55, is opened as a result of the energization of the 2FR relay providing the feeding rate No. 2, thereby preventing energization of the contactor coil RTR controlling the rapid traverse reverse rotation. Also the HF-3 contact is open. When, however, the tool has been fully retracted with respect to the work, the carrier can then be rapid traversed to its outermost position by deenergization of the 2FR relay, by operation of the hand feed switch, and then operating the rapid traverse switch 319, as previously explained in conjunction with producing a right-hand thread.

While the changing of the gears for left-hand threading operation has been explained as being effected immediately before the operation is to occur, it will be apparent that the machine may be prepared in advance for such operation. Thus, it will be remembered that at least one set of change gears, namely, gears 153 and 166 are not changed so that clutch F1 is always effective to provide for rotation of the shaft 157 in the same direction as that of the spindle. Moreover, it will be remembered that it is the switch ILS8 which determines the initial direction of rotation of the spindle. Hence, although the gears may be provided as shown in Fig. 7, if the dog for operating switch ILS8 is omitted for any given face of the turret, the spindle will be energized for rotation in the forward direction in which event the F1 clutch is available for controlling feeding movements of the carrier in the normal manner for effecting turning, boring, drilling, formation of right-hand threads and the like, as may be desired. When, however, the left-hand tapping or threading operation is to be performed, one face of the carrier will be provided with the aforementioned dogs for operating switches ILS7 and ILS8. Hence, when this face of the carrier is now indexed to operative position, the spindle will be rotated in the reverse direction and the carrier will be moved in the proper direction under control of clutches F2 and F3 as before explained. It will also be apparent that although two feeding rates may be provided for a left-hand tapping or threading operation by providing the change gears as shown in Fig. 7, it is also possible to provide reversing gears for only one of the feed drives so that two drives are available for other operations when other faces of the carrier 66 are indexed to operative position.

Cross slide operation is controlled by the various dogs and cams and is not directly started or stopped by manually actuated switches. Consequently, for the sake of brevity, cross slide operation is described only in conjunction with automatic operation although it will be apparent that the cross slides may be used with manual control of the carrier movement.

*Automatic operation*

When the machine is to function automatically, the main motor 72 is started, the power and control circuit are energized as previously described and, unless left-handed threads are to be formed, the gears in the gear box will be as shown in Fig. 7A. If a left-hand thread is to be formed during one part of the machining cycle, the change gears for the feed trains controlled by clutches F2 and/or F3 are reversed as previously explained. Whether the train controlled by F2 or that controlled by F3 is reversed or both will depend upon the pitch and number of threads to be formed. In the event the carrier 66 is partially indexed or is not at its most rearward position the operator must first turn the knob 325 of the machine control switch to the "Hand" position and then cause the carrier to completely index or move to its most rearward position by depressing either the push button 320 or the push button 319 as has been previously described in conjunction with the initial conditioning of the machine for hand operation.

When the carrier 66 has been properly positioned, the knob 325 is turned from the "Hand" to the "Automatic" position thereby closing the contact MC-2 and opening contact MC-1, Fig. 54, and opening the contact MC-3, Fig. 55. Closing of the contact MC-2 energizes the under voltage relay UV through a circuit extending from the normally closed contact CDLS4-A, Fig. 53, through wire 422 and the now closed contact GLS-A to the wire 433, thence through the normally closed contacts UV-6 and HUV-4, the now closed contact MC-2, wire 435 and the normally closed contact HUV-5 to and through the coil of the relay UV to the wire 436 which is connected with the control circuit power wire 353. Upon energization of the relay coil UV the contact UV-7 thereof is closed thereby providing a circuit therethrough and through the wires 438, 445, 434, contact MC-2, wire 435, and contact HUV-5 to the coil UV thereby providing a holding circuit for the UV relay maintaining the latter energized when the previously mentioned circuit is now opened by the opening of the UV-6 contact resulting from energization of the UV relay. It will be understood that the UV-6 and the UV-7 contacts are of the overlapping type so that the latter is closed before the former opens. The hand under voltage relay coil HUV is not energized during automatic operation and hence its contacts remain in the positions shown in the drawings, thereby preventing operation of the hand control circuits in the event of inadvertent actuation of the controls thereof.

The above-mentioned energization of the under voltage relay UV has also closed its contacts UV-1, UV-2, UV-3 and UV-4, Fig. 53, and opened its normally closed contact UV-5. Likewise the contact UV-8 is opened, Fig. 54, and the contacts UV-9, UV-10, UV-11 are closed, Figs. 54, 55, thereby setting up the automatic control circuit, the UV relay remaining energized throughout the automatic operation.

The operator may now start the automatic cycle by depressing the push button cycle start switch 317, Fig. 54, thereby energizing the contactor coil RTF, the relay RTFR and the time relay TR through the now closed contact UV-7, wires 438, 445, 447, the normally closed contact RTRR-4, wire 448, closed contacts ILS2-A, CDLS5-A, CDLS1-A, TLS1-A, TLS2-A and TLS3-A, the circuit continuing through the wire 478 to and through the now closed cycle switch 317 to the wire 449 thence through the normally closed HUV-7 contact to the wire 450 and then in series through the normally closed contacts 1FR-4, 2FR-4 and 3FR-4 to and through the coil of the relay RTFR, the circuit being completed by the wire 452 to the power supply wire 353. The coil of relay TR is energized through the same circuit it being remembered that this coil is connected in parallel with the RTFR coil by the wires 453 and 454. Likewise, the RTF contactor is energized through the same circuit under control of the contact I-6 this circuit extending in parallel about the RTFR relay through the wires 453 and 455, contact I-6, wire 456, the coil of the relay RTF and wire 454.

The energization of the relay RTFR results in closing of its normally open contact RTFR-2 thus providing a holding circuit for relays RTFR and TR as well as contactor RTF through the wire 470, normally closed contact ILS1-A, wire 474, contact RTFR-2 and wire 475 bridged about the cycle start switch 317. The closing of the contact RTFR-1, Fig. 53, as the result of energization of relay RTFR, provides a circuit therethrough energizing the solenoid SVC thereby releasing the braking action upon the spindle 64 as previously explained. The opening of the contact RTFR-3, Fig. 55, opens the circuit in the tapping relays TRR1 and TRR2 thereby preventing inadvertent energization thereof. The energization of the TR relay results in opening of the contact TR-1, Fig. 52, thus preventing energization of the feed clutches F1, F2 or F3 while the closing of the contact TR-2 prepares a circuit therethrough for subsequent energization of the rapid traverse brake. The energization of the contactor RTF closes its contacts RTF-1, RTF-2, RTF-3 thereby energizing the rapid traverse motor 181 for forward rotation. The contact RTF-4 is also opened thereby opening the circuit to the rapid traverse brake RTB so that the carrier starts forward at the rapid rate as will now be readily understood.

During the rapid traverse forward movement, a dog on the control turret 68 selectively operates certain of the limit switches TLS-4, TLS-5 or TLS-6, shown in Fig. 37, to select the desired spindle speed. For purposes of illustration, let it be assumed that the desired speed is No. 2, the dogs will then be positioned to first operate the limit switch TLS-6 and then the switch TLS-4. The operation of switch TLS-6 closes the contact TLS6-B, Fig. 53, thus energizing the spindle pilot relay SR through a circuit extending from wire 353 through the UV-4 contact, which is now closed, and the normally closed IR–2 contact to and through the now closed TLS6–B contact and wire 416 to the coil of the SR relay thence through the wire 417 to the wire 353. Relay I and contactor IM will also be energized since these are connected with wire 417 and the wire 353, as will be readily evident from an inspection of Fig. 53.

The energization of relay SR opens its contact SR–1 and closes its contact SR–2 thereby energizing the valve operating solenoid SVA through a circuit containing the now closed contact UV–2, wire 401 and the now closed contact TLS4–B, which was actuated by the dog on the control turret, wire 404, the now closed contact SR–2, and wires 402, 395 connected with the SVA relay. Relay 1SR is also energized since it is connected between the wires 402 and 353 and is therefore in parallel with the SVA solenoid. When the TLS6–B contact subsequently opens, as the result of movement of control turret, the SR relay will be deenergized. The SR–1 and the SR–2 contacts, however, are of the overlapping type so that the circuit to relay 1SR and the solenoid SVA is maintained through the SR–2 contact until a holding circuit has been established through the SR–1 and the 1SR–1 contacts, which holding circuit is also bridged about the TLS4–B contact so that the SVA solenoid and relay 1SR remain energized after the TLS4–B contact is opened and the relay SR is deenergized.

Energization of the valve operating solenoid SVA disengages the hydraulic clutch C1 and engages clutch C2 so that the spindle now rotates at the speed No. 2 since the SVC solenoid was previously energized thereby engaging the C3 clutch and disengaging the C4 clutch.

At the point of the travel of the carrier 66 where its movement is to be changed from rapid traverse forward to feed in a forward direction an overriding feed dog on control turret 68 operates one of the limit switches TLS1, TLS2 or TLS3, see Fig. 37, to select one of the feed rates 1, 2 or 3. It has been assumed that the carrier is to be fed at the No. 3 rate and that there is to be no dwell and no cross slide operation. Consequently, the aforementioned overriding feed dog is positioned to operate limit switch TLS3 thus causing the latter to open its contact TLS3–A, Fig. 54, thus breaking the energizing circuit for the contactor coil RTF, relay RTFR and relay TR. Deenergization of the RTF contactor breaks the circuit to the rapid traverse motor 181 and closes the contact RTF–4 establishing a circuit energizing the rapid traverse brake RTB thereby terminating the rapid traverse rate of movement of the carrier and rapidly reducing its speed. The simultaneous closing of the TLS3–B contact, Fig. 55, energizes the feed relay 3FR through a circuit extending from wire 373 through the now closed contact UV–7, wires 438, 445, 447, the normally closed contact RTRR–4, wire 448, and the normally closed contaccts ILS2–A, CDLS5–A, CDLS1–A, wires 473, 472 and 463, to and through the now closed contact UV–10 thence through wires 464 and 484 to and through the now closed contact TLS3–B and the normally closed contact TRR2–2 to the wire 490 connected with one terminal of the coil of relay 3FR, the circuit being completed through the wire 491 to the wire 353.

The energization of the feed relay 3FR opens the contact 3FR–8 thereof, Fig. 55, thus opening the circuit to the rapid traverse reverse contactor RTR. Also the contact 3FR–7 is closed, thus providing a holding circuit for the relay 3FR through the now closed contact UV–9 and the normally closed contact RTRR–5, wires 468 and 493, and 3FR–7 and the normally closed contacts 2FR–7 and 1FR–7, to the wire 492 connected with the coil of relay 3FR. The energization of the 3FR relay has also opened the contact 3FR–5 and 3FR–6 thereof thus preventing energization of the 1FR and the 2FR relays so that the feed clutches F1 and F2 cannot be energized at this time. In addition contact 3FR–4 is opened, Fig. 54, breaking the circuit to the RTFR relay and RTF contactor thus preventing energization of the rapid traverse motor 181 in a forward direction. Contact 3FR–3 is also closed, Fig. 53, providing a circuit therethrough maintaining the SVC solenoid energized which, it will be remembered, in conjunction with the prior energization of the solenoid SVA, results in rotation of the spindle in the second speed. Also, energization of the 3FR relay has opened the contact 3FR–2, Fig. 52, breaking the circuit to the rapid traverse brake RTB thus maintaining this brake deenergized. Finally 3FR–1 contact is closed completing a circuit therethrough energizing the coil of the F3 clutch thus providing feeding rate No. 3 for the carrier, it being remembered that the CDLS8–B contact is closed at all times except when the carrier is at its extreme outer position and hence has closed during the forward movement of the carrier.

As mentioned heretofore, the 3FR–2 contact opens the circuit to the rapid traverse brake. However, the TR–2 contact is in parallel with the contact 3FR–2 and the TR–2 contact was previously closed so that the rapid traverse brake is not deenergized immediately by opening of the 3FR–2 contact. Also the TR–1 contact being open and in series with the 3FR–1 contact, the aforementioned circuit to the coil of the feed clutch F3 is not immediately closed upon closing of the 3FR–1 contact. The TR relay is, as mentioned before, a time relay and is provided to insure that the carrier has been slowed from the rapid traverse rate of movement to a feeding rate of movement, or to a rate somewhat below the feeding rate, before the feed clutch is engaged. After the time interval necessary for the rapid traverse brake to effect such slowing has elapsed, the TR relay opens its TR–2 contact and closes its TR–1 contact, as the result of its prior deenergization as mentioned above, thereby completing the above mentioned circuits releasing the rapid traverse brake and energizing the F3 clutch so that the carrier is now advanced at feeding rate No. 3.

At the end of the feeding movement of the carrier the cam ring control drum 270, which is driven in timed relation with the feeding of the carrier 66, has rotated to a point such that the lug 271a on the wide cam ring 271 actuates the limit switch CDLS1 thus closing the contact CDLS1–B, Fig. 55, and opening the contact CDLS1–A, Fig. 54. Closing of the contact CDLS1–B energizes the rapid traverse reverse relay RTRR through its circuit extending from the wire 446 through wire 510 to wire 512 thence through the normally closed contacts LCS–2, ILS6–A and CDLS1–B to the wire 511 and then through wire 509, the normally closed contact TRR1–6, the now closed contact UV–11 to the wire 497 and the now closed contact CDLS4–B, which was closed when the carrier started forward, the circuit being completed through wire 498 thence to and through the coil of the relay RTRR to the wire 353. The circuit is also established, as above described, for energizing the RTR contactor connected in parallel with the RTRR relay by means of wire 506, the normally closed contacts 2FR–8 and 3FR–8, and wire 507, this circuit, however, now being held open at contact 3FR–8 thus preventing energization of the RTR contactor at this time.

The energization of relay coil RTRR opens its contacts RTRR–1, Fig. 52, to maintain the rapid traverse brake RTB deenergized. Also contact RTRR–2 is closed maintaining the solenoid SVC energized so that the spindle continues to rotate as above mentioned. Contact RTRR–3 is also closed thus setting up an index circuit, hereinafter referred to, while the contact RTRR–4 is opened thereby preventing energization of the RTFR relay controlling the rapid traverse forward circuit. In addition, the RTRR–5 contact is opened, Fig. 54, thus deenergizing the feed relay 3FR while the contact RTRR–6 is closed, Fig. 55, providing a holding circuit therethrough for the RTRR relay. Also, the RTRR–7 contact is opened thus opening the circuit to the cross slide solenoids FCS and RCS preventing cross slide movement.

When the relay 3FR has been deenergized, as just mentioned, the contact 3FR-8 is closed so that the contactor coil RTR is now energized in parallel with the RTRR relay through the wire 506, contacts 2FR-8 and 3FR-8, wire 507, the coil of the RTR contactor and wire 508. This energization of the RTR contactor closes the contacts RTR-1, RTR-2 and RTR-3, Fig. 52, thus energizing the rapid traverse motor 181 for rotation in the reverse direction thereby causing the carrier 66 to be retracted at the rapid traverse rate. The closing of the contact RTRR3, Fig. 53, energizes the index relay IR through the circuit extending from the wire 373 through contact UV-4, wires 414, 415 and 420, contact RTRR-3, wire 418 of the normally closed single operation switch SOS but which may be manually operated when it is desired to terminate the functioning of the machine after a single operation thereof. The above mentioned circuit for the index relay IR is completed from the switch SOS by the wire 419 and the coil of relay IR which is connected to the wire 353.

The energization of the index relay IR causes it to close its contact IR-1, Fig. 53, maintaining a circuit therethrough for the valve operating solenoid SVC so that the spindle continues to rotate. Contact IR-2 is opened thus opening the circuit therethrough for the SR relay. Also contact IR-3 is closed thereby providing a holding circuit for the IR relay through this contact and through the ILS5-A contact, this circuit extending through the UV-4 contact, wire 415, contact IR-3, contact ILS5-A, wire 418, switch SOS and wire 419. As the carrier reaches its extreme outermost or rearward position, the lug 271d on the wide cam 271 of the drum 270 actuates the CDLS4 switch and the lug 271e actuates the CDLS8 switch. Operation of the CDLS4 switch opens the contact CDLS4-B thereof, Fig. 55, thus deenergizing the RTR relay and the RTR contactor thereby causing deenergization of the rapid traverse motor 181 and stopping the rearward rapid traverse motion of the carrier since the deenergization of the RTRR relay causes the RTRR-1 contact to close, thus reenergizing the rapid traverse brake RTB. Simultaneously, the contact CDLS4-A is closed, Fig. 53, energizing the contactor IM and relay I through the said contact, wires 422 and 427, the now closed contact IR-4, and wires 423, 424 leading to the relay coil I and the contactor coil IM respectively, the circuits for which are completed therethrough to the wire 353.

The energization of the IM contactor causes the indexing motor 228 to be energized and effect indexing of the carrier to bring the next face thereof into operative relationship since the energization of the relay I opened the contact I-1, Fig. 52, thus deenergizing the index brake IB. Also the energization of relay I closed the contact I-3 to maintain the solenoid SVC energized for continued rotation of the spindle. In addition contact I-5 has closed thereby energizing the timing relay TR and the relay RTFR, contact I-6 has opened, however, preventing energization of the rapid traverse contact RTF at this time. The energization of the relay RTFR closes the contact RTFR-2 thereof to condition the circuit for rapid traverse forward as soon as the indexing is completed and prevent deenergization of the RTFR relay when I-5 contact opens as a result of the subsequent deenergization of the I relay.

Let it be assumed that indexing of the carrier is to stop when the next face of the carrier is thus indexed into operative position. A dog would then have been placed during the setup on the index control drum 280 to operate the limit switch ILS5, Fig. 53, before the next succeeding face of the carrier is reached during the indexing operation. As a result the contact ILS5-A is opened during the indexing deenergizing the index relay IR so that the latter opens its contact IR-4. This opening of the contact IR-4 breaks the circuit therethrough to the index relay I but the latter is not immediately deenergized since a holding circuit was provided therefor through the GLS-B contact which closed when the indexing cams began their rotation. However, as soon as these cams have completed their rotation and thus indexed the carrier to the next succeeding face, the switch GLS is actuated to open the GLS-B contact and close the GLS-A contact. The opening of the GLS-B contact breaks the holding circuit to the I relay, deenergizing the latter, and also breaks the circuit to the IM contactor thus deenergizing the indexing motor 228. Deenergization of the I relay closes the I-1 contact applying the index brake IB, thus preventing over-running of the indexing cams. Upon completion of the indexing movement, the deenergization of the I relay closes the I-6 contact thereby completing a circuit therethrough energizing the rapid traverse contactor RTF so that the rapid traverse motor 181 is energized to drive the carrier 66 forwardly with the second face thereof in operative position, the condition of the circuit for this operation being now readily understandable in view of the previous descriptions.

On the face of the turret at which the work cycle is to end, a dog is inserted on the index control drum 280 to actuate switch ILS1 and open the contact ILS1-A thereof, Fig. 54, when the carrier was indexed to bring that face to operative position. This opening of the contact ILS1-A will prevent energization of the relays TR, RTFR and the resulting energization of the rapid traverse forward contactor RTF as has just been described, so that the work cycle is terminated. In such an event the cycle can only be restarted by the operator again depressing the "cycle" start push button 317 as previously described.

Assuming that it is desired to skip index one or more faces of the carrier, the dog on the index control drum 280 which operates the limit switch ILS5 would be omitted so that the ILS5-A contact, Fig. 53, would remain closed thereby maintaining the relay IR energized. This continued energization of relay IR maintains the relay I and the indexing motor contactor IM energized, through the closed contacts IR-4, even after the indexing cam controlled switch GLS has opened the contact GLS-B at the end of the indexing operation, the contact IR-4 being in parallel with the said contact of the GLS switch. Consequently, the indexing of the carrier will continue, thereby bringing the other faces thereof sequentially into operative position, until the limit switch ILS5 is operated by a dog placed on the drum 280 at a position to correspond with the face of the carrier on which the indexing is to stop so that a further machining operation may be performed.

Now, let it be assumed that it is desired to have a dwell period at the end of the carrier feed stroke and before initiation of the rapid traverse return movement, such a dwell being desirable to provide for completing of the cutting operation thus relieving torsional stresses that may have developed during the machining operation. To provide such a dwell, a dog is inserted on the index control drum 280 on the face thereof corresponding with the face of the carrier at which the dwell is to occur. The carrier is then indexed and to place this face of the carrier in operative position whereupon the said dog operates the switch ILS6 to open the contact ILS6-A thereof. The carrier is rapid traversed forwardly and then switched to a feeding rate of movement, feeds, and the feed is terminated, as before described. The opening of the switch contact ILS6-A, however, has broken the circuit to the contactor RTR and the relay RTRR, Fig. 55, so that the start of the rapid traverse return of the carrier is delayed after termination of the feed, until the limit switch CDLS5 has been operated by a lug 273a on the adjustable ring 273 of the cam ring control drum 270. This closes contact CDLS5-B and opens contact CDLS5-A. The contact CDLS5-B is in parallel with the contact ILS6-A and CDLS1-B and consequently the rapid traverse return movement is now initiated since a circuit is now provided for energization of the contactor coil RTR and the relay RTRR, the circuit being the same as previously described with respect to the operation of switch CDL1 in closing of its contact CDLS1–B for return without dwell.

In order to operate the cross slides during movement of the carrier, that is, to provide for "early" cross slide operation, a dog is inserted on the index control drum 280 to operate switch ILS3 or ILS4, Fig. 55, or both of these switches, depending upon whether front or rear cross slide operation is desired or there is to be simultaneous operation of both cross slides. For any of these operations during the forward travel of the carrier, the aforementioned switches are energized selectively or together, as the case may be depending upon the positioning of the dogs, when the cross slide cam pin or pins 249 are opposite the inner concentric portions of the cam grooves of the cross slide cam 237. Thus, if the forward cross slide is to be utilized, then a dog is positioned to actuate switch CDLS2 and ILS3 to close the contacts CDLS2–B and ILS–3, Fig. 55, thus energizing the forward cross slide solenoid FCS. If the rear cross slide is to be utilized, then the dogs are positioned to operate the CDLS2–B contact and the ILS4–B contact, thus energizing the RCS solenoid. If both cross slides are to be utilized, the dogs are positioned for closing both the ILS3–B and the ILS4–B switches as well as the CDLS2–B switch.

The circuits established as the result of such switch operations extend from the wire 373 through wire 437, Fig. 54, and the now closed contact UV–7, wires 438, 445 and 446, to the wire 521, Fig. 55, then through the normally closed contact ILS7–A, the now closed contact CDLS2–B, wire 525, the normally closed contact LCS–3, wire 526, the normally closed contact RTRR–7 and wire 527 to the contact ILS3–B and ILS4–B. These latter contacts are in parallel with each other and respectively in series with the solenoids FCS and RCS with each of the latter, in turn, connected to the control circuit power wire 353. The resulting energization of the selected solenoid or solenoids FCS, RCS effects insertion of the cross slide pin or pins 249 into the cam groove or grooves of the cross slide cam 237 as has been previously described. The pin or pins thus inserted are held in position mechanically during movement of the cross slide or slides, it being recalled that the rotation of the cam 237 is in timed relation to the movement of the carrier and hence will impart a cross slide movement which is correlated to the movement of the carrier.

Operation of the cross slides may also be effected after the carrier has terminated its forward movement. This type of operation is desirable, for example, when utilizing a pusher tool on the carrier. This operation of the cross slides which is known as "Late" operation is effected by inserting dogs on the face of the index control drum 280 corresponding with the selected face of the carrier at which such operation is desired, the dogs being positioned to operate switches ILS2 and ILS3 or ILS4, the latter two switches providing, respectively, for front and rear cross slide operation. When the machine tool is to function in this manner, the feed selector dog on the control turret 68, which is to operate one of the switches TLS1, TLS2 or TLS3 to select the proper feed for the operative face of the carrier, must be set to operate in the extreme forward position of the carrier.

When the machine has been set up as just mentioned and is operated to index the carrier, thereby operatively positioning the face thereof on which the late cross slide operation is desired, the limit switch ILS2 is actuated at the end of the indexing movement. This closes the contact ILS2–B, Fig. 55, energizing the late cross slide relay LCS through a circuit extending from the wire 446 through the normally closed contact ILS7–A and wires 222 and 223 to the now closed contact ILS2–B, then through the coil of the relay LCS and wire 524 to the wire 353.

The carrier is then moved forwardly as has been previously described and, in the event the carrier in its forward movement should actuate the limit switch CDLS2 for early cross slide movement by the lug 271b engaging the said switch, the resulting closing of the contact CDLS2–B does not then energize either of the cross slide solenoids FCS, RCS since the contact LCS–3 in the circuit to these solenoids has been opened by the previously mentioned energization of relay LCS. Likewise, the now open contact LCS–2 prevents energization of the contactor coil RTR and the relay RTRR when the contact CDLS1–B and the contact CDLS5–B are actuated by the cooperating lugs of the cam drum 270. Consequently, return movement of the carrier is not initiated at such times so that the carrier remains in dwell at the end of its forward movement.

It will also be noted that the closing of the LCS–1 contact, as a result of energization of relay LCS, has held the contactor RTF and relay RTFR energized through the normal feeding period of the carrier so that the latter moved at the rapid traverse rate to its innermost position where it remains in dwell. This maintenance of energization for contactors RTF and RTFR is effected through a circuit extending from wire 373 through the now closed contact UV–7, Fig. 54, wires 438, 445 and 447, the normally closed contact RTRR–4, normally closed contact CDLS6–A, the now closed contact LCS–1, the normally closed contact CDLS7–A, wire 478, normally closed contact ILS1–A, wire 474, the now closed contact RTFR–2, wire 475, the now closed contact HUV–7, wire 450, and the normally closed contacts 1FR–4, 2FR–4 and 3FR–4 to the coil of the relay RTFR and thence through the wire 452 to the wire 353. The circuit for contactor RTF is likewise maintained through the above described circuit since the RTF contactor is in parallel with the RTFR relay through the wires 453, 455, normally closed contact I–6, wire 456, the coil of the contactor and the wire 454. Also the TR relay is energized through the same circuit since it is in parallel with the coil of the RTFR relay through the wires 453 and 454.

When the carrier approached the end of its forward travel, the cross slide cam 237 was positioned with the inner concentric portion of its groove or grooves opposite the cross slide pin or pins 249 and at this time the limit switch CDLS3 is actuated to close its contact CDLS3–B by the lug 271C of the cam ring 271. This provides a circuit through the latter contact wire 530, the now closed contact LCS–4 and the normally closed contact RTRR–7 to the contacts ILS3–B and ILS4–B, respectively, in series with the solenoids FCS and RCS so that either or both of these solenoids is energized depending upon the positions of the dogs for cooperation with the switches ILS–3 and ILS–4 as has been previously described. Consequently, the cross slide pin or pins are engaged with the cross slide cam and cross slide operation begins at the rapid traverse rate.

The rapid traverse forward movement of the cross slide or slides terminates and feed movement thereof begins at the point where the limit switch CDLS7 is actuated by the lug 274a on the adjustable cam ring 274. The resulting opening of the contact CDLS7–A, Fig. 54, breaks the circuit to the contactor coil RTF and the relay RTFR while the closing of the companion contact CDLS7–B energizes one of the feed relays 1FR, 2FR or 3FR depending upon which of the feed selector switches TLS1, TLS2 or TLS3 has been closed by the feed selecting dog positioned upon the control turret. This latter circuit extends from wire 373 through the wire 437, the now closed contact UV–7, wires 445 and 447, the normally closed contact RTRR–4, CDLS6–A, the now closed contact LCS–1, wire 457, the now closed contact CDLS7–B, wires 473, 472 and 463, the now closed contact UV–10, and wire 464 to the contact TLS1–B, if the latter is utilized. If switch TLS2 is used, the circuit continues from wire 464 through a wire 484 to the contact TLS2–B. If switch TLS3 is used the circuit continues from wire 484 through a wire 489 to the contact TLS3–B. The circuits from contacts TLS1–B, TLS2–B and TLS3–B through the corresponding feed relays will be readily apparent and hence need not be recited.

The forward movement of the cross slide or cross slides terminates when the lug 272a on the adjustable cam ring 272 actuates the limit switch CDLS6 to open the contact CDLS6–A, Fig. 54, and close the contacts CDLS6–B, Fig. 55. The adjustability of the rings 272 is provided so that there can be either a dwell at the end of the forward movement of the cross slide or not, as desired. Opening of the contact CDLS6–A deenergizes the feed relay which had been previously energized as just mentioned. The closing of the contact CDLS6–B energizes the contactor coil RTR and relay RTRR by establishing a circuit extending thereto from the wire 446 through wire 510, now closed contacts CDLS6–B, wire 509, normally closed contact TRR1–6, wire 501, the now closed contact UV–11, wire 497, the now closed contact CDLS4–B and wire 498. The energization of the relay RTRR and the contactor RTR initiates the rapid traverse return movement of the cross slide or slides and of the carrier in a manner which will now be readily apparent.

When the carrier has returned to its outermost position it then indexes to the next face in the manner which will now be apparent during which the limit switch ILS2 is released, thus closing its contact ILS2–A and opening its contact ILS2–B. Opening the latter contact deenergizes the late cross slide relay LCS so that the circuit is restored to its former position, whereupon it may be operated to effect any of the aforementioned functions for the newly indexed face of the carrier.

Forming of right-hand threads may be effected during automatic operation of the machine by placing a dog on the index control drum to actuate the limit switch ILS7 for the particular face of the carrier on which it is desired to effect the threading operation. This dog opens the contact ILS7–A upon indexing of the carrier to that face thereof which is to be utilized for the threading operation thus preventing operation of either the front or rear cross slides since the circuit therethrough for energization of the FCS or RCS solenoids is open. The closing of the contact ILS7–B sets up the circuit for controlling the threading or tapping operation by subsequent energization of the TRR1 and TRR2 relays.

The carrier is rapidly traversed forward and its movement altered to a feeding rate in the same manner as has been previously described for the other operations effected automatically. Prior to the end of the normal feeding movement, for example, approximately one inch from the end thereof, the lug 271c of the cam ring 271 actuates the limit switch CDLS3 so that the latter is operated before either CDLS1 or CDLS5, the latter switches being those which would have placed the carrier in rapid traverse reverse. The prior operation of the CDLS3 switch enables the machine to remain in feeding movement even after the subsequent closing of the CDLS1 or CDLS5 switches. This follows from the fact that the contact CDLS3–B, Fig. 55, is now closed, thus completing the energization circuit for the tapping relays TRR1 and TRR2 which circuit extends from wire 446 through wire 529, the now closed contact CDLS3–B and wires 530, 531 to the now closed contact ILS7–B thence through wire 518, the normally closed contact RTFR–3, wire 519, to and through the coils of the relays TRR1 and TRR2 in parallel, the circuit being completed by the wire 520 connected with the wire 353.

Energization of the tapping relay TRR1 opens its contact TRR1–1, Fig. 52, thus deenergizing the main motor forward contactor MMF, while the closing of the contact TRR1–2 energizes the main motor reverse contactor MMR so that the spindle 64 is rotated in a reverse direction, as is also the output shaft of the feed gear box since one of the feed clutches, for example, F3 is now engaged.

Thus, during the aforementioned forward feeding, the relay 3FR will have been energized as will now be readily apparent, thus closing its contact 3FR–7, Fig. 55, and providing a holding circuit therethrough for the 3FR relay. This circuit extends from wire 373 through the now closed contact UV–7, Fig. 54, wires 438, 445 and 447, the normally closed contacts RTRR–4, CDLS6–A, wire 459, the now closed contact TRR1–5, wires 448 and 472, 473 and 463, to and through the now closed contact UV–9, wire 467, the normally closed contact RTRR–5, wires 468 and 493, the now closed contact 3FR–7, 2FR–7, 1FR–7 and wire 492, to one terminal of the coil 3FR, the circuit being completed from the other terminal of the coil through the wire 491 to the wire 353. Consequently, the carrier is moved rearwardly at the same feed rate as that at which the thread was formed rather than at the usual rapid traverse reverse. This prevents damage of the thread that has just been formed. Holding circuits for the tapping relays have been provided through the now closed contact TRR1–7, Fig. 55, contact ILS7–B, wire 518, the normally closed contact RTFR–3 and wire 519 connected with the tapping relays TRR1 and TRR2 so that energization of the rapid traverse relay RTRR and contactor RTR are prevented since the TRR1–6 contact is held open thereby breaking the circuit through the switches ILS6–A, CDLS6–B, CDLS1–B and CDLS5–B. Also, the energization of the TRR2 relay has caused it to open its contacts TRR2–1 and TRR2–2, while the contacts TRR2–3 and TRR2–4 are closed, Fig. 55. This prepares the circuit for subsequent switching from feeding rate of movement to rapid traverse movement but the opening of the contact TRR2–2 has no effect at this time on the energization of the feed clutch F3 since, as mentioned before, a holding circuit is provided for the 3FR relay about the contact TRR2–2.

When the carrier 66 on its return stroke at the feeding rate now passes over the feed actuating switch TLS–3, the resulting closing of the contact TLS3–B provides a circuit therethrough and through the now closed contact TRR2–4 energizing the rapid traverse contactor RTR and the relay RTRR. This circuit extends from wire 373 through the now closed contact UV–7, wires 438, 445, 447, contact RTRR–4, wire 448, normally closed contact ILS2–A, CDLS5–A, CDLS1–A, wires 473, 472 and 463, the now closed contact UV–10, wire 464 and 484, the now closed contact TLS3–B, wire 505, and the now closed contact TRR2–4 to the wire 504 and then through wire 501 and the now closed contact UV–11 to the wire 497 and then through the now closed contact CDLS4–B to the wire 498 connected with the RTRR relay thus energizing the latter.

Energization of the relay RTRR causes opening of its contacts RTRR–4 and RTRR–5 deenergizing the 3FR relay so that the feed clutch F3 is deenergized terminating feeding movement of the carrier. This allows the 3FR relay to close its contact 3FR–8 establishing a circuit therethrough from the wire 498 energizing the RTR contactor so that the rapid traverse motor is energized for rotation in the reverse direction moving the carrier rearwardly at the rapid traverse rate. Energization of the RTRR relay opens the contact RTTR–1, thus maintaining the rapid traverse brake RTB deenergized while the closing of contact RTRR–6, Fig. 55, provides a holding circuit for the RTRR relay under control of the CDLS4–B contact as has been previously described. It will be remembered that the contacts RTRR–5 and RTRR–6 are of the overlapping type and hence the circuit maintaining the RTRR relay is not broken during this changeover to the holding circuit.

The circuit for automatic operation when cutting lefthand threads is substantially identical with that described for cutting right-hand threads, there being but two differences. First, in order to cut the left-hand threads, it will be remembered that the operator must have provided the proper gears for the feed trains, see Figs. 7 and 7A, so that one or both of the feeds controlled by clutches F2 and F3 are reversed with respect to the spindle rotation. Since it has been assumed that the feed train controlled by clutch F3 is to be used for either forming a right-hand thread or other operation not requiring reverse feeding, the gears for the train controlled by clutch F2 will be changed as before mentioned. Also, dogs will have been placed on the index control drum 280 to actuate the limit switches ILS7 and ILS8 as was explained for left-hand tapping under "Manual" operation. The resulting actuation of the limit switch ILS8, when the carrier is indexed, will cause opening of the contact ILS8–A and closing of contact ILS8–B, Fig. 52, so that the spindle 64 will be rotated in a reverse direction when the carrier is traveling forwardly and will rotate in a forward direction while the carrier is being returned to its outermost position, as has been explained under hand operation and as will now be apparent from an inspection of the functions performed by the contacts TRR1–1 and TRR1–2, TRR1–3 and TRR1–4. A detailed explanation of the various switch and relay actuations during the operation for tapping of left-hand threads is deemed unnecessary in view of the prior description of similar operation under hand control and the description of the automatic operation of the machine for functions other than tapping.

It should now be evident to one skilled in the art how the machine may be set up in advance to sequentially perform a plurality of different operations upon a workpiece either under hand or automatic operation. The setup is both rapid and easily effected since it is only necessary to provide the proper change gears, position the dogs on the control turret 68, position the dogs on the index control drum 280 and adjust or set the cam rings 272, 273 and 274 in accordance with the particular machining operations to be performed in each of the operative steps of the work cycle. This setup is greatly expedited by the easy accessibility to the various control members and change gears and which are so constructed that adjustments and changes may be more rapidly effected. It will also be understood that the various dogs and rings may be utilized in the hand operation of the machine or the machine may be manually controlled by simply manipulating the several switch knobs and push buttons on the control panel 314.

While a specific embodiment of the invention has been described in considerable detail, it will be evident that changes may be made in certain structural features, the specific disclosure and described functioning of the machine having been in the nature of a specific example for the purpose of disclosing a practical embodiment of the invention. The invention is not, however, to be considered as limited by the specific disclosure except as required by the scope of the appended claims.

Having thus described the invention, we claim:

1. In a machine tool having a work spindle, means for rotating said work spindle at different speeds and in opposite directions, a slide, means operatively interconnecting said slide and said spindle for moving said slide at different feeding rates comprising a feed drive shaft operatively connected to said spindle, a driven shaft, a plurality of drive trains between said feed drive shaft and said driven shaft, the said drive trains including readily removable gears adapted to provide rotation of said driven shaft either in the same direction as that of the work spindle or in the reverse direction with respect thereto, and individual clutches for selectively connecting the said drive trains with said driven shaft, whereby said slide may be given a feeding movement of desired direction and speed regardless of the direction of rotation of the spindle.

2. A machine tool as defined in claim 1 and wherein each of said clutches is an electromagnetically operated clutch, and electrical interlocking control means are provided enabling only one of said clutches to be energized at a time.

3. In a machine tool, a work spindle, means to rotate the said spindle in opposite directions, a slide adapted to move relative to said spindle, a first shaft, driving connections between said spindle and shaft, a second shaft operatively connected to said slide to effect movement thereof, a plurality of shafts disposed about said first shaft, cooperating gearing on said first shaft and said plurality of shafts for effecting rotation of said plurality of shafts at different speeds, and separate clutches between said second shaft and certain of said plurality of shafts to selectively connect one of the latter to said second shaft, at least some of said gearing being removably carried by the outer ends of said first shaft and said plurality of shafts, whereby changing of said removable gears and selective operation of said clutches effects rotation of said second shaft at different selected speeds in either the same direction as that of the said spindle or in the reverse direction so that feeding movement of said slide is provided in either direction regardless of the direction of rotation of the spindle.

4. A machine tool comprising a support, a spindle rotatably carried by said support and adapted to mount a tool or a workpiece, a longitudinally movable carrier mounted in said support and provided with a portion adapted to carry tools or workpieces, means including a reversible electric motor for rotating said spindle, a gear train including an electrically operated clutch means for operatively connecting the said spindle to said carrier for movement thereof at a feeding rate in either direction, a second reversible electric motor operatively connected to said carrier for providing rapid traverse movement of said carrier in either direction of its longitudinal movement, an electrical control circuit for governing the energization and deenergization of said motors and clutch means, said circuit including switches mounted upon said support, means movable with said carrier for engaging and actuating said switches at preselected points in the movement of said carrier to sequentially terminate energization of said rapid traverse motor and energize said clutch means while said first-mentioned motor is energized for rotation in one direction and thereafter deenergize said clutch means and reenergize said rapid traverse motor for rotation in the opposite direction, and means in said circuit selectively operable to prevent deenergization of said clutch means and reenergization of said rapid traverse motor until after said first-mentioned motor has been energized for rotation in the reverse direction and has moved said carrier at a feeding rate in the opposite direction a distance equal to its movement when the first-mentioned motor was energized for rotation in the first direction.

5. A machine tool comprising a support, a spindle rotatably carried by said support and adapted to mount a tool or a workpiece, a longitudinally movable and rotatably indexible carrier mounted in said support and provided with a portion adapted to carry tools or workpieces, means including a reversible electric motor for rotating said spindle, a gear train including electrically operated clutches for selectively operatively connecting the said spindle to said carrier for longitudinal movement thereof at different feeding rates and in either direction, a second reversible electric motor operatively connected to said carrier for providing rapid traverse movement of said carrier in either direction of its longitudinal movement, an electrical control circuit including electrical swtiches mounted upon said support for governing the energization and deenergization of said motors and clutches, means movable with said carrier engaging and actuating certain of said switches at preselected points in the movement of said carrier to sequentially terminate energization of said rapid traverse motor and energize a selected one of said clutches while said first-mentioned motor is energized for rotation in one direction and thereafter deenergize the energized clutch and reenergize said rapid traverse motor for rotation in the opposite direction upon completion of movement of said carrier, and means including others of said switches in said circuit selectively operable to prevent deenergization of an energized clutch and reenergization of said rapid traverse motor until after said first-mentioned motor has been energized for rotation in the reverse direction and has moved said carrier at a feeding rate in the opposite direction a distance equal to its movement at the feeding rate when the first-mentioned motor was energized for rotation in the first direction.

6. A machine tool comprising a support, a spindle rotatably carried by said support and adapted to mount a tool or a workpiece, a longitudinally movable and rotatably indexible carrier mounted in said support and provided with a portion adapted to carry tools or workpieces, means including a reversible electric motor operatively connectible with said spindle for effecting rotation thereof, a gear train including electrically operated clutches individually operatable for connecting the said spindle to said carrier for longitudinal movement in either direction at a selected one of a plurality of feeding rates, a second reversible electric motor operatively connected to said carrier for providing rapid traverse movement of said carrier in either direction of its longitudinal movement, electrically controlled means connectible with said carrier for effecting rotatable indexing thereof, an electrical control circuit including electrical switches mounted on said support for governing the energization and deenergization of said motors and clutches and of said electrically controlled means, the said circuit including connections selectively established by operation of some of said switches to effect energization of said clutches and the first-mentioned motor in a manner providing sequential rotation of said first-mentioned motor in opposite directions and feeding movement of said carrier towards and from said spindle before and after such reverse rotation, means indexible with said carrier engaging and actuating certain of said switches to condition said circuit for a preselected mode of operation of the machine tool, and means movable with said carrier in timed relation with its longitudinal movement for engaging and actuating others of said switches at preselected points in the movement of said carrier to sequentially initiate energization and deenergization of said rapid traverse motor and said electrically controlled means as well as energization and deenergization of a selected one of said clutches.

7. A machine tool comprising a support, a spindle rotatably carried by said support and adapted to mount a tool or a workpiece, a longitudinally movable and rotatably indexible carrier mounted in said support and provided with a portion adapted to carry tools or workpieces, means including a reversible electric motor operatively connectible with said spindle for effecting rotation thereof, a gear train including electrically operated clutches individually operatable for connecting the said spindle to said carrier for longitudinal movement in either direction at a selected one of a plurality of feeding rates, a second reversible electric motor operatively connected to said carrier for providing rapid traverse movement of said carrier in either direction of its longitudinal movement, electrically controlled means connectible with said carrier for effecting indexing thereof, an electrical control circuit including electrical switches mounted on said support for governing the energization and deenergization of said motors and clutches and of said electrically controlled means, means indexible with said carrier engaging and actuating certain of said switches to condition said circuit for a preselected mode of operation of the machine tool, means movable with said carrier in timed relation with its longitudinal movement for engaging and actuating others of said switches at preselected points in the movement of said carrier to sequentially terminate energization of said rapid traverse motor and energize a selected one of said clutches while said first-mentioned motor is energized for rotation in one direction and thereafter deenergize the energized clutch and reenergize said rapid traverse motor for rotation in the opposite direction upon completion of movement of said carrier in one direction, and means in said circuit including another of said switches selectively operatable to prevent deenergization of the energized clutch and reenergization of said rapid traverse motor until after said first-mentioned motor has been energized for rotation in the reverse direction and has moved said carrier at a feeding rate in the opposite direction a distance equal to its movement when the first-mentioned motor was energized for rotation in said first direction, and still other switch means in said circuit actuated when said carrier has completed its movement in said opposite direction to deenergize said rapid traverse motor and energize said electrically controlled means.

References Cited in the file of this patent
UNITED STATES PATENTS

| | | |
|---|---|---|
| 1,173,573 | Hayden | Feb. 29, 1916 |
| 1,902,179 | Oberhoffken | Mar. 21, 1933 |
| 2,040,450 | Swanson | May 12, 1936 |
| 2,282,591 | Orr | May 12, 1942 |
| 2,375,662 | Keeling et al. | May 8, 1945 |
| 2,405,686 | Clark | Aug. 13, 1946 |
| 2,528,299 | Clark | Oct. 31, 1950 |
| 2,644,222 | Curtis et al. | July 7, 1953 |